(12) United States Patent
Siegel et al.

(10) Patent No.: US 10,248,120 B1
(45) Date of Patent: Apr. 2, 2019

(54) NAVIGABLE PATH NETWORKS FOR AUTONOMOUS VEHICLES

(71) Applicant: Amazon Technologies, Inc., Seattle, WA (US)

(72) Inventors: Hilliard Bruce Siegel, Seattle, WA (US); Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/268,202

(22) Filed: Sep. 16, 2016

(51) Int. Cl.
G05D 1/00 (2006.01)
G06Q 10/08 (2012.01)
G05D 1/02 (2006.01)

(52) U.S. Cl.
CPC ......... G05D 1/0088 (2013.01); G05D 1/0022 (2013.01); G05D 1/0223 (2013.01); G06Q 10/0834 (2013.01)

(58) Field of Classification Search
CPC .. G05D 1/0088; G05D 1/0022; G05D 1/0223; G05D 1/0212; G06Q 10/0834; G01C 21/3453; G01C 21/34; G01C 21/3407; G01G 1/0137
USPC .......................................................... 701/22
See application file for complete search history.

(56) References Cited

U.S. PATENT DOCUMENTS 4,865,248 A 9/1989 Barth
4,954,962 A 9/1990 Evans et al.
5,040,116 A 8/1991 Evans et al.
5,386,462 A 1/1995 Schlamp
5,995,898 A 11/1999 Tuttle
6,266,577 B1 7/2001 Popp et al.
(Continued)

FOREIGN PATENT DOCUMENTS

DE 102011086497 A1 5/2013
FR 2692064 A1 12/1993
(Continued)

OTHER PUBLICATIONS

Hawas et al., Infrastructureless Inter-Vehicular Real-Time Route Guidance, 2008, IEEE, p. 1213-1219 (Year: 2008).*
(Continued)

*Primary Examiner* — McDieunel Marc
(74) *Attorney, Agent, or Firm* — Athorus, PLLC

(57) ABSTRACT

Navigable path networks herein are defined based on attributes of tasks to be performed by autonomous vehicles traveling thereon, based on attributes of such vehicles, or attributes of the environments in which such networks are provided. The networks include traditional and non-traditional transportation features, and are defined based on prior travel within the environments, including information gathered by such vehicles during such prior travel. The autonomous vehicles are robotic, self-powered units having storage compartments for carrying objects between points of the networks. An optimal route within a navigable path network is selected based on attributes of an autonomous vehicle, a task to be performed by the autonomous vehicle, or the various paths within the network. A navigable path network is updated based on information subsequently learned regarding the environment, including information captured by autonomous vehicles traveling on paths of the network.

20 Claims, 24 Drawing Sheets

(56) References Cited

U.S. PATENT DOCUMENTS

| | | |
|---|---|---|
| 6,344,796 B1 | 2/2002 | Ogilvie et al. |
| 6,374,155 B1 | 4/2002 | Wallach et al. |
| 6,426,699 B1 | 7/2002 | Porter |
| 6,543,983 B1 | 4/2003 | Felder et al. |
| 6,636,781 B1 | 10/2003 | Shen et al. |
| 6,690,997 B2 | 2/2004 | Rivalto |
| 6,694,217 B2 | 2/2004 | Bloom |
| 6,919,803 B2 | 7/2005 | Breed |
| 6,961,711 B1 | 11/2005 | Chee |
| 6,970,838 B1 | 11/2005 | Kamath et al. |
| 7,129,817 B2 | 10/2006 | Yamagishi |
| 7,133,743 B2 | 11/2006 | Tilles et al. |
| 7,188,513 B2 | 3/2007 | Wilson |
| 7,337,686 B2 | 3/2008 | Sagi-Dolev |
| 7,337,944 B2 | 3/2008 | Devar |
| 7,339,993 B1 | 3/2008 | Brooks et al. |
| 7,673,831 B2 | 3/2010 | Steele et al. |
| 7,966,093 B2 | 6/2011 | Zhuk |
| 8,577,538 B2 | 11/2013 | Lenser et al. |
| 9,051,043 B1 | 6/2015 | Peeters et al. |
| 9,079,587 B1 | 7/2015 | Rupp et al. |
| 9,244,147 B1 | 1/2016 | Soundararajan et al. |
| 9,261,578 B2 | 2/2016 | Im et al. |
| 9,358,975 B1 | 6/2016 | Watts |
| 9,373,149 B2 | 6/2016 | Abhyanker |
| 9,381,916 B1 | 7/2016 | Zhu et al. |
| 9,404,761 B2* | 8/2016 | Meuleau ............ G01C 21/3453 |
| 9,436,183 B2* | 9/2016 | Thakur ............... G01C 21/3407 |
| 9,448,559 B2* | 9/2016 | Kojo .................. G01C 21/3407 |
| 9,561,941 B1 | 2/2017 | Watts |
| 9,568,335 B2* | 2/2017 | Thakur .................. G01C 21/34 |
| 9,623,562 B1 | 4/2017 | Watts |
| 9,682,481 B2 | 6/2017 | Lutz et al. |
| 9,697,730 B2* | 7/2017 | Thakur ................. G08G 1/0137 |
| 9,718,564 B1 | 8/2017 | Beckman et al. |
| 9,733,646 B1 | 8/2017 | Musser et al. |
| 9,746,852 B1 | 8/2017 | Watts et al. |
| 9,746,853 B2* | 8/2017 | Scheepjens .......... G05D 1/0212 |
| 9,786,187 B1 | 10/2017 | Bar-Zeev et al. |
| 9,959,773 B2 | 5/2018 | Raptopoulos et al. |
| 2001/0045449 A1 | 11/2001 | Shannon |
| 2002/0016726 A1 | 2/2002 | Ross |
| 2002/0087375 A1 | 7/2002 | Griffin et al. |
| 2002/0111914 A1 | 8/2002 | Terada et al. |
| 2002/0116289 A1 | 8/2002 | Yang |
| 2002/0123930 A1 | 9/2002 | Boyd et al. |
| 2002/0156645 A1 | 10/2002 | Hansen |
| 2003/0040980 A1 | 2/2003 | Nakajima et al. |
| 2003/0141411 A1 | 7/2003 | Pandya et al. |
| 2004/0068416 A1 | 4/2004 | Solomon |
| 2004/0162638 A1 | 8/2004 | Solomon |
| 2006/0118162 A1 | 6/2006 | Saelzer et al. |
| 2006/0136237 A1* | 6/2006 | Spiegel .................. G06Q 10/08 705/330 |
| 2007/0016496 A1 | 1/2007 | Bar et al. |
| 2007/0073552 A1 | 3/2007 | Hileman |
| 2007/0150375 A1 | 6/2007 | Yang |
| 2007/0170237 A1 | 7/2007 | Neff |
| 2007/0233337 A1 | 10/2007 | Plishner |
| 2007/0293978 A1 | 12/2007 | Wurman et al. |
| 2008/0027591 A1 | 1/2008 | Lenser et al. |
| 2008/0100258 A1 | 5/2008 | Ward |
| 2008/0150679 A1 | 6/2008 | Bloomfield |
| 2008/0154659 A1 | 6/2008 | Bettes |
| 2008/0167817 A1 | 7/2008 | Hessler et al. |
| 2008/0301009 A1 | 12/2008 | Plaster et al. |
| 2009/0062974 A1* | 3/2009 | Tamamoto ........... G05D 1/0295 701/25 |
| 2009/0063166 A1 | 3/2009 | Palmer |
| 2009/0079388 A1 | 3/2009 | Reddy |
| 2009/0106124 A1 | 4/2009 | Yang |
| 2009/0149985 A1 | 6/2009 | Chimomas |
| 2009/0236470 A1 | 9/2009 | Goossen et al. |
| 2009/0299903 A1 | 12/2009 | Hung et al. |
| 2009/0314883 A1 | 12/2009 | Arlton |
| 2010/0088163 A1 | 4/2010 | Davidson et al. |
| 2011/0035149 A1 | 2/2011 | McAndrew et al. |
| 2011/0264311 A1 | 10/2011 | Lee et al. |
| 2012/0039694 A1 | 2/2012 | Suzanne |
| 2012/0109419 A1 | 5/2012 | Mercado |
| 2012/0219397 A1 | 8/2012 | Baker |
| 2012/0323365 A1 | 12/2012 | Taylor et al. |
| 2013/0073477 A1 | 3/2013 | Grinberg |
| 2013/0081245 A1 | 4/2013 | Vavrina et al. |
| 2013/0126611 A1 | 5/2013 | Kangas et al. |
| 2013/0148123 A1 | 6/2013 | Hayashi |
| 2013/0218799 A1 | 8/2013 | Lehmann et al. |
| 2013/0261792 A1 | 10/2013 | Gupta et al. |
| 2013/0262251 A1 | 10/2013 | Wan et al. |
| 2013/0262252 A1 | 10/2013 | Lakshman et al. |
| 2013/0262276 A1 | 10/2013 | Wan et al. |
| 2013/0262336 A1 | 10/2013 | Wan et al. |
| 2013/0264381 A1 | 10/2013 | Kim et al. |
| 2014/0022055 A1 | 1/2014 | Levien et al. |
| 2014/0030444 A1 | 1/2014 | Swaminathan et al. |
| 2014/0032034 A1 | 1/2014 | Raptopoulos et al. |
| 2014/0052661 A1 | 2/2014 | Shakes et al. |
| 2014/0136282 A1 | 5/2014 | Fedele |
| 2014/0136414 A1 | 5/2014 | Abhyanker |
| 2014/0149244 A1 | 5/2014 | Abhyanker |
| 2014/0180914 A1 | 6/2014 | Abhyanker |
| 2014/0254896 A1 | 9/2014 | Zhou et al. |
| 2014/0309813 A1 | 10/2014 | Ricci |
| 2014/0325218 A1 | 10/2014 | Shimizu et al. |
| 2015/0006005 A1 | 1/2015 | Yu et al. |
| 2015/0069968 A1 | 3/2015 | Pounds |
| 2015/0102154 A1 | 4/2015 | Duncan et al. |
| 2015/0120602 A1 | 4/2015 | Huffman et al. |
| 2015/0129716 A1 | 5/2015 | Yoffe |
| 2015/0153175 A1 | 6/2015 | Skaaksrud |
| 2015/0158599 A1 | 6/2015 | Sisko |
| 2015/0175276 A1 | 6/2015 | Koster |
| 2015/0183528 A1 | 7/2015 | Walsh et al. |
| 2015/0185034 A1* | 7/2015 | Abhyanker ............ G01C 21/36 701/23 |
| 2015/0202770 A1* | 7/2015 | Patron ................... G05D 1/024 700/245 |
| 2015/0227882 A1 | 8/2015 | Bhatt |
| 2015/0246727 A1 | 9/2015 | Masticola et al. |
| 2015/0253777 A1 | 9/2015 | Binney et al. |
| 2015/0259078 A1 | 9/2015 | Filipovic et al. |
| 2015/0317597 A1 | 11/2015 | Shucker et al. |
| 2015/0332206 A1 | 11/2015 | Trew et al. |
| 2015/0367850 A1 | 12/2015 | Clarke et al. |
| 2015/0370251 A1* | 12/2015 | Siegel .................. G05D 1/0027 701/2 |
| 2016/0009413 A1 | 1/2016 | Lee et al. |
| 2016/0033966 A1 | 2/2016 | Farris et al. |
| 2016/0068267 A1 | 3/2016 | Liu et al. |
| 2016/0104099 A1 | 4/2016 | Villamar |
| 2016/0114488 A1 | 4/2016 | Medina et al. |
| 2016/0129592 A1 | 5/2016 | Saboo et al. |
| 2016/0144734 A1 | 5/2016 | Wang et al. |
| 2016/0144982 A1 | 5/2016 | Sugumaran |
| 2016/0200438 A1 | 7/2016 | Bokeno et al. |
| 2016/0207627 A1 | 7/2016 | Hoareau et al. |
| 2016/0214717 A1 | 7/2016 | Silva |
| 2016/0235236 A1 | 8/2016 | Byers et al. |
| 2016/0236778 A1 | 8/2016 | Takayama et al. |
| 2016/0257401 A1 | 9/2016 | Buchmueller et al. |
| 2016/0266578 A1 | 9/2016 | Douglas et al. |
| 2016/0282126 A1 | 9/2016 | Watts et al. |
| 2016/0299233 A1 | 10/2016 | Levien et al. |
| 2016/0334229 A1* | 11/2016 | Ross ..................... G05D 1/0022 |
| 2016/0364679 A1 | 12/2016 | Cao |
| 2016/0364989 A1* | 12/2016 | Speasl .................. G08G 5/0034 |
| 2017/0032315 A1 | 2/2017 | Gupta et al. |
| 2017/0096777 A1 | 4/2017 | Spinelli et al. |
| 2017/0098378 A1 | 4/2017 | Soundararajan et al. |
| 2017/0100837 A1* | 4/2017 | Zevenbergen ............ B25J 5/00 |
| 2017/0101017 A1 | 4/2017 | Streett |
| 2017/0113352 A1* | 4/2017 | Lutz ..................... B25J 9/1697 |
| 2017/0164319 A1 | 6/2017 | Skaaksrud et al. |

(56) References Cited

U.S. PATENT DOCUMENTS

| | | |
|---|---|---|
| 2017/0167881 A1 | 6/2017 | Rander et al. |
| 2017/0372256 A1 | 12/2017 | Kantor et al. |
| 2018/0088586 A1 | 3/2018 | Hance et al. |

FOREIGN PATENT DOCUMENTS

| | | |
|---|---|---|
| JP | 2004126800 A | 4/2004 |
| JP | 2011211025 A | 10/2011 |

OTHER PUBLICATIONS

Bullock et al., Analysis of the use of digital road maps in vehicle navigation, 1994, IEEE, p. 494-501 (Year: 1994).*

Kladis et al., Event-based energy optimum route planning in the context of Unmanned Aerial Vehicles for multi-objective exploration missions, 2009, IEEE, p. 1281-1286 (Year: 2009).*

Navaravong et al., Formation reconfiguration for mobile robots with network connectivity constraints, 2012, IEEE, p. 18-24 (Year: 2012).* http://www.geekwire.com/2016/google-pondering-drone-delivery-even-about-boxes-it-flies-to-front-doors/.

Kais, Mikael et al., "An Intelligent architecture for automated transportation in our cities", 2001 European Control Conference (ECC), Porto, Portugal, Sep. 4-7, 2001, pp. 277-282 (Year: 2001).

Mike Murphy, "Google wants to deliver packages from self-driving trucks," published Feb. 9, 2016, URL: https://qz.com/613277/google-wants-to-deliver-packages-from-self-driving-trucks/, 4 pages.

Parent, Michel et al., "Intelligent Transportation in Cities with CTS", The IEEE 5th International Conference on Intelligent Transportation Systems, Sep. 3-6, 2002, Singapore, pp. 826-830 (Year 2002).

URL: https://web.archive.org/web/20160804001046/https://www.starship.xyz/, download date: Aug. 4, 2016, 21 pages.

DHL Trend Research, "Self-Driving Vehicles in Logistics," Dec. 2014, Markus Kückelhaus et al. (downloaded from http://www.dhl.com/content/damidownloads/g0/about_us/logistics_insights/dhl_self_driving_vehicles.pdf with an archived Web version available on https://web.archive.org/web/20151018154844/http://www.dhl.com/content/dam/downloads/g0/about_us/logistics_insights/dhl_self_driving_vehicles.pdf), 39 pages.

DHL Trend Research, "Unmanned Aerial Vehicles in Logistics: A DHL perspective on implications and use cases for the logistics industry," 2014, Markus Kückelhaus et al., URL: http://www.dhl.com/content/dam/downloads/g0/about_us/logistics_insights/dhl_trend_report_uav.pdf with a Web Archive version available at: https://web.archive.org/web/20150923080141/http://www.dhl.com/en/about_us/logistics_insights/dhl_trend_research/uav.html, 24 pages.

Marcus Wohlsen, "The Next Big Thing You Missed: Amazon's Delivery Drones Could Work—They Just Need Trucks," Wired: Business, Jun. 10, 2014, URL: https://www.wired.com/2014/06/the-next-big-thing-you-missed-delivery-drones-launched-from-trucks-are-the-future-of-shipping/, 4 pages.

* cited by examiner

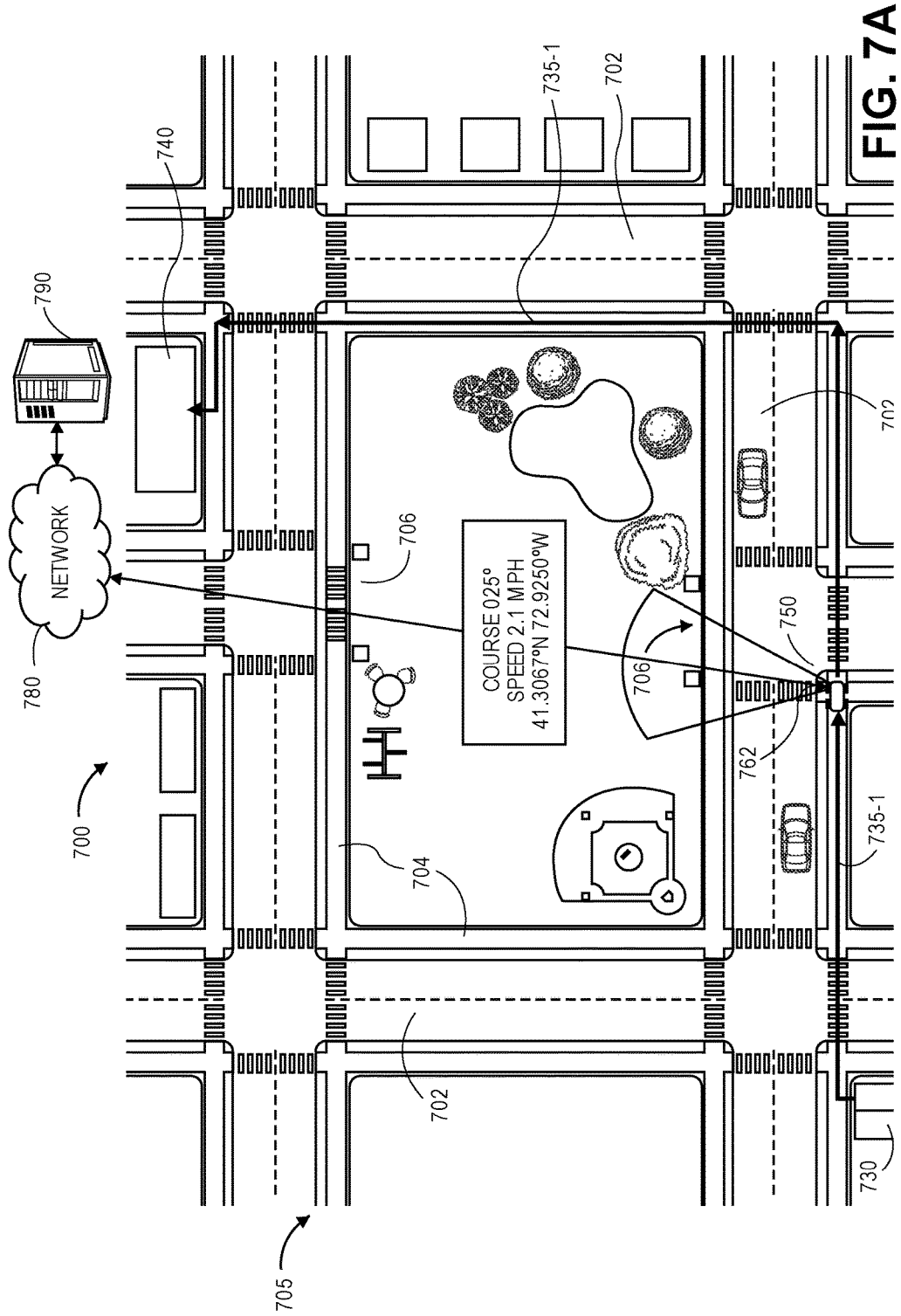

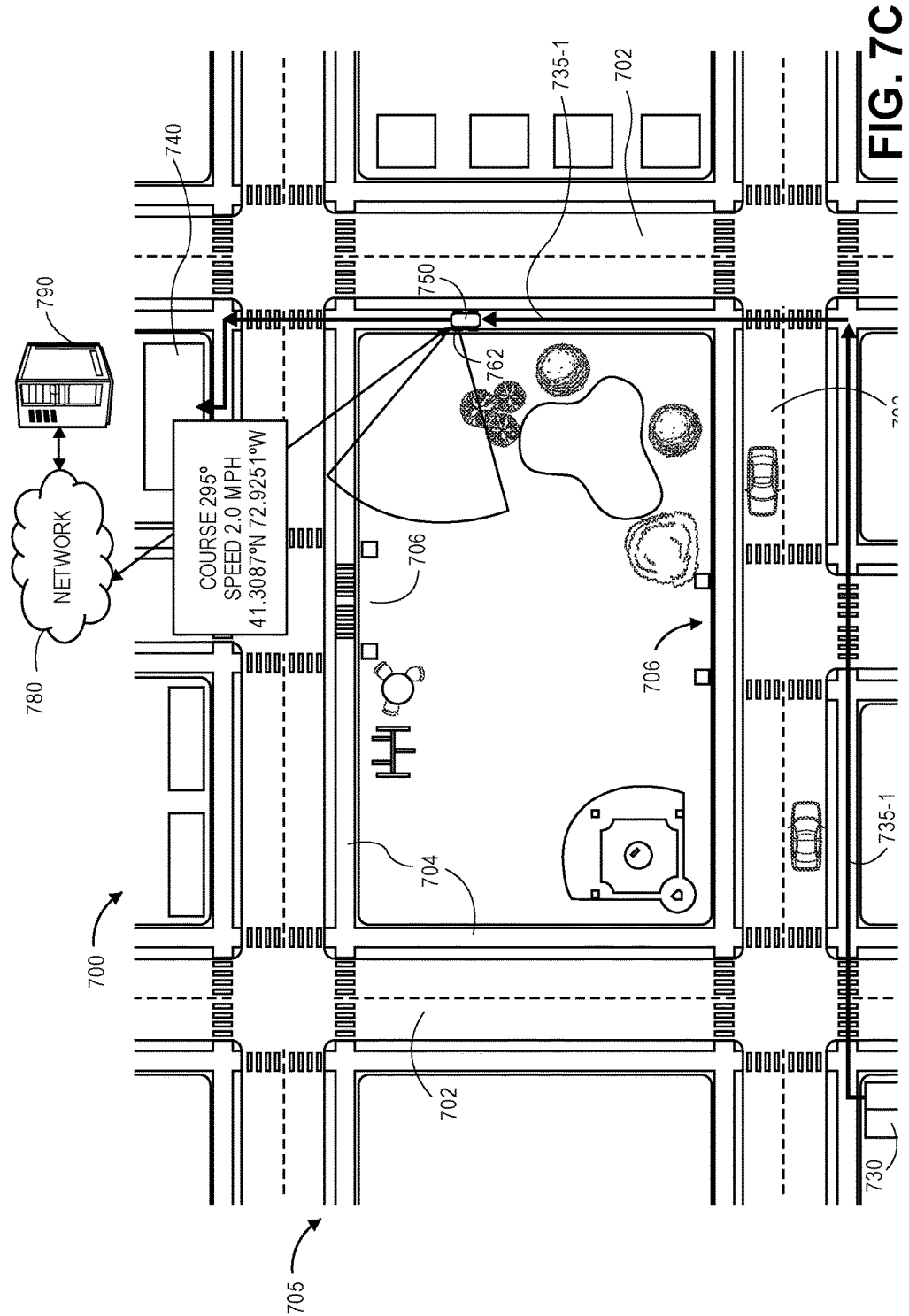

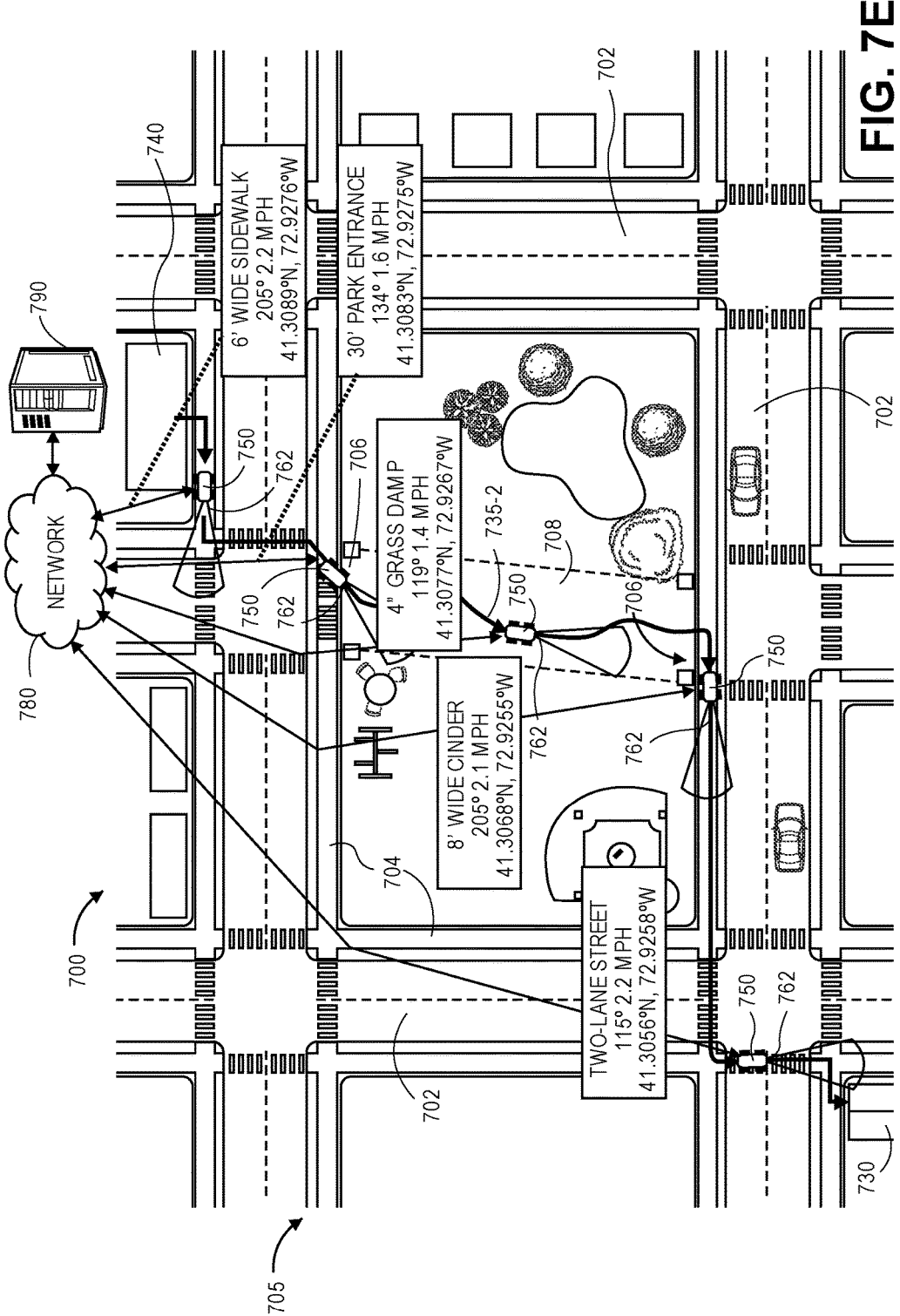

NAVIGABLE PATH NETWORKS FOR AUTONOMOUS VEHICLES

BACKGROUND

Currently, a number of mathematical or statistical modeling methods may be used to predict a most efficient route between two known points of a network, according to one or more algorithms, functions or techniques. Such methods, which are sometimes called "shortest path" methods, are effective when predicting routes for vehicles having similar and substantially nominal capacities (e.g., operating speeds, delivery capacities, available power and fuel sources) to travel within a modern, reliable ground-based network. In particular, such methods may predict an optimal path for travel by automobile between two known points, viz., an origin and a destination, by representing the origin and the destination, and, optionally, one or more intervening waypoints, as nodes (or hubs) in a network. Estimates of costs or time for travel between the origin and the destination within the network may be obtained where intrinsic and extrinsic factors associated with such travel may be predicted with acceptable degrees of accuracy or precision.

Most path modeling systems and methods are ineffective or unhelpful, however, in environments where transportation networks include a number of non-traditional features. For example, while path modeling techniques may effectively predict a time for travel by automobile on a roadway network, or by train on a rail network, such techniques are less effective at predicting times for travel using vehicles such as bicycles, carts or robots that may travel on a variety of different surfaces or along a variety of different paths, including not only paved or unpaved roads but also on sidewalks or trails, or across lawns, plazas, parks, or the like, regardless of whether such surfaces or paths are component parts of paths of an established, static network.

Additionally, most path modeling techniques are typically unable to quickly adapt to changes in physical structure or architecture of any of the paths of a network, including the availability of new paths or the unavailability of previously existing paths, or to update predictions of optimal paths accordingly. At best, the only variables considered by typical path modeling techniques in selecting a route between two points in a network are prevailing or predicted travel times or speeds along paths of the network. Travel times or speeds are symptoms of real-time, unpredictable maladies such as weather conditions, accidents or congestion within the network, however, and are neither indicative of the actual maladies themselves nor determinative as to when such maladies may subside or otherwise be resolved.

Moreover, traditional path modeling techniques also fail to consider operational or functional capacities of a vehicle, such as standard or maximum operating speeds, power levels, ranges or other factors, when selecting or recommending a route between two points of a network or predicting a travel time between such points. Such techniques typically assume that all vehicles will travel at the maximum allowable speeds on paths within a network, as defined or capped by any regulatory limits such as speed limits, and do not consider whether or when a vehicle may run out of fuel or otherwise reach a maximum range. In this regard, traditional path modeling techniques treat a sedan in the same manner as a motor scooter or an eighteen-wheeler, despite their substantial differences in available power or carrying capacities, and assume that each of such vehicles has access to a limitless supply of fuel. Likewise, because traditional path modeling techniques do not consider the specific attributes of a vehicle when selecting or recommending a route or predicting a travel time, such techniques further fail to consider whether a given path of a network may accommodate a given vehicle, i.e., whether the dimensions and mass of the vehicle will actually fit on the path, as most vehicles on the road today have common dimensions such as widths.

BRIEF DESCRIPTION OF THE DRAWINGS

FIGS. 7A through 7E are views of aspects of one system including a navigable path network in accordance with embodiments of the present disclosure.

DETAILED DESCRIPTION

Figure 1A:
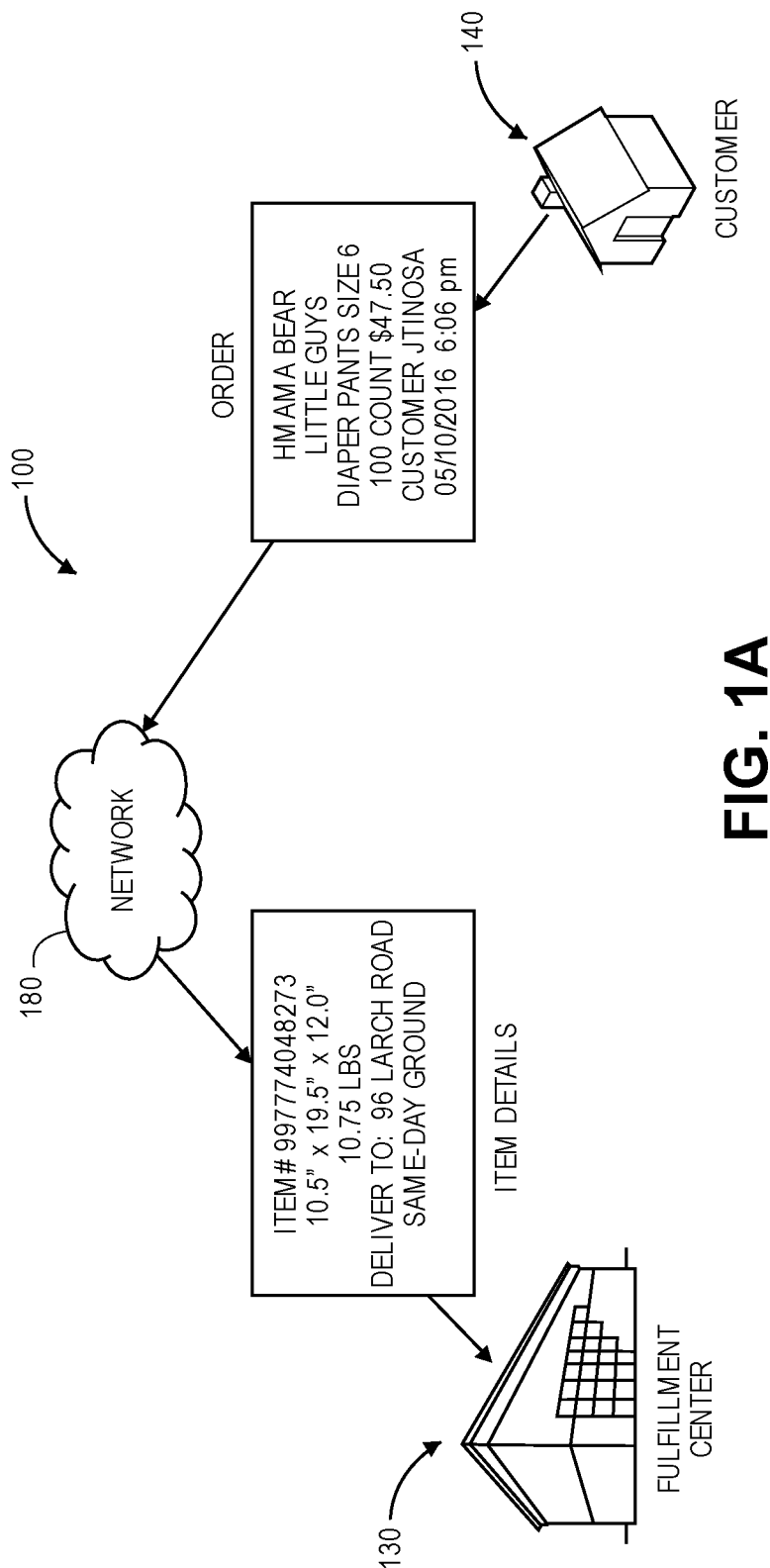
FIGS. 1A through 1F are views of aspects of one system including a navigable path network in accordance with embodiments of the present disclosure.

As is set forth in greater detail below, the present disclosure is directed to navigable path networks. More specifically, the systems and methods disclosed herein are directed to defining navigable path networks for use by an autonomous vehicle having a predefined set of dimensions or attributes, or a fleet of autonomous vehicles having any number of sets of dimensions or attributes. A navigable path network of the present disclosure may be associated with a geographic area or environment, and may include a plurality of points corresponding to individual locations within the geographic area or environment. A navigable path network may also include paths between pairs of such points that correspond to traditional transportation infrastructure features such as streets, sidewalks, bridges, bicycle or walking paths, trails or other passable features, as well as accessible public or private spaces such as parks, fields, forests, lots, clearings or other spaces that are not traditionally used for transportation, but may safely accommodate the travel of one or more autonomous vehicles.

The navigable path networks of the present disclosure may be defined based on any number or type of relevant factors, including but not limited to dimensions or attributes of a specific autonomous vehicle, dimensions or other attributes of an area or an environment in which a navigable path network is located, dimensions or other attributes of each of the respective points of the navigable path network or paths connecting such points, or attributes of a specific mission or task to be performed by the vehicle while traveling between the two or more of the points of the navigable path network. For example, a navigable path network for delivering items between two or more locations within a geographic area or environment may be defined based on the heights, widths, lengths or weights of one or more vehicles, or the respective carrying capacities (e.g., depths, widths or lengths of storage areas on such vehicles) of such vehicles, as well as any other relevant intrinsic or extrinsic factors regarding any of the paths between any of the points corresponding to such locations, including but not limited to a time at which travel upon the navigable path network by one or more autonomous vehicles is desired.

Moreover, navigable path networks of the present disclosure may be defined or updated, e.g., in real time or in near-real time, based on information or data regarding any relevant attributes or factors of a geographic area or environment in which the navigable path networks are provided. For example, as new paths between two or more of the points of a network are identified as having opened, or as capacities of existing paths of the network are determined to have expanded, the navigable path networks may be modified accordingly. Likewise, as existing paths between two or more of the points of a network are identified as having been closed, or as capacities of existing paths are determined to have been reduced, the navigable path networks may be modified accordingly. Changes to navigable path networks may be driven by natural or artificial causes, e.g., short-term or long-term changes to environments in which a navigable path network is located due to new construction, weather events or temporary congestion, or for any other reason.

The information or data upon which a navigable path network is defined or updated may be obtained by any means, including but not limited to sensors provided on one or more autonomous vehicles traveling within a geographic area or environment in which the navigable path network is located, e.g., along one or more established paths of the navigable path network, or in regions of the geographic area or environment that have not been associated with any paths of the navigable path network. In some embodiments, autonomous vehicles may be outfitted with any number of sensors (e.g., Global Positioning Satellite, or GPS, receivers, digital cameras or other imaging devices, speedometers, inclinometers, compasses, altimeters, gyroscopes or scanners. An autonomous vehicle traveling on a route within a navigable path network may be configured to capture information or data regarding conditions within an environment in which the navigable path network is provided using one or more of such sensors, and to utilize such information or data to continuously evaluate the route on which the autonomous vehicle is traveling, or to update one or more paths within the navigable path network. For example, the autonomous vehicle may use such information or data to modify the route on which the autonomous vehicle is traveling, e.g., by adding or removing one or more of the paths within the route, or by updating estimated times of arrival at a destination or one or more intervening waypoints within the route.

Alternatively, the autonomous vehicle may transmit such information or data to a central vehicle monitoring system that is in communication with one or more of a fleet of autonomous vehicles. The central vehicle monitoring system may be configured to define a navigable path network based on such information or data, select one or more optimal routes for a given autonomous vehicle within the navigable path network, or generate or update paths within the navigable path network. The central vehicle monitoring system may be located in a physical location within the environment in which the navigable path network is provided, or in one or more alternate or virtual locations, e.g., in a "cloud"-based environment. Additionally, the various paths of a navigable path network may be generated or updated based on information or data obtained from one or more extrinsic sources, including but not limited to satellite imagery, traffic or weather data, news reports, or any networked computer systems.

Referring to FIGS. 1A through 1F, views of aspects of one system 100 including a navigable path network 105 in accordance with embodiments of the present disclosure are shown. As is shown in FIG. 1A, a customer 140 may place an order for an item (e.g., a box of diapers) to be delivered from a fulfillment center 130 (or a distribution center or other source for distributing one or more items) over a communications network 180, which may include the Internet in whole or in part. For example, the customer 140 may place an order with an electronic marketplace by visiting a web page or using a dedicated shopping application operating on a computer device such as a smartphone, a tablet computer or a laptop computer, and providing information regarding the item and the customer 140 (e.g., a brand name or other identifier of the item, a quantity or price of the item, a name of the customer 140, or a date or time of the order) to the electronic marketplace. Subsequently, the electronic marketplace may provide specific details regarding the item and the order (e.g., an identifier of the item, as well as dimensions and/or masses of the item, and instructions for delivering the item) to the fulfillment center 130, e.g., a source of the item, with instructions to deliver the item to the customer 140.

Figure 1B:
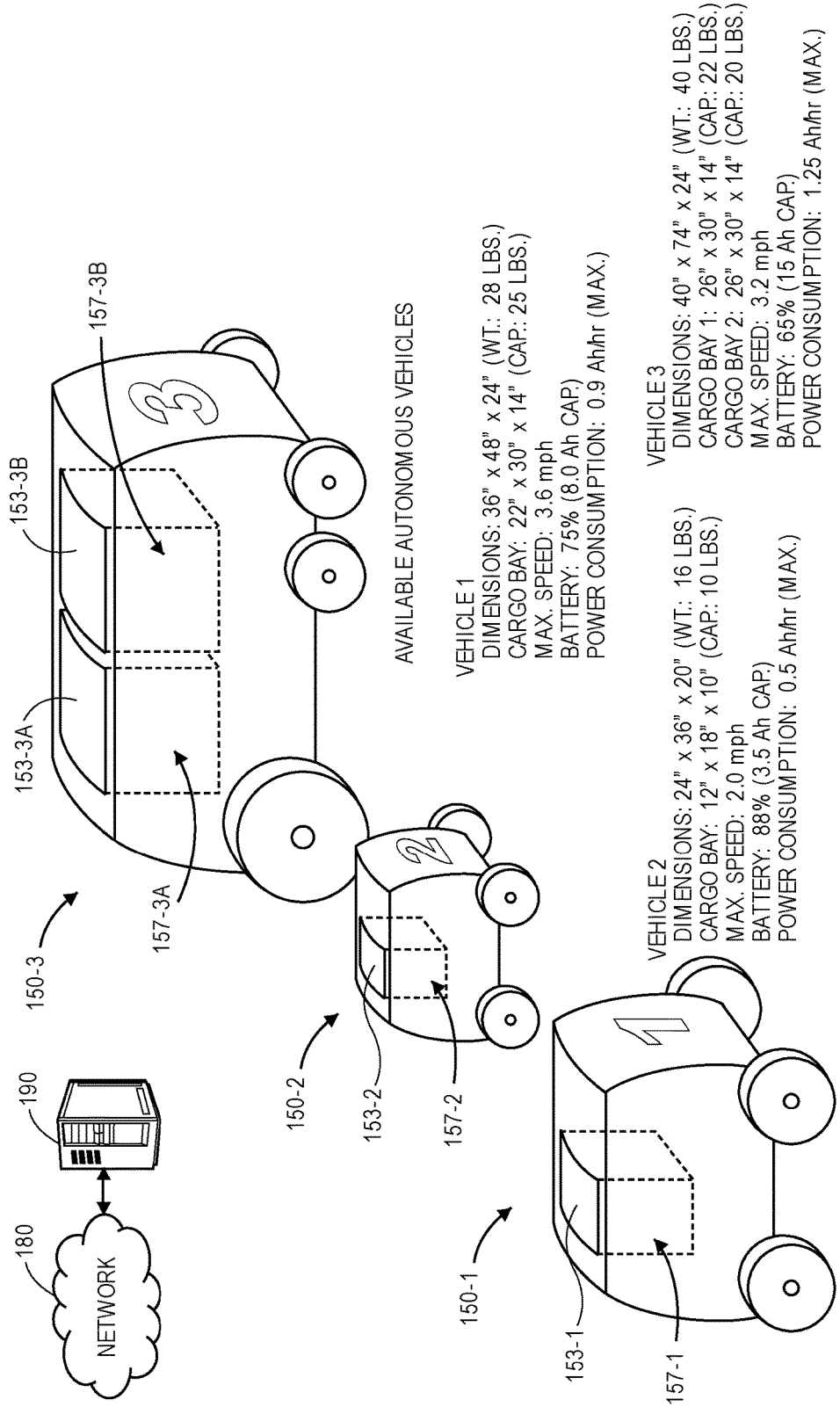

As is discussed above, navigable path networks of the present disclosure may be utilized by one or more autonomous vehicles in the performance of any mission or task, including but not limited to the delivery of items between locations corresponding to two or more points of such networks. Referring to FIG. 1B, a plurality of autonomous vehicles 150-1, 150-2, 150-3 are shown. As is shown in FIG. 1B, each of the autonomous vehicles 150-1, 150-2, 150-3 includes a number of different dimensions, operating features or other attributes. For example, the autonomous vehicle 150-1 has a thirty-six inch (36") height, a forty-eight inch (48") length and a twenty-four inch (24") width, and a weight of twenty-eight pounds (28 lbs.). The autonomous vehicle 150-1 includes a single cargo bay (or other storage compartment) 157-1 that is covered by a hinged door 153-1. The cargo bay 157-1 has a twenty-two inch (22") depth, a thirty inch (30") length and a fourteen inch (14") width, and may carry a maximum weight of twenty-five pounds (25 lbs.). Additionally, the autonomous vehicle 150-1 has a maximum speed of 3.6 miles per hour (mph) and includes a battery having a maximum charge of eight ampere-hours (8.0 Ah) that is presently charged to seventy-five percent (75%) of capacity.

Likewise, the autonomous vehicle 150-2 is smaller than the autonomous vehicle 150-1, and has a twenty-four inch (24") height, a thirty-six inch (36") length and a twenty inch (20") width, and a weight of sixteen pounds (16 lbs.). The autonomous vehicle 150-2 also includes a single cargo bay 157-2 that is covered by a hinged door 153-2. The cargo bay 157-2 has a twelve inch (12") depth, an eighteen inch (18") length and a ten inch (10") width, and may carry a maximum weight of ten pounds (10 lbs.). Additionally, the autonomous vehicle 150-2 has a maximum speed of 2.0 miles per hour (mph) and includes a battery having a maximum charge of three and one half ampere-hours (3.5 Ah) that is charged to eighty-eight percent (88%) of capacity. The autonomous vehicle 150-3 is larger than either the autonomous vehicle 150-1 or 150-2, and has a forty inch (40") height, a seventy-four inch (74") length and a twenty-four inch (24") width, and a weight of forty pounds (40 lbs.). The autonomous vehicle 150-3 includes a pair of cargo bays 157-3A, 157-3B, each of which is covered by a hinged door 153-3A, 153-3B. The cargo bay 157-3A has a twenty-six inch (26") depth, a thirty inch (30") length and a fourteen inch (14") width, and may carry a maximum weight of twenty-two pounds (22 lbs.), while the cargo bay 157-3B also has a twenty-six inch (26") depth, a thirty inch (30") length and a fourteen inch (14") width, and may carry a maximum weight of twenty pounds (20 lbs.). Additionally, the autonomous vehicle 150-3 has a maximum speed of 3.2 miles per hour (mph) and includes a battery having a maximum charge of fifteen ampere-hours (15 Ah) that is charged to sixty-five percent (65%) of capacity.

Figure 1C:
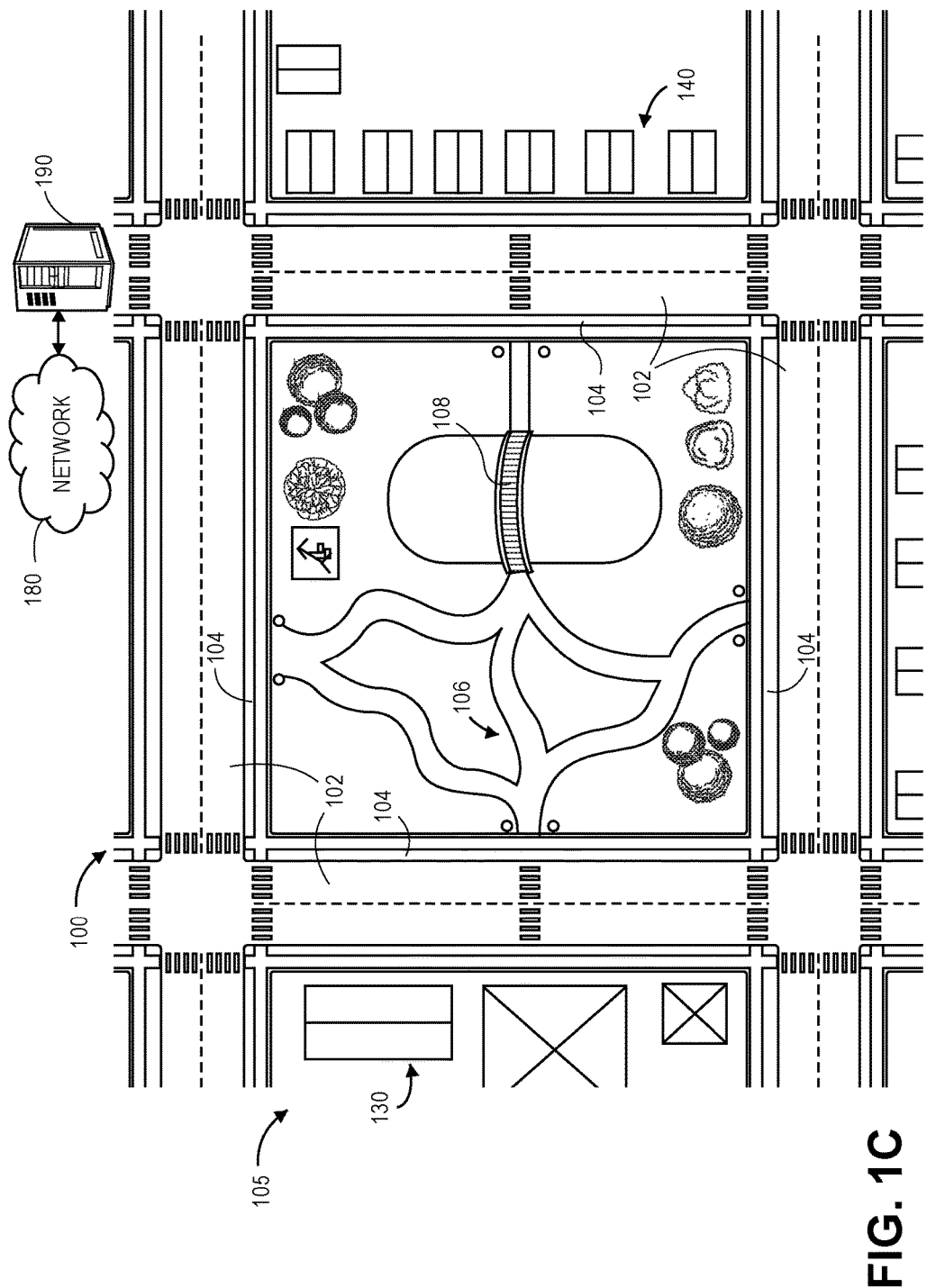

Referring to FIG. 1C, the navigable path network 105 is shown. The navigable path network 105 includes a location of the fulfillment center 130 of the item and a location of the customer 140, as well as a number of natural and artificial features over which one or more of the autonomous vehicles 150-1, 150-2, 150-3 may travel, including but not limited to a plurality of streets 102, a plurality of sidewalks 104 alongside the streets 102, a plurality of pathways 106 (e.g., bicycle or walking paths or trails) passing through a park and a bridge 108 over a body of water in the park. The natural and artificial features of the navigable path network 105 thus define a number of paths between points of the navigable path network 105, e.g., the fulfillment center 130 and the customer 140, with each of the paths having a number of different attributes, and each of such attributes may be considered in determining a capacity for accommodating one or more of the autonomous vehicles 150-1, 150-2, 150-3 in the performance of any number of missions or tasks.

Figure 1D:
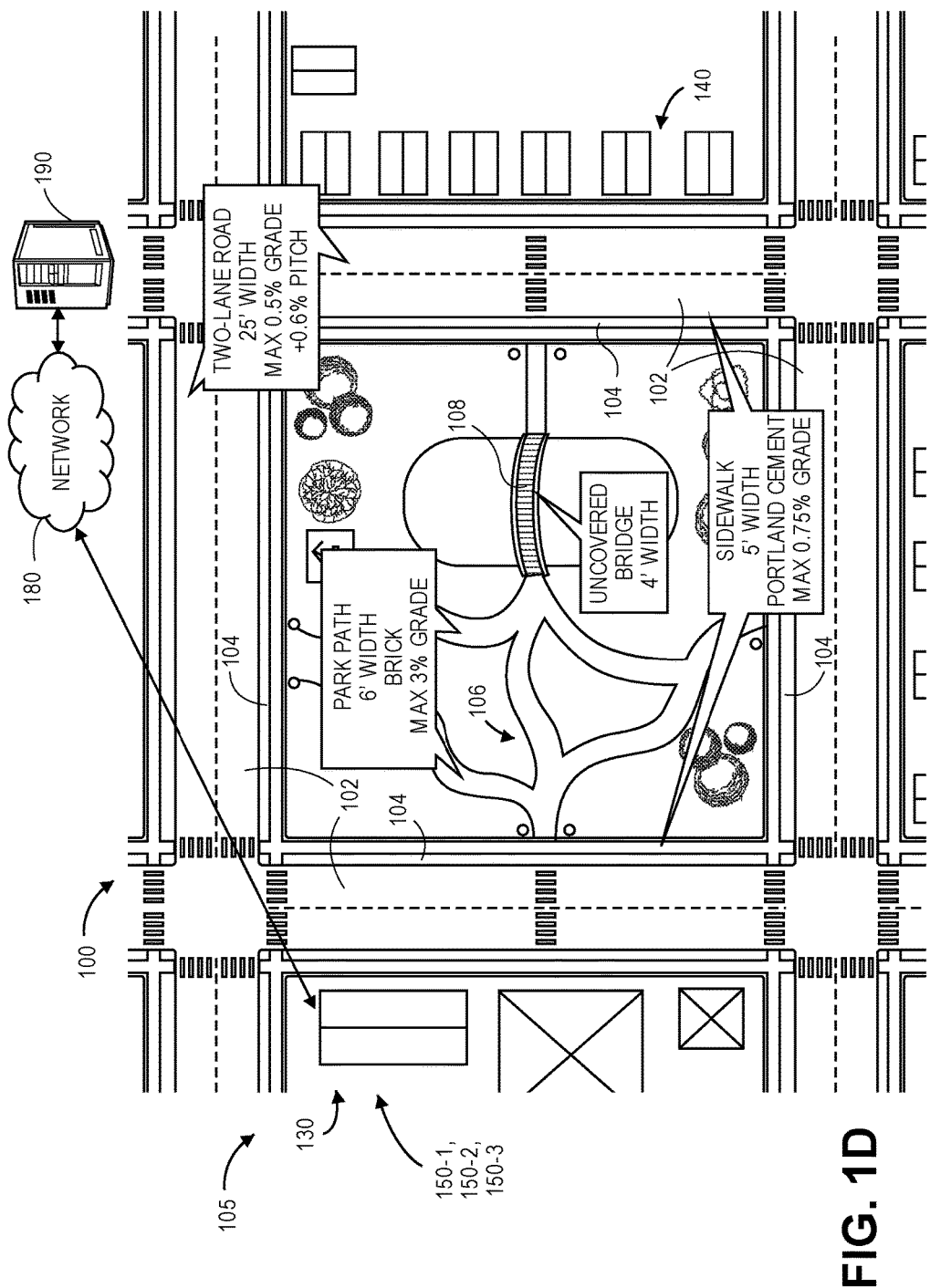

Attributes of the various paths of the navigable path network 105 may be maintained in a vehicle monitoring system 190 that is connected to the communications network 180, and communicated with the fulfillment center 130 and/or one or more of the autonomous vehicles 150-1, 150-2, 150-3. Upon receiving the order from the customer 140, attributes of the various paths extending between the fulfillment center 130 and the customer 140 may be provided to computer devices associated with the fulfillment center 130 and/or one or more of the autonomous vehicles 150-1, 150-2, 150-3 over the communications network 180. Referring to FIG. 1D, the streets 102 identified as having two lanes and are twenty-five feet (25') wide, with a maximum grade of 0.5%, and a 0.6% pitch. As is also shown in FIG. 1D, the sidewalks 104 are identified as having widths of five feet (5') and are formed from Portland cement, with a maximum grade of 0.75%. The pathways 106 are identified as having widths of six feet (6') and are formed from bricks, with a maximum grade of three percent (3%), while the bridge 108 is identified as having a width of four feet (4').

Figure 1E:
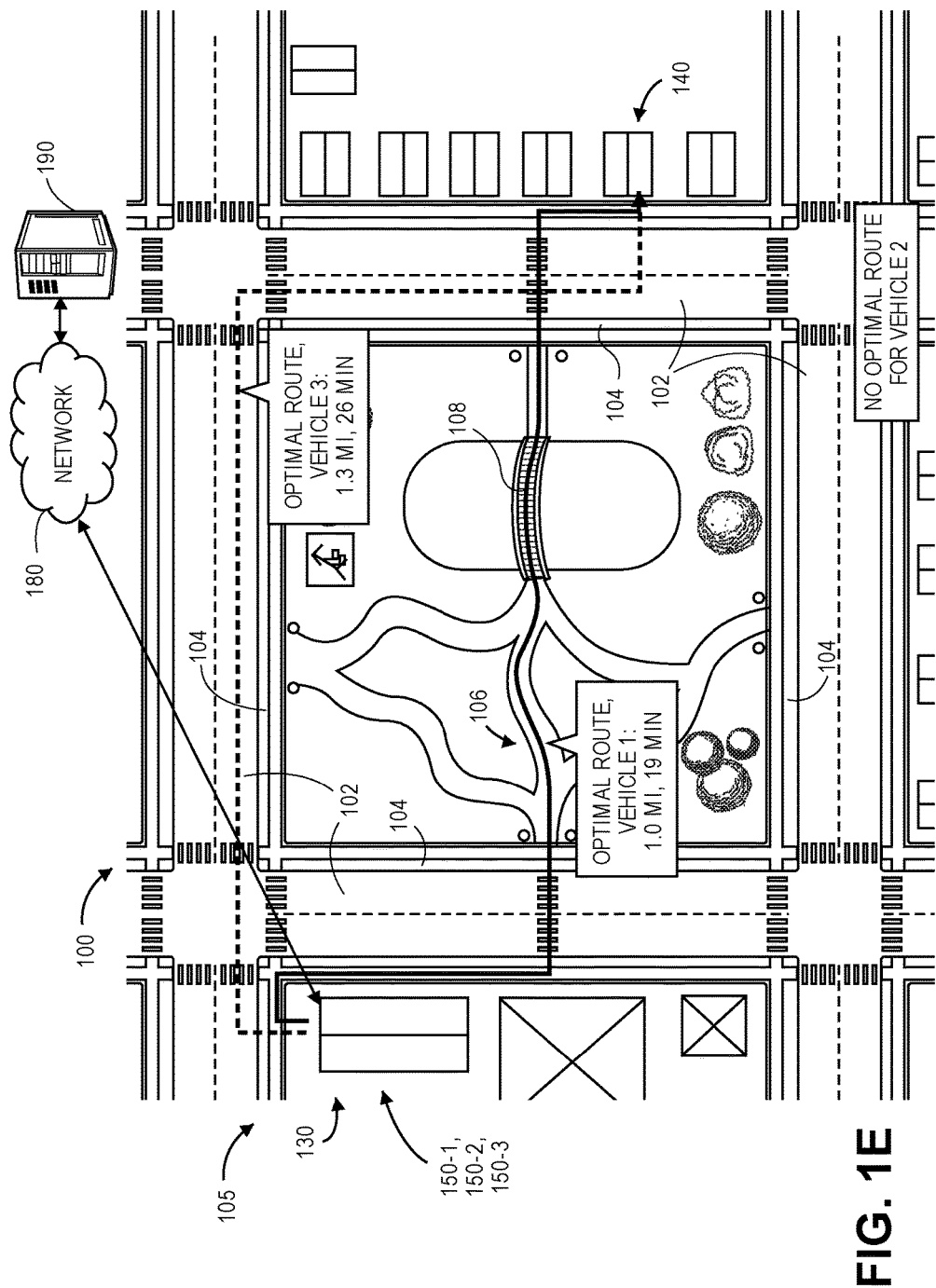

Based on the attributes of each of the features of the navigable path network 105, including but not limited to features of the streets 102, the sidewalks 104, the pathways 106 and/or the bridge 108, optimal routes for the delivery of the ordered item by each of the autonomous vehicles 150-1, 150-2, 150-3 may be determined by the vehicle mentoring system 190 and provided to one or more of the computer devices associated with the fulfillment center 130 and/or one or more of the autonomous vehicles 150-1, 150-2, 150-3. Referring to FIG. 1E, an optimal route 135-1 for the autonomous vehicle 150-1 is shown as beginning at the source 130, crossing one of the streets 102 and passing along the sidewalks 104 and pathways 106, and across the bridge 108, before crossing another of the streets 102 and reaching the customer 140. The optimal route 135-1 is estimated at one mile (1.0 mi) in length, and it is projected that the autonomous vehicle 150-1 may travel from the source 130 to the customer 140 with the ordered item in approximately nineteen minutes (19 min). An optimal route 135-3 for the autonomous vehicle 150-3, which is substantially larger than the autonomous vehicle 150-1, is shown as also beginning at the source, and traveling along the streets 102 before turning toward the customer 140. The optimal route 135-3 is estimated at one and three-tenths miles (1.3 mi) in length, and it is estimated that the autonomous vehicle 150-3 may travel from the source 130 to the customer 140 with the ordered item in approximately twenty-three minutes (23 min). No optimal route is shown for the autonomous vehicle 150-2, because the dimensions of the cargo bay 157-2 are too small to accommodate the ordered item. Alternatively, the optimal routes 135-1, 135-2 for the autonomous vehicles 150-1, 150-2 may be identified, or a determination that no optimal route exists for the autonomous vehicle 150-2 may be made, by one or more of the computer devices associated with the fulfillment center 130 and/or one or more of the autonomous vehicles 150-1, 150-2, 150-3.

Figure 1F:
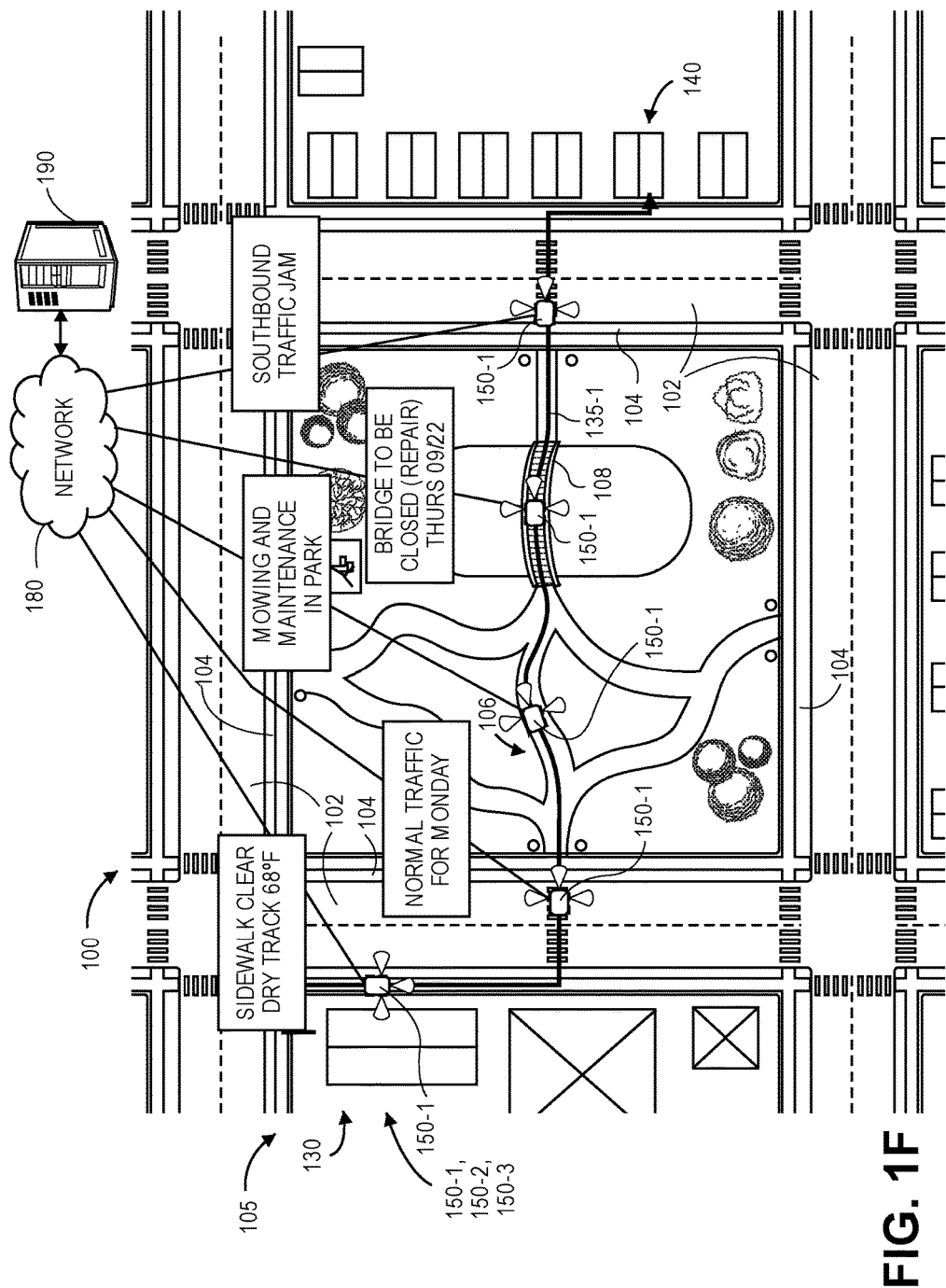

Referring to FIG. 1F, after the optimal routes 135-1, 135-3 for each of the autonomous vehicles that are capable of performing a mission or a task (e.g., delivering the ordered item from the source 130 to the customer 140) have been determined, the autonomous vehicle 150-1 is selected to deliver the ordered item along the optimal route 135-1. The autonomous vehicle 150-1 may be programmed with one or more sets of computer instructions for causing the autonomous vehicle 150-1 to embark upon the optimal route 135-1 from the fulfillment center 130 by traveling along and across one of the streets 102, entering the park on one or more of the pathways 106, crossing the body of water on the bridge 108, existing the park and crossing another of the streets 102 before reaching the customer 140, or, alternatively, a destination designated by the customer 140, at one or more predetermined speeds. Such instructions may be furnished to the autonomous vehicle 150-1 by one or more computer devices associated with the fulfillment center 130, or by the vehicle monitoring system 190, or may be autonomously generated by one or more computer devices associated with the autonomous vehicle 150-1 itself.

As is shown in FIG. 1F, while the autonomous vehicle 150-1 is en route to the customer 140, the autonomous vehicle 150-1 may evaluate its surroundings using one or more sensors, e.g., by capturing imaging data or other information regarding weather, traffic, accessibility or any other relevant factors. The autonomous vehicle 150-1 may be configured to report information or data regarding its transit from the fulfillment center 130 to the customer 140 to the vehicle monitoring system 190, to one or more computer devices associated with the fulfillment center 130, or to one or more other autonomous vehicles (e.g., the autonomous vehicles 150-2, 150-3) over the network 180. Such information or data may be reported synchronously or asynchronously, on a continuous or segmented basis, e.g., in real time, in near-real time, or in one or more batch processes, or in any other manner. Upon reaching the customer 140, the autonomous vehicle 150-1 may deposit the ordered item in a predetermined location or otherwise enable the customer 140 to access the ordered item.

After completing a delivery of the ordered item to the customer 140, the autonomous vehicle 150-1 may then return to the fulfillment center 130 along any desired route, or by way of any number of intervening waypoints. For example, the autonomous vehicle 150-1 may return to the fulfillment center 130 along the optimal route 135-1, but in reverse, or on one or more other routes between the customer 140 and the fulfillment center 130, which may be selected on any basis. Alternatively, the autonomous vehicle 150-1 may transition from a delivery mode to an exploratory mode, and may be configured to search for one or more alternate or potential paths within the area where the navigable path network 105 is provided. The autonomous vehicle 150-1 may report information or data regarding the area to the vehicle monitoring system 190, to one or more computer devices associated with the fulfillment center 130, or to one or more other autonomous vehicles (e.g., the autonomous vehicles 150-2, 150-3) over the network 180, such as is shown in FIG. 1F, or may upload any relevant information or data to one or more servers or other computer devices upon which the navigable path network 105 is hosted, upon its arrival at the fulfillment center 130.

Information or data captured by the autonomous vehicle 150-1 regarding its transit from the fulfillment center 130 to the customer 140, or from the customer 140 to the fulfillment center 130 may be used to update the navigable path network 105, e.g., by adding one or more new paths to the navigable path network 105, by removing one or more existing paths from the navigable path network 105, or by updating relevant information or data concerning an existing path within the navigable path network 105. Information or data captured by the autonomous vehicle 150-1 may also be utilized by one or more other autonomous vehicles (e.g., the autonomous vehicles 150-2, 150-3) that are in transit, e.g., in the process of delivering items or traveling between two or more points of the navigable path network 105 for any reason, or in selecting routes to be traveled by such autonomous vehicles in the future.

Currently, humans utilize ground-based transportation networks for travel on foot or in one or more motorized or non-motorized vehicles such as bicycles or automobiles. Although automobiles appeared first as a novelty item for the wealthy, the production of automobiles began in earnest in the United States following the turn of the 20th Century, and became accessible to the middle class by the 1910s, when Henry Ford and other industrial pioneers implemented innovative mass-production techniques such as assembly lines, enabling the low cost, mass production of cars and trucks for personal use. After the growth of the American automobile industry was slowed by World War II, and accelerated by post-war developments such as the Eisenhower Interstate Highway System, Americans began traveling freely throughout each of the fifty states in a variety of vehicles on efficient road networks comprised of wide, structurally sound roadways and bridges.

Today, most automobiles have widths ranging from about six feet (e.g., for a small coupe such as a Honda Civic) to about eight-and-one-half feet (e.g., the maximum width of an eighteen-wheeler in the United States). For this reason, roads are typically constructed with standard lane widths of typically nine to twelve feet each, in order to accommodate nearly every automobile that is in use today, and with any desired length. Additionally, surfaces of such roads may be formed from standard materials such as asphalt, concrete, cement, gravel, cobblestone or dirt, or any other suitable materials (e.g., metal or wood).

Roads may also be utilized by pedestrians and other non-motorized vehicles, in addition to automobiles. For example, pedestrians and human-powered vehicles, such as bicycles, may walk, jog or bike on sidewalks or other paths that may be formed from some of the same materials as roads, including but not limited to asphalt, concrete, cement, gravel, cobblestone or dirt. Sidewalks or other paths are commonly found along one or both sides of many streets, or traversing through or around public or private spaces or facilities.

Despite the fundamental differences between travel by automobile or other motorized vehicles, travel by human-powered or non-motorized vehicles, or travel on foot, each of the modes suffers from similar problems in terms of reliability and efficiency. For example, while automobiles such as cars or trucks are sufficiently versatile to drive on various types of roadways including expressways, streets or driveways, the speed by which a car or a truck may travel is limited by the capacity of such roadways, as well as any associated regulatory restrictions (e.g., speed limits) or traffic conditions existing thereon. While each such mode of transport may accommodate both passengers and cargo to travel thereon, transportation on all modes may be slowed or halted by incidents of varying degrees. To a certain extent, a transportation network that is clogged by one participant, e.g., a traffic accident on a roadway, or construction on a sidewalk in a park, is frequently clogged to all participants.

Conversely, while roadways and other transit paths are typically designed to accommodate a maximum theoretical capacity of vehicle or foot traffic, many roadways and transit paths are used at less than a maximum capacity, or remain entirely unused, at many other times of a day. For example, roadways, sidewalks and bike paths are commonly flush with traffic during "rush hour," or twice-daily periods of near-peak congestion usually occurring before and after traditional working hours, as well as other scheduled or unscheduled events or occurrences such as sporting events, "move-in" days at colleges or universities, or fairs or festivals. The same roadways, sidewalks and bike paths that are packed with vehicles or persons during "rush hour" or other peak periods may remain sparsely used, or entirely unused, during off-peak periods, e.g., on weekends, during overnight periods, or at other times.

Where a transportation network includes a plurality of points or nodes corresponding to locations that are connected by one or more paths extending therebetween, an optimal route (or a shortest route), between two or more of the points of the transportation network may be determined according to one or more algorithms, formulas or techniques. Using points or nodes corresponding to locations of an origin and a destination within a transportation network, as well as points or nodes corresponding to locations of other points or nodes within the transportation network, and dimensions or other attributes of roadways or pathways between such points or nodes, an optimal route for traveling from the origin to the destination on the transportation network may be calculated using one or more iterations of common mathematical principles, including but not limited to Dijkstra's Algorithm, Bellman-Ford Algorithm, Floyd-Warshall Algorithm, Johnson's Algorithm or hub labeling. A path or route between two or more points of a transportation network may be defined as "shortest" or "optimal" on any basis, including but not limited to times of transit between the two or more points, economic costs, values of lost opportunities, or any other subjective or objective basis.

Additionally, such algorithms, formulas or techniques may also use any amount of geospatial information representative of locations corresponding to points or nodes, such as geolocations or street addresses of an origin or a destination, or of any other points or nodes, in determining an optimal route between the origin and the destination. For example, geospatial information regarding a location may be determined by providing a street address and/or description of the location to a geocoder (e.g., a software application and/or hardware component configured to perform geocoding techniques), and a "geolocation," or a geospatially-referenced point that precisely defines an exact position in space of the location. Geospatial information may also be ascertained from geographic information system (or "GIS") data, from information received via a GPS system, e.g., data received from one or more orbiting satellites, from information obtained using cellular telephone equipment configured to estimate (e.g., triangulate) a position from one or more cellular telephone network towers or other network sources, or from information determined by any other source. Geospatial information or other location information may be expressed in a two-dimensional Cartesian format, e.g., $(x_i, y_i)$, or latitudes and longitudes, or in a three-dimensional format, e.g., $(x_i, y_i, z_i)$ or latitudes, longitudes and altitudes, of any of such points.

Typically, most algorithms, formulas or techniques for determining an optimal route between two points of a transportation network do not consider the various features or capabilities of a vehicle that is intended to travel along the transportation network. For example, most path modeling algorithms, formulas or techniques operate under an assumption that each vehicle will travel at a maximum allowable speed on a given path of a network, subject to any speed limits or other restrictions, or at a nominal speed on the given path of the network, without regard to actual capacities of a specific vehicle. Such algorithms, formulas or techniques fail to consider whether the vehicle has the capacity to travel at or above maximum allowable or nominal speeds. Likewise, algorithms, formulas or techniques for determining an optimal route for a vehicle between two or more points of a transportation network do not consider dimensions or attributes of the vehicle such as a carrying capacity, a width or a range of the vehicle. Instead, such algorithms, formulas or techniques treat each vehicle traveling on a transportation network as if it is substantially identical, and, because most vehicles have similar dimensions such as widths, never consider whether a vehicle can actually fit on a given path of the transportation network, or why the vehicle is traveling on the transportation network, when predicting an optimal route. Furthermore, most algorithms, formulas or techniques for determining an optimal route must be specifically programmed with information regarding the addition of paths to a transportation network, or the removal of paths from the transportation network, or temporary or permanent changes to the transportation network (e.g., increases or decreases in capacities of any given path of the transportation network).

The systems and methods of the present disclosure are directed to defining, using and modifying navigable path networks for use by one or more autonomous vehicles, which may be homogenous or heterogeneous in nature. For example, the systems and methods of the present disclosure may be directed to establishing and updating navigable path networks for travel by such vehicles based on information or data regarding aspects of traditional transportation infrastructure, e.g., locations and dimensions or other attributes of roads, sidewalks, crosswalks, bicycle or walking paths, bridges or trails, or non-traditional transportation infrastructure, e.g., locations and dimensions of parks, fields, forests, lots, clearings or other spaces, as well as intrinsic or extrinsic information or data regarding prior transit on such networks by autonomous vehicles, including but not limited to dimensions or capacities of such vehicles (e.g., heights, lengths, widths, power levels, speeds, ranges or carrying volumes or weight limits), time stamps (e.g., times and positions of such vehicles at such times) when the vehicles are located at origins, destinations or one or more intervening waypoints along a given route), missions or tasks being performed by such vehicles (e.g., masses or numbers of items being delivered from an origin to a destination) or environmental conditions (e.g., prevailing traffic or weather) encountered by such vehicles during the performance of such missions or tasks. Based on such information or data, a multivariate network that considers not only dimensions or other attributes of transportation infrastructure but also capacities or other attributes of autonomous vehicles that utilize the transportation infrastructure in the performance of one or more missions or tasks.

The autonomous vehicles of the present disclosure may be vehicles having any number of wheels mounted to axles that may be rotated by one or more motors, with dimensions, masses or other indicators of size that may be selected on any basis. For example, in some embodiments, such autonomous vehicles may be sized and configured to travel on roads at various times or during various levels of congestion, and at various speeds, e.g., in response to one or more computer-based instructions. Alternatively, in other embodiments, an autonomous vehicle may be sized and configured to travel on sidewalks, crosswalks, bicycle paths, trails or the like, and at various speeds. In still other embodiments, autonomous vehicles may be configured to travel on not only roads but also sidewalks, crosswalks, bicycle paths, trails or the like, at any desired speeds.

Additionally, autonomous vehicles of the present disclosure may include a cargo bay or other storage compartment, or multiple cargo bays or storage compartments, for storing items that are being delivered from an origin to a destination. Such cargo bays or storage compartments may be used to securely maintain items therein at any desired temperature, pressure or alignment or orientation, and to protect such items against the elements. Furthermore, in some embodiments, the autonomous vehicles may include various equipment or components for determining whether a cargo bay or other storage compartment is empty or includes one or more items, or for identifying specific items that are stored therein, along with equipment or components for engaging or interacting with such items. The autonomous vehicles may also include one or more display screens (e.g., touch-screen displays, scanners, keypads) having one or more user interfaces for displaying information regarding such vehicles or their contents to humans, or for receiving interactions (e.g., instructions) from such humans, or other input/output devices for such purposes.

Moreover, the autonomous vehicles of the present disclosure may include any number of sensors such as position sensors (e.g., Global Positioning Satellite, or GPS, receivers), imaging sensors (e.g., digital cameras or other imaging devices) or other sensors, including but not limited to speedometers, inclinometers, compasses, altimeters, gyroscopes or scanners. The autonomous vehicles of the present disclosure may also include communications equipment (e.g., wired or wireless means for communication such as components or systems operating Wireless Fidelity, or WiFi, Bluetooth, near-field communications or cellular technologies or protocols), along with one or more power modules (e.g., batteries), which may be rechargeable, refuelable or replaceable in nature. Information or data obtained or determined by such sensors or such communications equipment may be utilized in manually or automatically controlling an autonomous vehicle, e.g., in causing the autonomous vehicle to travel along paths of a navigable path network, to search for alternate paths, or to avoid expected or unexpected hazards encountered by the autonomous vehicle within the navigable path network. The autonomous vehicles of the present disclosure may further include any number of computer components (e.g., processors, data stores, transceivers or input/output devices) for performing any of the functions or accomplishing any of the missions or tasks described herein.

Once a navigable path network of the present disclosure has been defined, the navigable path network may be utilized by any number of autonomous vehicles for the performance of any number of missions or tasks that require travel to or from any point within the network, or between two or more points of the network. An optimal route for performing a task that requires travel between points of the navigable path network using one or more autonomous vehicles (e.g., a delivery of an item) may be selected on any basis, including but not limited to attributes of the task, attributes of the individual paths between points of the network, or attributes of the autonomous vehicle that has been to perform the task. For example, where an item is to be delivered from an origin to a destination via a navigable path network by one of a fleet of autonomous vehicles, an autonomous vehicle may be selected based on a size of the item (e.g., dimensions as heights, widths or lengths of the item, or a mass of the item), and a path from the origin to the destination may be selected based on the autonomous vehicle that is selected.

For example, where an autonomous vehicle has a width of four feet (4'), or forty-eight inches (48"), the autonomous vehicle may only travel within the navigable path network along paths that may safely accommodate vehicles of four-foot (or forty-eight inch) widths, plus additional safety margins on any number of sides of the vehicles. An optimal route within the navigable path network that may accommodate autonomous vehicles having four-foot (or forty-eight inch) widths may be selected accordingly, e.g., according to one or more path modeling algorithms, formulas or techniques. An autonomous vehicle having a width of three feet (3'), or thirty-six inches (36"), may potentially travel along a greater number of paths than an autonomous vehicle having a four-foot (or forty-eight inch) width, however, and a wider array (or larger number) of alternative paths may be considered by one or more algorithms, formulas or techniques in identifying an optimal route from the origin to the destination for the narrower autonomous vehicle.

In addition to widths, any number of other attributes of an autonomous vehicle or an environment in which the navigable path network is located may be utilized in determining an optimal route from an origin to a destination within the navigable path network for the autonomous vehicle. For example, an optimal route may be determined based on a vehicle's length or height (e.g., with respect to turn radii, coverings or other features of a given path), maximum speed, range, carrying capacity (e.g., both volume and weight), available battery charge, efficiency, number of wheels, tire diameter, tire tread, or any number of other factors. Likewise, an optimal route within an area may also be determined based on slopes (e.g., grades or pitches of roads, sidewalks or other features), turn radii, coverings (e.g., whether a given path is covered or uncovered), surface composition (e.g., whether an area is paved or unpaved), surface conditions (e.g., whether the area is wet, dry or covered with ice or snow), weather (e.g., whether the area is experiencing precipitation, heat, cold, wind or any other adverse conditions), congestion (e.g., whether the area is experiencing any abnormally high or low levels of foot or vehicle traffic) or any number of other factors.

Furthermore, when two or more autonomous vehicles are capable of performing a task via a navigable path network, an autonomous vehicle for performing the task, and an associated optimal route to be traveled by the autonomous vehicle in performing the task, may be selected based not only on attributes of the task but also attributes of any other missions or tasks for which the performance may be required. For example, where any of a plurality of autonomous vehicles is capable of performing a task (e.g., delivering an item from an origin to a destination), the autonomous vehicle having the lowest battery charge of the capable autonomous vehicles may be selected, in order to preserve the other autonomous vehicles for performing other missions or tasks that may require greater levels of battery charge.

The navigable path networks of the present disclosure may also be updated based on intrinsic or extrinsic information or data that may be determined regarding the availability of one or more new or existing paths, or the capacity of such paths to accommodate travel thereon. In particular, a navigable path network may be updated based on information or data captured by sensors mounted to one or more autonomous vehicles traveling on routes extending between two or more of the points of the navigable path network. For example, an autonomous vehicle may capture information or data regarding itself or its transit (e.g., courses, speeds, accelerations, angles of orientation such as a yaw angle, a pitch angle or a roll angle about longitudinal, lateral or transverse axes), surface conditions (e.g., whether the surfaces are wet, dry, icy, sandy, muddy or in any other condition affecting an autonomous vehicle's ability to operate under power in a forward direction or a reverse direction, or to change course), dimensions (e.g., widths or lengths of surface paths, as well as heights to one or more overhead obstructions), congestion and/or traffic (e.g., numbers or speeds of any other vehicles, pedestrians or other objects along one or more paths of the navigable path network), weather conditions (e.g., temperatures, wind speeds, cloud cover, types or amounts of precipitation) or any other indicators or factors contributing to a determination of capacity of one or more paths between two or more points of the navigable path network for a specific autonomous vehicle, or for two or more autonomous vehicles.

Information or data captured by autonomous vehicles may be transmitted to a central vehicle monitoring system, or to one or more other autonomous vehicles, e.g., in real time or in near-real time, over a network and utilized in modifying not only one or more paths of a navigable path network but also aspects of travel by autonomous vehicles on the navigable path network. For example, where one autonomous vehicle identifies construction activity, a traffic jam or another adverse event impacting the ability of the autonomous vehicle to complete a transit along a selected route, the autonomous vehicle may utilize information or data regarding the event to select an alternate route, and may also report the information or data to a central vehicle monitoring system or to one or more other autonomous vehicles. Such information or data may be utilized to update not only the navigable path network (e.g., capacities of various paths extending between points of the navigable path network) but also routes that are being traveled by autonomous vehicles within the navigable path network, at present or in the future. A navigable path network, or routes defined between two or more points within the navigable path network, may be updated based on any relevant information or data obtained from other sources, including but not limited to extrinsic sources that may be accessed via one or more networked computer systems.

In some embodiments, an autonomous vehicle may operate in a first mode (e.g., a delivery mode) associated with the performance of a given task, such as the delivery of an item from an origin to a destination within a navigable path network. While operating in the first mode, the autonomous vehicle's primary objective may be the complete and successful performance of the task that has been assigned thereto. Secondarily, the autonomous vehicle may capture information or data regarding its surroundings, including but not limited to imaging data (e.g., still or moving images, and any associated sounds or metadata), weather data, traffic data, topographical data or any other relevant information or data. The autonomous vehicle may also operate in a second mode (e.g., an exploratory mode), after the autonomous vehicle has completed the task, and as the autonomous vehicle prepares for the performance of another task. While operating in the second mode, the autonomous vehicle's primary objective may be to explore and evaluate its surroundings, e.g., by capturing information or data such as imaging data, and attempt to identify one or more alternate or proposed paths for addition to the network. Such alternate paths may be identified by any means, including but not limited to the evaluation of imaging data captured by the autonomous vehicle in any mode (e.g., in both a delivery mode and in an exploratory mode) at any time, or obtained from another source (e.g., imaging data captured by an operating aerial vehicle, such as a drone, or a satellite). For example, the autonomous vehicle may identify one or more areas that includes a suitably flat or wide region that may accommodate dimensions of the autonomous vehicle, determine that any of such areas includes one or more proposed paths between two or more points of the navigable path network, and attempt to travel along the region after performing a task. Secondarily, the autonomous vehicle may travel to another location in preparation for the performance of another task, e.g., the origin from which the autonomous vehicle departed prior to performing the prior task. Information or data captured by the autonomous vehicle, in any mode, may be transferred to a vehicle monitoring system and/or one or more other autonomous vehicles, and utilized for any purpose.

Figure 2A:
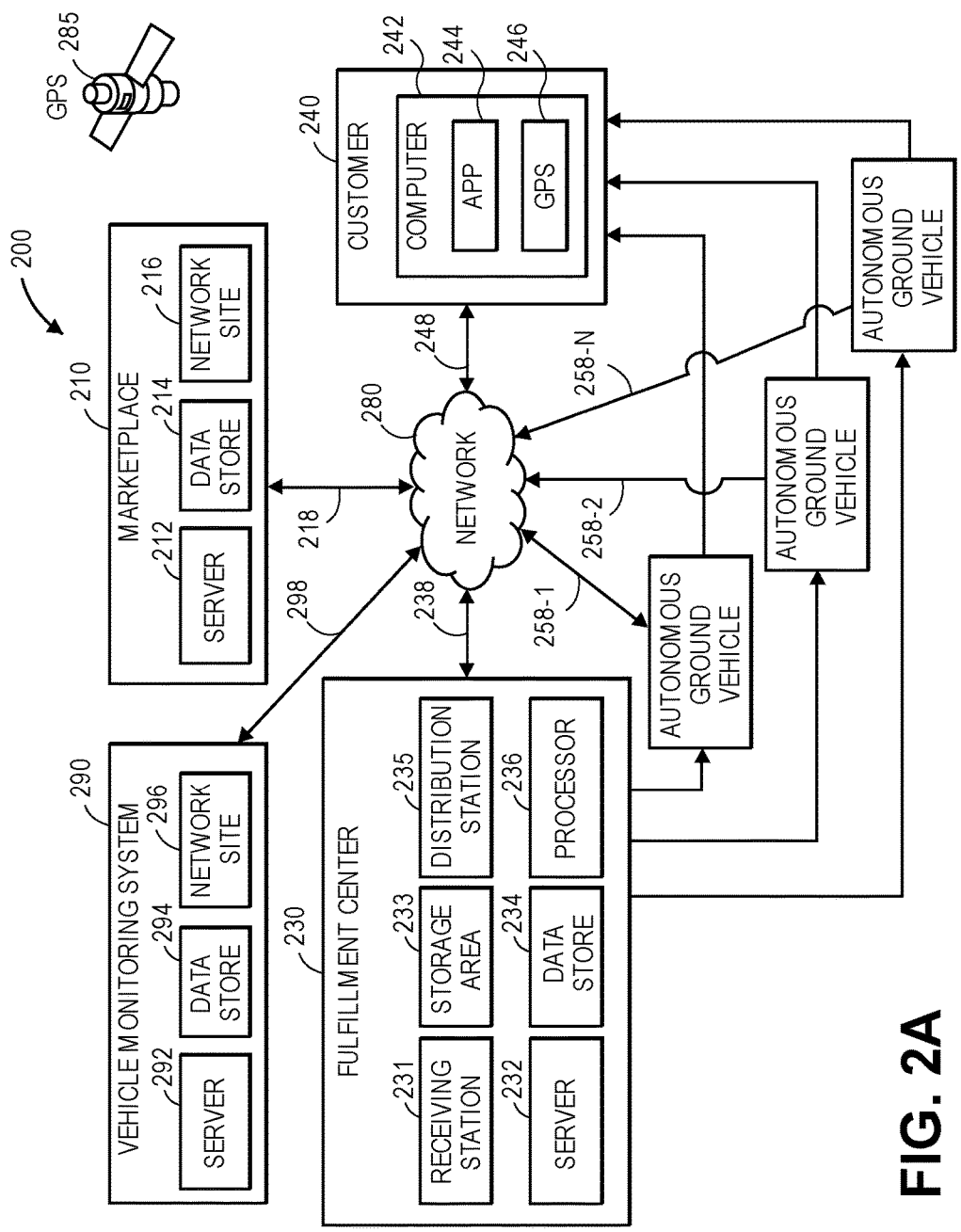
FIGS. 2A and 2B are a block diagram of components of one system including a navigable path network in accordance with embodiments of the present disclosure.
Figure 2B:
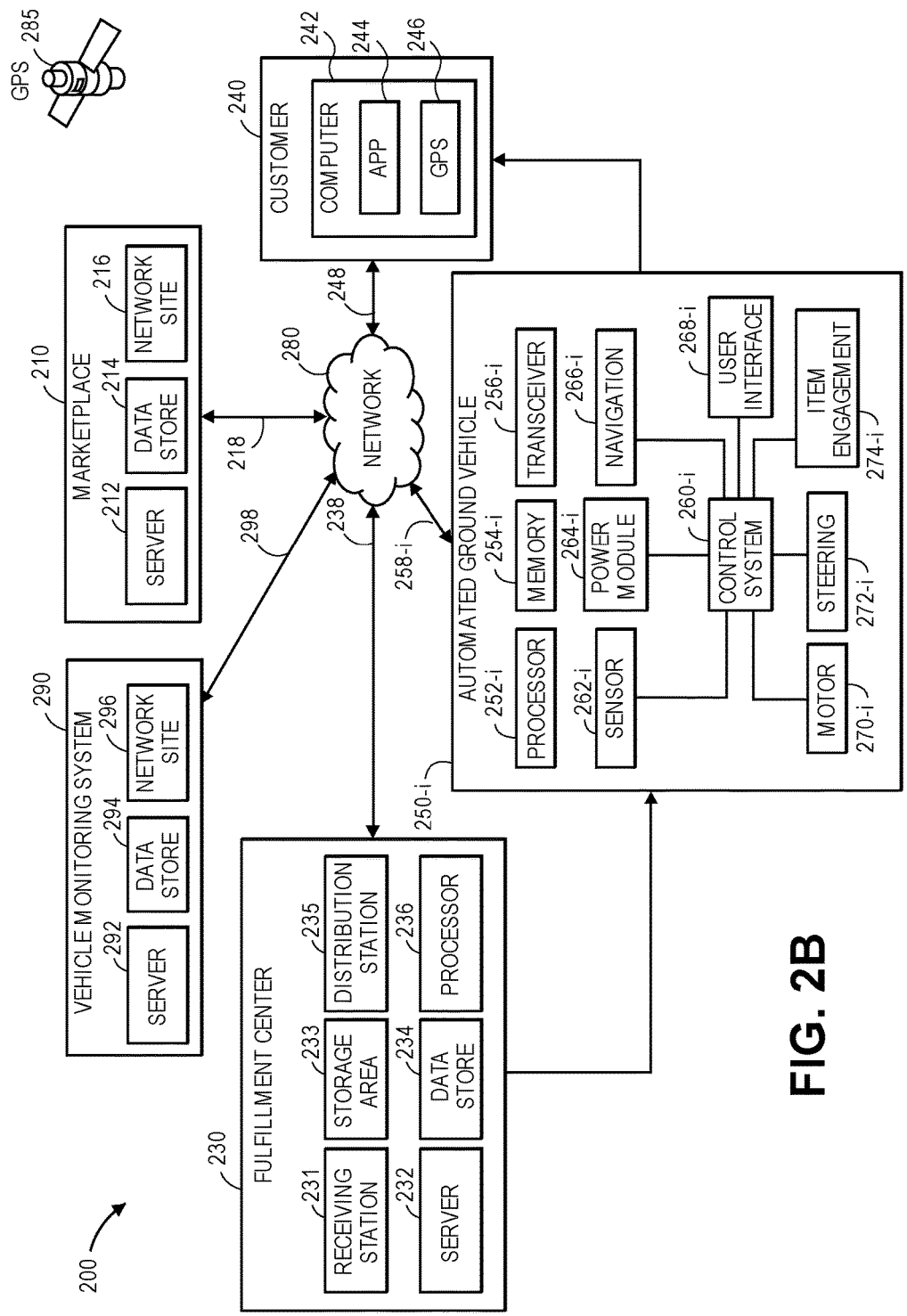

Referring to FIGS. 2A and 2B, a block diagram of components of one system 200 including a navigable path network in accordance with embodiments of the present disclosure is shown. The system 200 includes a marketplace 210, a fulfillment center 230, a customer 240, a plurality of autonomous vehicles 250-1, 250-2 . . . 250-*n* and a vehicle monitoring system 290 that are connected to one another across a communications network 280, which may include the Internet in whole or in part. Except where otherwise noted, reference numerals preceded by the number "2" in FIG. 2A or FIG. 2B refer to elements that are similar to elements having reference numerals preceded by the number "1" shown in FIGS. 1A through 1F.

The marketplace 210 may be any entity or individual that wishes to make items from a variety of sources (e.g., vendors, manufacturers, merchants or sellers) available for download, purchase, rent, lease or borrowing by customers using a networked computer infrastructure, including one or more physical computer servers 212 and data stores 214 (e.g., databases) for hosting a network site 216. The marketplace 210 may be physically or virtually associated with one or more storage or distribution facilities, such as the fulfillment center 230. The network site 216 may be implemented using the one or more servers 212, which connect or otherwise communicate with the one or more data stores 214 as well as the communications network 280, as indicated by line 218, through the sending and receiving of digital data. Moreover, the data store 214 may include any type of information regarding items that have been made available for sale through the marketplace 210, or ordered by customers, such as the customer 240, from the marketplace 210, or any information or data regarding the delivery of such items to the customers, e.g., by one or more of the autonomous vehicles 250-1, 250-2 . . . 250-*n*.

The fulfillment center 230 may be any facility that is adapted to receive, store, process and/or distribute items. As is shown in FIG. 2A, the fulfillment center 230 includes a server 232, a data store 234, and one or more computer processors 236. The fulfillment center 230 also includes stations for receiving, storing and distributing items to customers, including but not limited to a receiving station 231, a storage area 233 and a distribution station 235.

The server 232 and/or the processors 236 may operate one or more order processing and/or communication systems and/or software applications having one or more user interfaces, or communicate with one or more other computing devices or machines that may be connected to the communications network 280, as indicated by line 238, in order to transmit or receive information in the form of digital or analog data, or for any other purpose. For example, the server 232 and/or the processors 236 may also operate or provide access to one or more reporting systems for receiving or displaying information or data regarding orders for items received by the marketplace 210, or deliveries made by one or more of the autonomous vehicles 250-1, 250-2 . . . 250-*n*, and may provide one or more interfaces for receiving interactions (e.g., text, numeric entries or selections) from one or more operators, users, workers or other persons in response to such information or data. The server 232, the data store 234 and/or the processor 236 may be a general purpose device or machine, or a dedicated device or machine that features any form of input and/or output peripherals such as scanners, readers, keyboards, keypads, touchscreens or like devices, and may further operate or provide access to one or more engines for analyzing the information or data regarding the workflow operations, or the interactions received from the one or more operators, users, workers or persons.

The receiving station 231 may include any apparatuses that may be required in order to receive shipments of items at the fulfillment center 230 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The storage area 233 may include one or more predefined two-dimensional or three-dimensional spaces for accommodating items and/or containers of such items, such as aisles, rows, bays, shelves, slots, bins, racks, tiers, bars, hooks, cubbies or other like storage means, or any other appropriate regions or stations. The distribution station 235 may include one or more regions or stations where items that have been retrieved from a designated storage area may be evaluated, prepared and packed for delivery from the fulfillment center 230 to addresses, locations or destinations specified by customers, e.g., by way of one or more of the autonomous vehicles 250-1, 250-2 . . . 250-n, as well as carriers such as cars, trucks, trailers, freight cars, container ships or cargo aircraft (e.g., manned aircraft or unmanned aircraft, such as drones). Those of ordinary skill in the pertinent art will recognize that shipments of items arriving at the receiving station 231 may be processed, and the items placed into storage within the storage areas 233 or, alternatively, transferred directly to the distribution station 235, or "cross-docked," for prompt delivery to one or more customers.

The fulfillment center 230 may further include one or more control systems that may generate instructions for conducting operations at one or more of the receiving station 231, the storage area 233 or the distribution station 235. Such control systems may be associated with the server 232, the data store 234 and/or the processor 236, or with one or more other computing devices or machines, and may communicate with the receiving station 231, the storage area 233 or the distribution station 235 within the fulfillment center 230 by any known wired or wireless means, or with the marketplace 210, the customer 240 or one or more of the autonomous vehicles 250-1, 250-2 . . . 250-n over the communications network 280, as indicated by line 238, through the sending and receiving of digital data.

Additionally, the fulfillment center 230 may include one or more systems or devices (not shown in FIG. 2A or FIG. 2B) for determining locations of one or more elements therein, such as cameras or other image recording devices. Furthermore, the fulfillment center 230 may also include one or more workers or staff members, who may handle or transport items within the fulfillment center 230. Such workers may operate one or more computing devices or machines for registering the receipt, retrieval, transportation or storage of items within the fulfillment center, or a general purpose device such a personal digital assistant, a digital media player, a smartphone, a tablet computer, a desktop computer or a laptop computer, and may include any form of input and/or output peripherals such as scanners, readers, keyboards, keypads, touchscreens or like devices.

The customer 240 may be any entity or individual that wishes to download, purchase, rent, lease, borrow or otherwise obtain items (which may include goods, products, services or information of any type or form) from the marketplace 210, e.g., for delivery by one or more of the autonomous vehicles 250-1, 250-2 . . . 250-n. The customer 240 may utilize one or more computing devices 242 (e.g., a smartphone, a tablet computer, a laptop computer, a desktop computer, or computing devices provided in wristwatches, televisions, set-top boxes, automobiles or any other appliances or machines), or any other like machine, that may operate or access one or more software applications 244, such as a web browser or a shopping application, and may be connected to or otherwise communicate with the marketplace 210, the fulfillment center 230 or the autonomous vehicles 250-1, 250-2 . . . 250-n through the communications network 280, as indicated by line 248, by the transmission and receipt of digital data.

The autonomous vehicles 250-1, 250-2 . . . 250-n may be any type or form of self-powered vehicle capable of being programmed or otherwise configured for autonomous travel between two points of a navigable path network, in furtherance of the performance of one or more missions or tasks, such as the delivery of an item from the fulfillment center 230 to the customer 240, based on one or more computer instructions. Each of the autonomous vehicles 250-1, 250-2 . . . 250-n shown in FIG. 2A, which are represented in FIG. 2B as an autonomous vehicle 250-i, may include one or more computer components such as a processor 252-i, a memory 254-i and a transceiver 256-i in communication with one or more other computer devices that may be connected to the communications network 280, as indicated by line 258-i, in order to transmit or receive information in the form of digital or analog data, or for any other purpose. For example, the autonomous vehicle 250-i may receive instructions or other information or data via the transceiver 256-i regarding an item that is to be delivered from the fulfillment center 230 to the customer 240 via one or more paths of a navigable path network from the marketplace server 212, the fulfillment center server 232 and/or the customer computing device 242, or from any other computing device over the communications network 280. The transceiver 256-i may be configured to enable the autonomous vehicle 250-i to communicate through one or more wired or wireless means, e.g., wired technologies such as Universal Serial Bus (or "USB") or fiber optic cable, or standard wireless protocols such as Bluetooth® or any Wireless Fidelity (or "WiFi") protocol, such as over the communications network 280 or directly.

The transceiver 256-i may further include or be in communication with one or more input/output (or "I/O") interfaces, network interfaces and/or input/output devices, and may be configured to allow information or data to be exchanged between one or more of the components of the autonomous vehicle 250-i, or to one or more other computer devices or systems (e.g., other aerial vehicles, not shown) via the communications network 280. For example, in some embodiments, the transceiver 256-i may be configured to coordinate I/O traffic between the processor 252-i and one or more onboard or external computer devices or components. The transceiver 256-i may perform any necessary protocol, timing or other data transformations in order to convert data signals from a first format suitable for use by one component into a second format suitable for use by another component. In some embodiments, the transceiver 256-i may include support for devices attached through various types of peripheral buses, e.g., variants of the Peripheral Component Interconnect (PCI) bus standard or the Universal Serial Bus (USB) standard. In some other embodiments, functions of the transceiver 256-i may be split into two or more separate components, or incorporated directly into the processor 252-i.

As is also shown in FIG. 2B, the autonomous vehicle 250-i further includes one or more control systems 260-i, as well as one or more sensors 262-i, one or more power modules 264-i, one or more navigation modules 266-i, and one or more user interfaces 268-i. Additionally, the autonomous vehicle 250-i further includes one or more motors 270-i, one or more steering systems 272-i and one or more item engagement systems (or devices) 274-i.

The control system 260-i may include one or more software applications or hardware components configured for controlling or monitoring operations of one or more components such as the sensor 262-i, the power module 264-i, the navigation module 266-i, or the user interfaces 268-i, as well as the motors 270-i, the steering systems 272-i and the item engagement systems 274-i, e.g., by receiving, generating, storing and/or transmitting one or more computer instructions to such components. The control system 260-i may communicate with the marketplace 210, the fulfillment center 230 and/or the customer 240 over the communications network 280, as indicated by line 258-*i*, through the sending and receiving of digital data.

The sensor 262-*i* may be a position sensor such as a GPS receiver in communication with one or more orbiting satellites or other components of a GPS system 285, or any other device or component for determining geolocations (e.g., geospatially-referenced point that precisely defines an exact location in space with one or more geocodes, such as a set of geographic coordinates, e.g., a latitude and a longitude, and, optionally, an elevation that may be ascertained from signals (e.g., trilateration data or information) or geographic information system (or "GIS") data), of the autonomous vehicle 250-*i*. Geolocations of the sensor 262-*i* may be associated with the autonomous vehicle 250-*i*, where appropriate.

The sensor 262-*i* may also be an imaging device including any form of optical recording sensor or device (e.g., digital cameras, depth sensors or range cameras, infrared cameras, radiographic cameras or other optical sensors) that may be configured to photograph or otherwise capture visual information or data (e.g., still or moving images in color or black and white that may be captured at any frame rates, or depth imaging data such as ranges), or associated audio information or data, or metadata, regarding objects or activities occurring within a vicinity of the autonomous vehicle 250-*i*, or for any other purpose. For example, the sensor 262-*i* may be configured to capture or detect reflected light if the reflected light is within a field of view of the sensor 262-*i*, which is defined as a function of a distance between an imaging sensor and a lens within the sensor 262-*i*, viz., a focal length, as well as a location of the sensor 262-*i* and an angular orientation of the lens. Accordingly, where an object appears within a depth of field, or a distance within the field of view where the clarity and focus is sufficiently sharp, the sensor 262-*i* may capture light that is reflected off objects of any kind to a sufficiently high degree of resolution using one or more sensors thereof, and store information regarding the reflected light in one or more data files.

The sensor 262-*i* may also include manual or automatic features for modifying a field of view or orientation. For example, the sensor 262-*i* may be a digital camera configured in a fixed position, or with a fixed focal length (e.g., fixed-focus lenses) or angular orientation. Alternatively, the sensor 262-*i* may include one or more actuated or motorized features for adjusting a position of the sensor 262-*i*, or for adjusting either the focal length (e.g., zooming the imaging device) or the angular orientation (e.g., the roll angle, the pitch angle or the yaw angle), by causing a change in the distance between the imaging sensor and the lens (e.g., optical zoom lenses or digital zoom lenses), a change in the location of the sensor 262-*i*, or a change in one or more of the angles defining the angular orientation of the sensor 262-*i*.

For example, the sensor 262-*i* may be an imaging device that is hard-mounted to a support or mounting that maintains the imaging device in a fixed configuration or angle with respect to one, two or three axes. Alternatively, however, the sensor 262-*i* may be provided with one or more motors and/or controllers for manually or automatically operating one or more of the components, or for reorienting the axis or direction of the sensor 262-*i*, i.e., by panning or tilting the sensor 262-*i*. Panning the sensor 262-*i* may cause a rotation within a horizontal plane or about a vertical axis (e.g., a yaw), while tilting the sensor 262-*i* may cause a rotation within a vertical plane or about a horizontal axis (e.g., a pitch). Additionally, the sensor 262-*i* may be rolled, or rotated about its axis of rotation, and within a plane that is perpendicular to the axis of rotation and substantially parallel to a field of view of the sensor 262-*i*.

Imaging data (e.g., still or moving images, as well as associated audio data or metadata) captured using the sensor 262-*i* may be processed according to any number of recognition techniques. In some embodiments, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

The sensor 262-*i* may further be one or more compasses, speedometers, altimeters, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), accelerometers, ranging sensors (e.g., radar or LIDAR ranging sensors) or sound sensors (e.g., microphones, piezoelectric sensors, vibration sensors or other transducers for detecting and recording acoustic energy from one or more directions).

The sensor 262-*i* may also be an item identification sensor such as a bar code scanner, a radiofrequency identification (or RFID) reader, or other technology that is utilized to determine an identification of an item that is being retrieved or deposited, or has been retrieved or deposited, by the autonomous vehicle 250-*i*. In some embodiments, the sensor 262-*i* may be provided within a cargo bay or other storage component of the autonomous vehicle 250-*i*, such as a presence detection sensor and/or a motion sensor for detecting the presence or absence of one or more objects within the cargo bay or storage compartment, or movement of objects therein.

The sensor 262-*i* may be further configured to capture, record and/or analyze information or data regarding its positions, velocities, accelerations or orientations of the autonomous vehicle 250-*i*, and to analyze such data or information by one or more means, e.g., by aggregating or summing such data or information to form one or more qualitative or quantitative metrics of the movement of the sensor 262-*i*. For example, a net vector indicative of any and all relevant movements of the autonomous vehicle 250-*i*, including but not limited to physical positions, velocities, accelerations or orientations of the sensor 262-*i*, may be derived. Additionally, coefficients or scalars indicative of the relative movements of the autonomous vehicle 250-*i* may also be defined.

The power module 264-*i* may be any type of power source for providing electrical power, mechanical power or other forms of power in support of one or more electrical or mechanical loads aboard the autonomous vehicle 250-$i$. In some embodiments, the power module 264-$i$ may include one or more batteries or other power cells, e.g., dry cell or wet cell batteries such as lead-acid batteries, lithium ion batteries, nickel cadmium batteries or nickel metal hydride batteries, or any other type, size or form of batteries. The power module 264-$i$ may each have any cell voltages, peak load currents, charge times, specific energies, internal resistances or cycle lives, or other power ratings. The power module 264-$i$ may also be any type, size or form of other power source, e.g., other than a battery, including but not limited to or more fuel cells, turbines, solar cells or nuclear reactors. Alternatively, the power module 264-$i$ may be another form of prime mover (e.g., electric, gasoline-powered or any other type of motor) capable of generating sufficient mechanical forces for the autonomous vehicle 250-$i$.

The navigation module 266-$i$ may include one or more software applications or hardware components including or having access to information or data regarding aspects of a navigable path network, including the locations, dimensions, capacities, conditions, statuses or other attributes of the various paths of a navigable path network. For example, the navigation module 266-$i$ may receive inputs from the sensor 262-$i$, e.g., from a GPS receiver, an imaging device or another sensor, and determine an optimal direction and/or an optimal speed of the autonomous vehicle 250-$i$ for travelling on a given path based on such inputs. The navigation module 266-$i$ may select a path to be traveled upon by the autonomous vehicle 250-$i$, and may provide information or data regarding the selected path to the control system 260-$i$.

The user interface 268-$i$ may be configured to receive and provide information to human users of the autonomous vehicle 250-$i$ and may include, but is not limited to, a display, (e.g., a touch-screen display), a scanner, a keypad, a biometric scanner, an audio transducer, one or more speakers, one or more imaging devices such as a video camera, and any other types of input or output devices that may support interaction between the autonomous vehicle 250-$i$ and a human user. In various embodiments, the user interface 268-$i$ may include a variety of different features. For example, in one embodiment, the user interface 268-$i$ may include a relatively small display and/or a keypad for receiving inputs from human users. In other embodiments, inputs for controlling the operation of the autonomous vehicle 250-$i$ may be provided remotely. For example, in order to access a storage compartment, a human user may send a text message to or reply to a text message from the control system 260-$i$ and request that a door or other access portal be opened in order to enable the user to access an item therein. In various implementations, the autonomous vehicle 250-$i$ may have capabilities for directly receiving such signals from a user device or other device (e.g., a device inside a user's residence) that provides a signal to open the storage compartment door.

The motor 270-$i$ may be any type or form of motor or engine (e.g., electric, gasoline-powered or any other type of motor) that is capable of providing sufficient rotational forces to one or more axles, shafts and/or wheels for causing the autonomous vehicle 250-$i$ and any items therein to travel in a desired direction and at a desired speed. In some embodiments, the autonomous vehicle 250-$i$ may include one or more electric motors having any number of stators, poles and/or windings, such as an outrunner or an inrunner brushless direct current (DC) motor, or any other motors, having any speed rating, power rating or any other rating.

The steering system 272-$i$ may be any system for controlling a direction of travel of the autonomous vehicle 250-$i$. The steering system 272-$i$ may include any number of automatically operable gears (e.g., racks and pinions), gear boxes, shafts, shaft assemblies, joints, servos, hydraulic cylinders, linkages or other features for repositioning one or more wheels to cause the autonomous vehicle 250-$i$ to travel in a desired direction.

The item engagement system 274-$i$ may be any mechanical component, e.g., a robotic arm, for engaging an item or for disengaging the item, as desired. For example, when the autonomous vehicle 250-$i$ is tasked with delivering an item from an origin to a destination, the item engagement system 274-$i$ may be used to engage the item at the origin and to deposit the item in a cargo bay or other storage compartment prior to departing. After the autonomous vehicle 250-$i$ arrives at the destination, the item engagement system 274-$i$ may be used to retrieve the item within the cargo bay or storage compartment, and deposit the item in a desired location at the destination.

In some embodiments, the autonomous vehicle 250-$i$ may be programmed or configured to perform one or more missions or tasks in an integrated manner. For example, the control system 260-$i$ may be programmed to instruct the autonomous vehicle 250-$i$ to travel to an origin, e.g., the fulfillment center 230, and to begin the performance of a task there, such as by retrieving an item at the origin using the item engagement system 274-$i$, before proceeding to a destination, e.g., the customer 240, along a selected route (e.g., an optimal route). Along the way, the control system 260-$i$ may cause the motor 270-$i$ to operate at any predetermined speed and cause the steering system 272-$i$ to orient the autonomous vehicle 250-$i$ in a predetermined direction or otherwise as necessary to travel along the selected route, e.g., based on information or data received from or stored in the navigation module 266-$i$. The control system 260-$i$ may further cause the sensor 262-$i$ to capture information or data (including but not limited to imaging data) regarding the autonomous vehicle 250-$i$ and/or its surroundings along the selected route. The control system 260-$i$ or one or more other components of the autonomous vehicle 250-$i$ may be programmed or configured as necessary in order to execute any actions associated with a given task, in accordance with the present disclosure.

Any combination of networks or communications protocols may be utilized in accordance with the systems and methods of the present disclosure. For example, each of the automated ground vehicles 250-1, 250-2 . . . 250-$n$ may be configured to communicate with one another or with the marketplace server 212, the fulfillment center server 232 and/or the customer computer 242 via the communications network 280, such as is shown in FIGS. 2A and 2B, e.g., via an open or standard protocol such as WiFi. Alternatively, each of the autonomous ground vehicles 250-1, 250-2 . . . 250-$n$ may be configured to communicate with one another directly outside of a centralized network, such as the communications network 280, e.g., by a wireless protocol such as Bluetooth, in which two or more of the autonomous ground vehicles 250-1, 250-2 . . . 250-$n$ may be paired with one another.

The vehicle monitoring system 290 includes one or more physical computer servers 292 having a plurality of databases 294 associated therewith, as well as one or more computer processors 296 provided for any specific or general purpose. The servers 292 may be connected to or otherwise communicate with the databases 294 and the processors 296. The databases 294 may store any type of information or data, including but not limited to acoustic signals, information or data relating to acoustic signals, or information or data regarding personnel and/or their attributes, interests or preferences, for any purpose. The servers 292 and/or the computer processors 296 may also connect to or otherwise communicate with the communications network 280, as indicated by line 298, through the sending and receiving of digital data. For example, the vehicle monitoring system 290 may include any facilities, stations or locations having the ability or capacity to receive and store information or data in one or more data stores, e.g., data files received from any of the autonomous ground vehicles 250-1, 250-2 . . . 250-n, one or more other external computer systems (not shown) via the communications network 280. In some embodiments, the data processing system 290 may be provided in a physical location. In other such embodiments, the data processing system 290 may be provided in one or more alternate or virtual locations, e.g., in a "cloud"-based environment. In still other embodiments, the vehicle monitoring system 290 may be provided onboard one or more of the autonomous ground vehicles 250-1, 250-2 . . . 250-n.

For example, the vehicle monitoring system 290 of FIG. 2 may be independently provided for the purpose of defining a navigable path network having a plurality of points based on attributes of a given mission or task, attributes of one or more of the autonomous ground vehicles 250-1, 250-2 . . . 250-n, or attributes of physical and/or geographic features within a given environment, including but not limited to locations and dimensions or other attributes of roads, sidewalks, crosswalks, bicycle or walking paths, bridges or trails, or non-traditional transportation infrastructure, such as parks, fields, forests, lots, clearings or other spaces. The number and/or type of physical and/or geographic features that may be evaluated and considered for inclusion in a navigable path network by the vehicle monitoring system 290, and the number and/or type of points that may be included in such a navigable path network, are not limited.

In some embodiments, the vehicle monitoring system 290 of FIG. 2 may also be provided for the purpose of receiving, tracking and/or otherwise monitoring the operations of one or more of the autonomous ground vehicles 250-1, 250-2 . . . 250-n, including but not limited to any information or data regarding attributes of the autonomous ground vehicles 250-1, 250-2 . . . 250-n, or missions or tasks being performed by the autonomous ground vehicles 250-1, 250-2 . . . 250-n, as well as environmental conditions, traffic conditions, ground or surface conditions, weather conditions, planned or ongoing construction or other events, or any other factors that may affect the capacity of one or more paths within a navigable path network.

For example, the vehicle monitoring system 290 may receive information or data regarding a mission or task to be performed, e.g., a delivery of an item from an origin to a destination, and may identify a plurality of routes between two or more of the points of a navigable path network, and may select one or more of such paths as an optimal path for the execution of the mission or task by one or more of the autonomous ground vehicles 250-1, 250-2 . . . 250-n. The vehicle monitoring system 290 may further provide instructions to one or more of the autonomous ground vehicles 250-1, 250-2 . . . 250-n, indicating a route to be traveled between two or more of the points of the navigable path network, including times and dates at which an autonomous ground vehicle has arrived at or departed from one or more of such points. The vehicle monitoring system 290 may be further configured to receive information or data regarding changes to any of the attributes regarding a given mission or task, changes to any of the attributes of any of the autonomous ground vehicles 250-1, 250-2 . . . 250-n, or changes to any of the attributes of the physical and/or geographic features of the environment in which the navigable path network is provided. Information or data regarding such changes may be received from any intrinsic or extrinsic sources, including but not limited to one or more networked computer systems, e.g., over the communications network 280, or from one or more of the autonomous ground vehicles 250-1, 250-2 . . . 250-n. For example, the vehicle monitoring system 290 may include information or data such as a speed, a course, a position (e.g., a latitude and a longitude), an elevation, an angle of orientation (e.g., a yaw, a pitch or a roll) of an autonomous ground vehicle, as well as information or data regarding environmental or surface conditions, traffic conditions, congestion or any other relevant factors regarding the capacity of a given path of the navigable path network.

The vehicle monitoring system 290 may also be configured to determine whether a route being traveled by one or more of the autonomous ground vehicles 250-1, 250-2 . . . 250-n remains optimal or preferred for a given autonomous ground vehicle, or to communicate instructions for varying the route. The vehicle monitoring system 290 may be further utilize any available information or data in determining a capacity of a given path of the navigable path network, or whether such capacity may have increased or decreased, or whether a path is to be added to the navigable path network or removed therefrom. The number and/or type of information or data that may be received and/or processed or utilized by the vehicle monitoring system 290 are not limited.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "fulfillment center" a "customer," an "autonomous vehicle," a "vehicle monitoring system" or like terms, may be automated steps performed by their respective computer systems, or implemented within software modules (or computer programs) executed by one or more general purpose computers. Moreover, process steps described as being performed by a "marketplace," a "fulfillment center," a "customer," an "autonomous vehicle" or a "vehicle monitoring system" may be typically performed by a human operator, but could, alternatively, be performed by an automated agent.

The marketplace 210, the fulfillment center 230, the customer 240, the autonomous vehicles 250-1, 250-2 . . . 250-n or the vehicle monitoring system 290 may use any web-enabled or Internet applications or features, or any other client-server applications or features including electronic mail (or E-mail), or other messaging techniques, to connect to the communications network 280 or to communicate with one another, such as through short or multimedia messaging service (SMS or MMS) text messages. For example, the fulfillment center 230 and/or the server 232 may be adapted to transmit information or data in the form of synchronous or asynchronous messages to the marketplace 210 and/or the server 212, the customer 240 and/or the computing device 242, the autonomous vehicles 250-1, 250-2 . . . 250-n and/or the control system 260-i or the vehicle monitoring system 290, or any other computer device in real time or in near-real time, or in one or more offline processes, via the communications network 280. Those of ordinary skill in the pertinent art would recognize that the marketplace 210, the fulfillment center 230, the customer 240, the autonomous vehicles 250-1, 250-2 . . . 250-n or the vehicle monitoring system 290 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the servers 212, 232, 292, the computing devices 242, the processors 252-i, 296, or any other computers or control systems utilized by the marketplace 210, the fulfillment center 230, the customer 240, the autonomous vehicles 250-1, 250-2 . . . 250-n, the vehicle monitoring system 290, and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
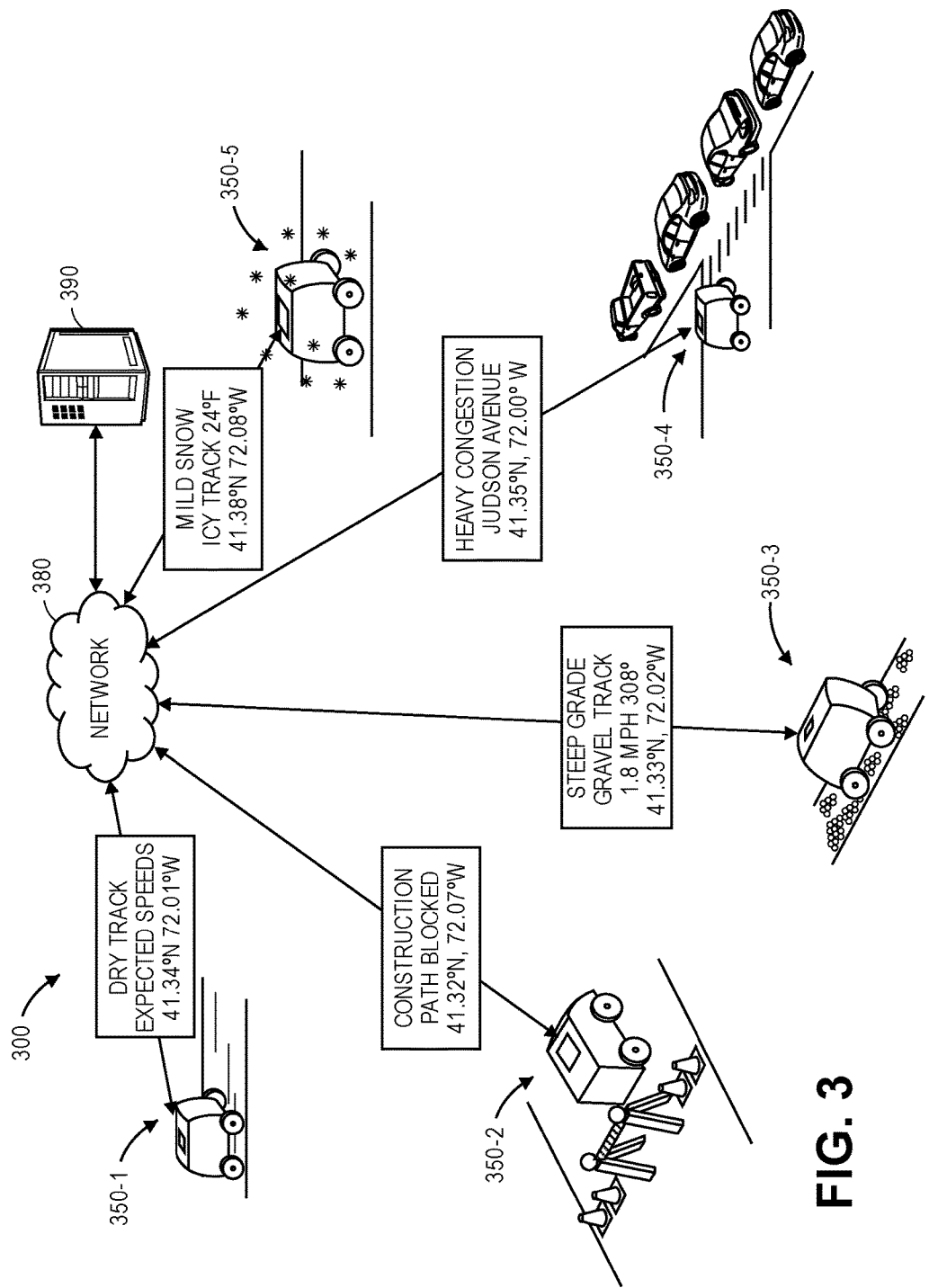
FIG. 3 is a view of aspects of one system including a navigable path network in accordance with embodiments of the present disclosure.

As is discussed above, autonomous vehicles traveling throughout a navigable path network may remain in communication with a vehicle monitoring system or other networked computer systems. The autonomous vehicles may transmit information or data (e.g., imaging data of any type or form) regarding their past, present or future operations to the vehicle monitoring system, e.g., their respective speeds, courses, positions (e.g., latitudes and longitudes), elevations or angles of orientation (e.g., yaws, pitches or rolls), as well as environmental or surface conditions, traffic conditions, congestion or any other relevant factors encountered by the autonomous vehicles to the vehicle monitoring system or other networked computer systems. Referring to FIG. 3, a view of aspects of one system 300 including a navigable path network in accordance with embodiments of the present disclosure is shown. Except where otherwise noted, reference numerals preceded by the number "3" in FIG. 3 refer to elements that are similar to elements having reference numerals preceded by the number "2" in FIG. 2A or FIG. 2B or by the number "1" shown in FIGS. 1A through 1F.

As is shown in FIG. 3, the system 300 includes a plurality of autonomous vehicles 350-1, 350-2, 350-3, 350-4, 350-5 and a vehicle monitoring system 390 that are connected to one another across a communications network 380, which may include the Internet in whole or in part. Each of the plurality of autonomous vehicles 350-1, 350-2, 350-3, 350-4, 350-5 is engaged in independent and discrete operations, and is reporting information regarding its respective operations to the vehicle monitoring system 390 over the network 380. For example, the autonomous vehicle 350-1 reports information or data regarding a surface upon which the autonomous vehicle 350-1 is traveling (e.g., that the track is dry), as well as its speeds (e.g., that its speeds met expectations or predictions), along with coordinates of its position. The autonomous vehicle 350-2 reports that it has encountered an obstruction (e.g., that its path is blocked), and identified a possible cause of the obstruction, along with coordinates of its position.

Similarly, the autonomous vehicle 350-3 reports that it is traveling up a slope having a specific surface (e.g., gravel), along with a speed, a course, and coordinates of its position. The autonomous vehicle 350-4 also reports that it has encountered heavy traffic and identifies its position using words (e.g., a name of a street) and coordinates. The autonomous vehicle 350-5 also reports information or data regarding a surface upon which the autonomous vehicle 350-5 is traveling (e.g., that the track is icy), along with weather conditions (e.g., mild snow, and twenty-four degree Fahrenheit, or 24° F., air temperatures) and coordinates of its position.

Information or data of any type or form that is captured by sensors operating onboard autonomous vehicles during operations, including but not limited to the autonomous vehicles 350-1, 350-2, 350-3, 350-4, 350-5 shown in FIG. 3, may be utilized along with information or data obtained from any number of other sources to generate a navigable path network, or to update one or more paths of the navigable path network, e.g., by adding or removing one or more paths, or adjusting a capacity of such paths. Once a navigable path network has been generated and/or updated, an optimal route associated with the execution of a mission or task may be selected on any basis, e.g., according to one or more traditional shortest path or shortest route algorithms such as Dijkstra's Algorithm, Bellman-Ford Algorithm, Floyd-Warshall Algorithm, Johnson's Algorithm or a hub labeling technique.

Figure 4:
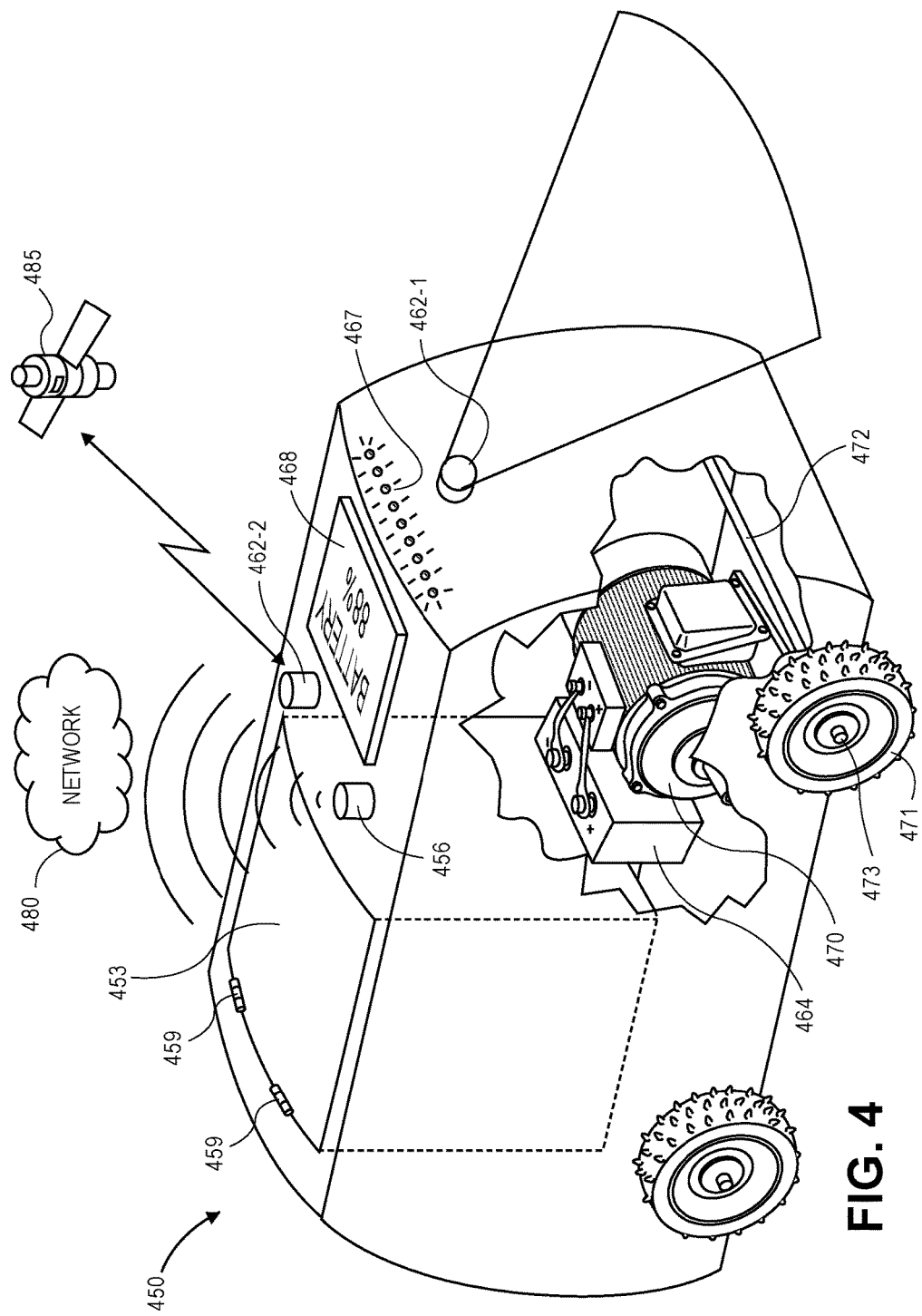
FIG. 4 is a view of one autonomous ground vehicle for traveling on a navigable path network in accordance with embodiments of the present disclosure.

As is discussed above, navigable path networks may be defined for use by one or more autonomous vehicles, which may include any number of elements, features or components. Referring to FIG. 4, a view of one autonomous ground vehicle 450 configured for travel on paths on a navigable path network in accordance with embodiments of the present disclosure is shown. Except where otherwise noted, reference numerals preceded by the number "4" in FIG. 4 refer to elements that are similar to elements having reference numerals preceded by the number "3" in FIG. 3, by the number "2" in FIG. 2A or FIG. 2B or by the number "1" shown in FIGS. 1A through 1F.

As is shown in FIG. 4, the autonomous ground vehicle 450 includes a frame 452, a storage compartment 457, a pair of axles 471 and a plurality of wheels 472 joined to the axles 471. A front surface of the frame 452 includes an imaging device 462-1 having a field of view aligned in a forward direction or orientation with respect to the autonomous ground vehicle 450 and an array of lights 467. In some embodiments, the autonomous ground vehicle 450 may include any number of imaging devices 462-1, with fields of view that may be permanently or adjustably aligned in any direction or orientation with respect to the autonomous ground vehicle 450. In some embodiments, the autonomous ground vehicle 450 may include any number of lights, on any surface thereof, and one or more of the lights may include light emitting diodes (LEDs) or other light sources.

An upper surface of the frame 452 includes a door 453 providing access to the storage compartment 457 is rotatably connected by a pair of hinges 459. The door 453 may include any number of manual or automatic features for causing the opening or closing thereof, and may include any suitable dimensions with respect to the dimensions of the storage compartment 457. In some embodiments, the autonomous ground vehicle 450 may include doors 453 on any surface thereof, and any number of storage compartments 457 of any size or shape. The upper surface of the frame 452 further includes a transceiver 456 (e.g., a WiFi transmitter and receiver) for communicating with a network 480, which may include the Internet in whole or in part, as well as a GPS receiver 462-2, which may receive geolocation data from or transmit geolocation data to a GPS network 485. The upper surface of the frame 452 further includes a user interface 468 which may receive interactions from a human user, or display information to the human user, as appropriate. In some embodiments, the GPS receiver 462-2, the user interface 468 and/or the user interface 468 may be provided on any other surface of the frame 452.

As is shown in FIG. 4, the autonomous ground vehicle 450 may include a power module 464 (e.g., a battery), a motor 470 (e.g., a DC electric motor operating at twelve to forty-eight volts) and a steering component 472 (e.g., one or more racks or pinions for automatically changing a direction of travel of the autonomous ground vehicle 450 and/or an orientation of one or more of axles 471 or the wheels 473. The motor 470 may be configured to operate at any speed or have any power rating, and to cause the autonomous ground vehicle 450 to travel in a forward direction of travel, a reverse direction of travel or in any other direction of travel as determined by the steering component 472. Additionally, the axles 471 and wheels 473 of the autonomous ground vehicle 450 may also have any dimension. For example, the wheels 473 may have bores or axle pads for accommodating axles 471 of any diameter or thickness, and any number of spokes or other extensions for supporting a rim having any desired spacings or offsets for accommodating tires or other coverings. Each of the axles 471 may be joined to and configured to rotate any number of wheels 473, which may include tires or other coverings of any suitable material, including but not limited to rubbers and/or plastics. The wheels 473 or tires thereon may feature any number of belts, walls, treads or other components, and may be pneumatic or solid, or take any other form.

As is discussed above, a navigable path network may be defined within an area or environment based on information or data regarding prior travel throughout the area or environment, such as travel on traditional transportation and non-traditional transportation infrastructure provided within the area or environment. For example, geospatial data regarding physical features in a given area including but not limited to topographical data regarding the composition and surface features within an area, as well as elevations of points within the area, may be identified or determined from satellite or ground-based imagery, GIS data, or any other information or data obtained from any other source. Similarly, whether and where an area includes transportation infrastructure such as roads, sidewalks, crosswalks, bicycle or walking paths, bridges or trails, and also non-traditional transportation infrastructure, e.g., locations and dimensions of parks, fields, forests, lots, clearings or other spaces that may accommodate travel by one or more vehicles may also be determined, along with data regarding prior travel along the such features by autonomous vehicles within the given area. The prior travel may be associated with the performance of any number of missions or tasks, including but not limited to the delivery of items along features extending between points within the given area.

Attributes regarding the transportation infrastructure and other physical features within an area, along with attributes of prior travel through the area, and attributes of one or more available autonomous vehicles may be used to define one or more paths of the navigable path network. For example, regarding the prior travel, such attributes may include time stamps (e.g., times and positions of autonomous vehicles within the given area at such times), elapsed times between departures and arrivals, net speeds, courses, angles of orientation (e.g., a yaw, a pitch or a roll), levels of traffic congestion, sizes or dimensions of any payloads carried, environmental conditions or any other information or data that describes or represents instances of such prior travel within the given area. Regarding the autonomous vehicles, the dimensions of the autonomous vehicles, the dimensions and capacities of cargo bays or other storage compartments, as well as their maximum speeds or turning radii, or any other attributes of such vehicles relating to travel between two or more points of the given area.

Based on such attributes, a navigable path network may be defined to include connections between two or more points for each of the autonomous vehicles, or for each of a class of the autonomous vehicles, in performing any number of missions or tasks. For example, the navigable path network may include a plurality of paths between points within the area, based on dimensions and/or capacities of autonomous vehicles that may travel thereon, and dimensions and/or masses of payloads that may be carried thereby. The paths of the navigable path networks may be defined in both a static and a dynamic manner, based on times of days, days of weeks, weeks of months and months of years, as well as actual or predicted traffic congestion, weather events, or any other factors. Each of such paths may include a unique flow rate or capacity for each autonomous vehicle, or for each class of autonomous vehicles. Once a navigable path network has been defined, a shortest route or an optimal route for travel between two or more points of the navigable path network by an autonomous vehicle during the performance of a task, and an autonomous vehicle for performing the task, may be selected accordingly.

Figure 5A:
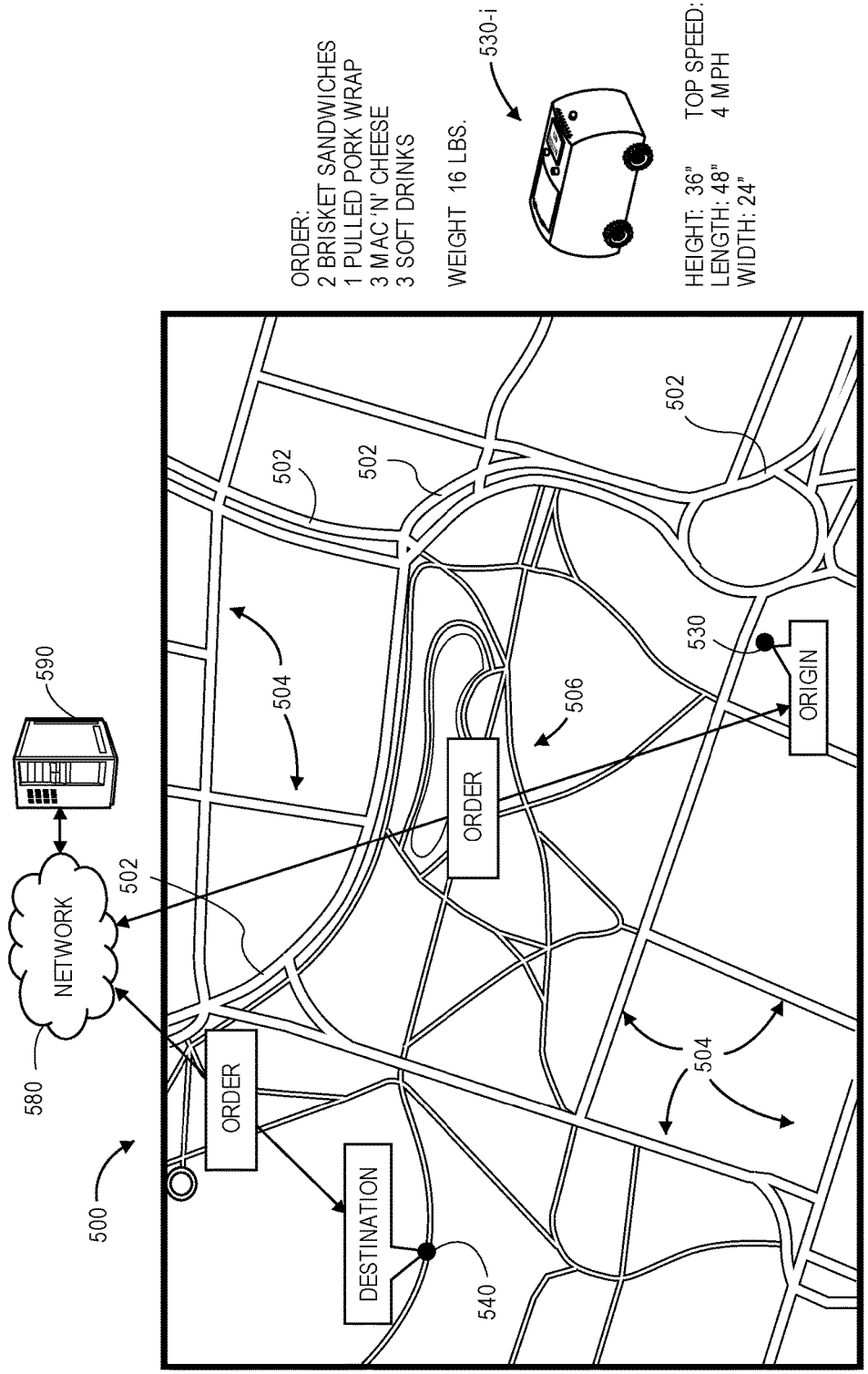
FIGS. 5A, 5B and 5C are views of aspects of one navigable path network in accordance with embodiments of the present disclosure.
Figure 5B:
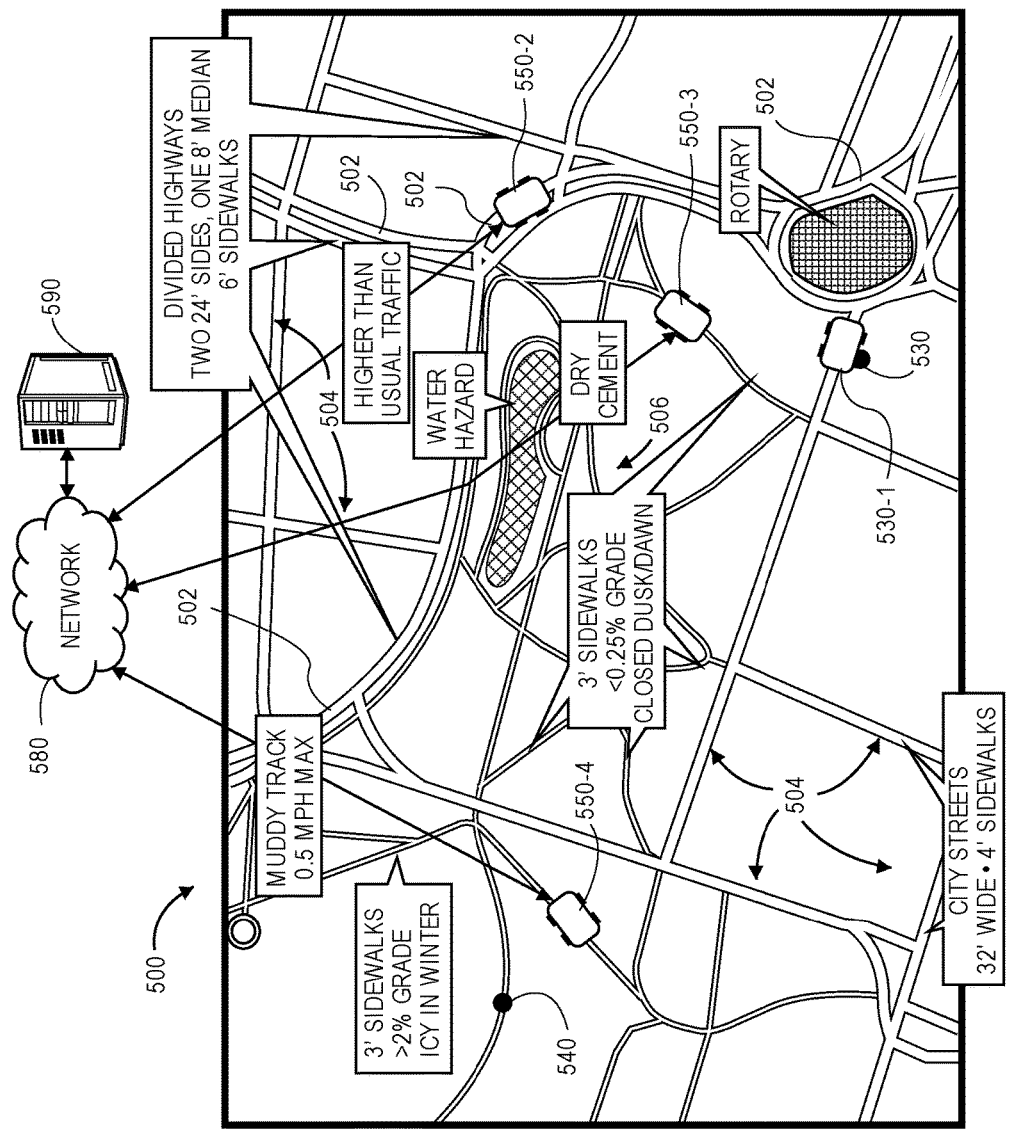
Figure 5C:
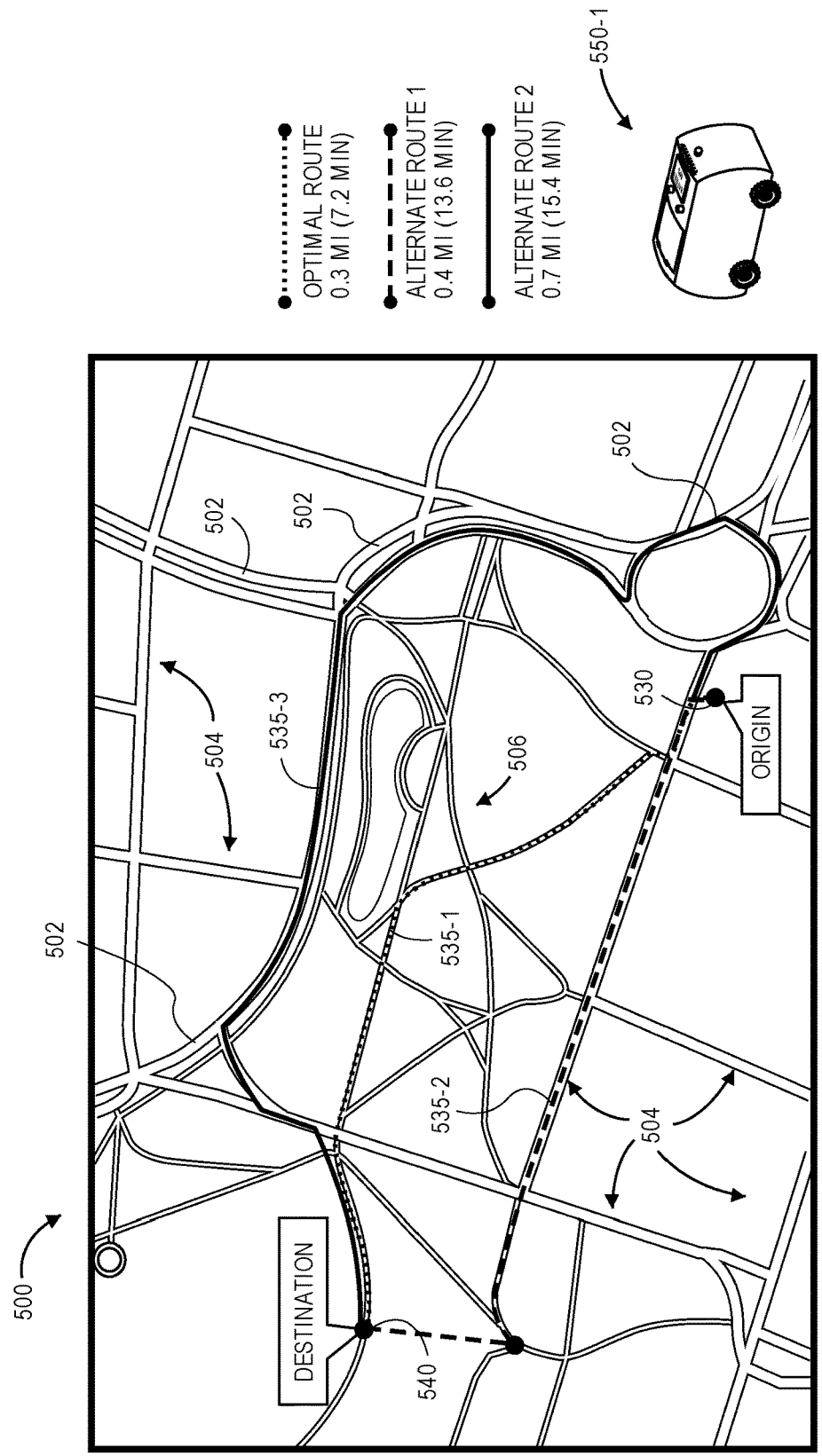

An optimal route between two or more points of the navigable path network for executing a mission or task may be selected, based on attributes of the mission or task, attributes of an autonomous vehicle and attributes of the respective paths of the navigable path network. Referring to FIGS. 5A, 5B and 5C, views of aspects of one navigable path network 505 in accordance with embodiments of the present disclosure are shown. Except where otherwise noted, reference numerals preceded by the number "5" in FIG. 5A, FIG. 5B or FIG. 5C refer to elements that are similar to elements having reference numerals preceded by the number "4" in FIG. 4, by the number "3" in FIG. 3, by the number "2" in FIG. 2A or FIG. 2B or by the number "1" shown in FIGS. 1A through 1F.

As is shown in FIG. 5A, an order for a delivery of a plurality of items (e.g., a delivery of a sixteen pound bundle consisting of two brisket sandwiches, one pulled pork wrap, one order of macaroni and cheese and three soft drinks) is received at an origin 530 within an area 500 from a customer at a destination 540 within the area 500 over a communications network 580. The area 500 includes a transportation infrastructure having a plurality of divided highways 502, a plurality of streets 504 and a plurality of walking paths 506 extending between a plurality of points, including the origin 530, the destination 540 and others. Information or data regarding the transportation infrastructure may be maintained in a vehicle management system 590 and accessed over the communications network 580. Each of a fleet of autonomous vehicles 550-$i$ that may be utilized to deliver the items from the origin 530 to the destination 540 has a height of thirty-six inches (36"), a length of forty-eight inches (48") and a width of twenty-four inches (24"), and a maximum speed of four miles per hour (4 mph). One of the autonomous vehicles 550-1 may be selected to deliver the ordered items from the origin 530 to the destination 540.

As is shown in FIG. 5B, a navigable path network 505 may be defined based on the attributes of the features within the area 500, including not only the existing transportation infrastructure within the area 500, e.g., the divided highways 502, the streets 504 and the walking paths 506, but also any other natural or other artificial features within the area 500, as well as any information or data regarding such attributes that may be reported by one or more autonomous vehicles operating in the area 500, including but not limited to the autonomous vehicles 550-2, 550-3, 550-4. The navigable path network 505 of FIG. 5B is dynamic, and the suitability of any number of paths between points within the navigable path network 505, are dynamic in nature. For example, as is shown in FIG. 5B, the divided highways 502 each include two twenty-four foot (24') sides and an eight-foot (8') median, and are lined by six-foot (6') sidewalks. The streets 504 are each thirty-two feet (32') wide and lined with four-foot (4') sidewalks. Some of the walking paths 506 traversing the area 500 are three feet (3') wide and feature grades of less than one-quarter of one percent (0.25%), while other walking paths 506 have grades that are greater than two percent (2%). The area 500 also includes features that may be deemed impassable by autonomous vehicles, including a central portion of a rotary of the divided highways 502, as well as a water hazard.

The flow capacity of the divided highways 502, the streets 504 or the walking paths 506 within the area 500 naturally depend on any prevailing traffic conditions, weather conditions, construction activity, local laws or regulations or the like. As a result, the capacities of the respective paths of the navigable path network 505 that are defined by the divided highways 502, the streets 504, the walking paths 506 or any other natural or other artificial features within the area 500 may be modeled as functions of the time of day (e.g., "rush hour" versus off-peak hours) or day of the week (e.g., weekdays versus weekends), or any other predictable or unpredictable factors. For example, as is shown in FIG. 5B, some of the walking paths 506 are closed from dusk until dawn, while other walking paths 506 are prone to be icy or impassable during winter months. Moreover, information or data regarding prevailing conditions in the area 500 may be received from the autonomous vehicles 550-2, 550-3, 550-4 operating within the area 500 by the vehicle monitoring system 590 over the network 580. For example, as is shown in FIG. 5B, the autonomous vehicle 550-2 reports higher than usual traffic on one of the divided highways 502, while the autonomous vehicle 550-3 reports traveling on dry cement. The autonomous vehicle 550-4 reports traveling along a muddy track at limited speeds (e.g., one half mile per hour). Information or data regarding the prevailing conditions within the area 500 may be used to update the navigable path network 505, e.g., by adding one or more new paths to the navigable path network 505, by removing one or more paths from the navigable path network 505, or by changing a capacity of one or more of the paths of the navigable path network 505.

An optimal route between the origin 530 and the destination 540 within the navigable path network 505 may be selected based on any number of factors, which may be determined based on any intrinsic or extrinsic factors. As is shown in FIG. 5C, a plurality of routes 535-1, 535-2, 535-3 along the navigable path network 505 between the origin 530 and the destination 540 have been identified based on the time, date or other information or data that is known regarding the conditions within the area 500. An optimal route 535-1 extends almost exclusively on substantially flat walking paths 506 having widths of approximately three feet and grades of less than one quarter of one percent, which are typically used by only pedestrian or bicycle traffic. The optimal route 535-1 has a length of approximately three-tenths of one mile, and an estimated transit time of seven minutes, twelve seconds (7.2 min). A first alternate route 535-2 extends mostly on sidewalks and/or streets 504, which may be used by pedestrians, bicycles or like vehicles, and full-size automobiles or other vehicles and is therefore subject to occasional delays or obstructions. The first alternate route 535-2 has a length of approximately four-tenths of one mile, and an estimated transit time of thirteen minutes, thirty-six seconds (13.6 min). The second alternate route 535-3 extends mostly on divided highways 502 and streets 504, which are utilized almost exclusively by full-size automobiles or other vehicles, and are also subject to occasional delays or obstructions. The second alternate route 535-3 has a length of approximately seven-tenths of one mile, and an estimated transit time of fifteen minutes, twenty-four seconds (15.4 min).

Figure 6:
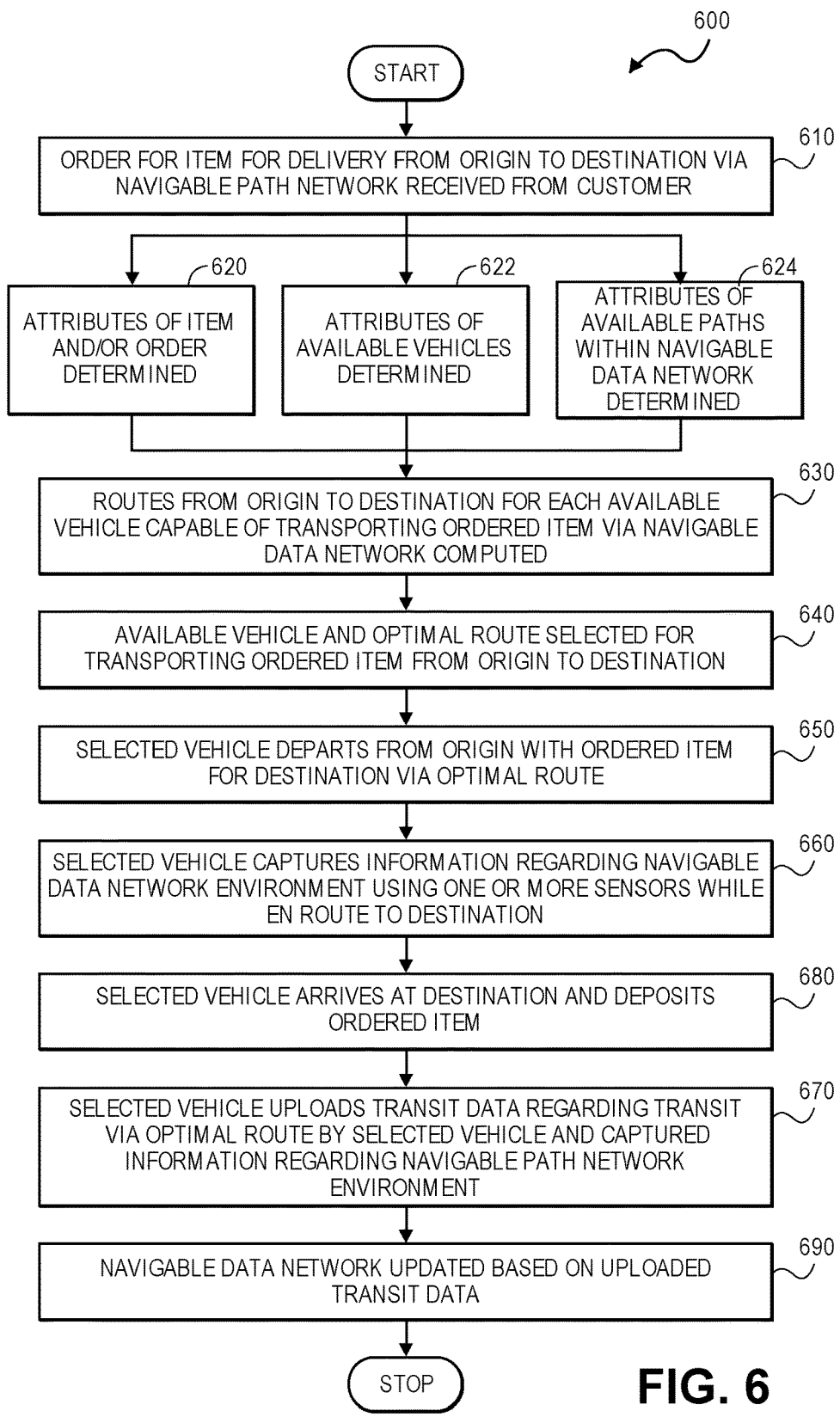
FIG. 6 is a flow chart of one process for utilizing a navigable path network in accordance with embodiments of the present disclosure.

As is discussed above, navigable path networks of the present disclosure may be defined based on attributes of an area or an environment, attributes of one or more autonomous vehicles, or attributes of one or more missions or tasks that may be performed within the environment using one or more of the autonomous vehicles. The navigable path networks may also be defined in a dynamic, iterative manner, and updated accordingly if any of such attributes is determined or predicted to have changed, e.g., based on information or data gathered by one or more autonomous vehicles traveling along the navigable path networks, or from any other intrinsic or extrinsic sources. Referring to FIG. 6, a flow chart 600 of one process for utilizing a navigable path network in accordance with embodiments of the present disclosure is shown. At box 610, an order for an item for delivery from an origin to a destination via a navigable path network is received from a customer. In some embodiments, the order may be received from the customer via a web page associated with an online marketplace, or by a dedicated computer application operating on a computer device. Alternatively, the customer may place the order by telephone or in person, e.g., at a brick-and-mortar retailer, or in any other manner.

At box 620, attributes of the item and/or the order are determined. In some embodiments, attributes of the item may include an item name, number or other identifier, as well as any dimensions (e.g., a height, a width, a length and/or a volume) or a mass of the item, and any other relevant information (e.g., expiration dates or handling instructions). In some other embodiments, attributes of the order may include a name of the customer, an address of a destination for the item, a date and/or time at which the item is to be delivered, or any information or data regarding a payment instrument (e.g., a credit card number, expiration date and/or verification or security code). At box 622, attributes of the available vehicles are determined. In some embodiments, such attributes may include a number of autonomous vehicles that are available and ready for tasking, and dimensions, details or specifications regarding such autonomous vehicles, such as a payload capacity (e.g., dimensions of one or more storage compartments provided on an autonomous vehicle, or masses of items that may be safely transported within such compartments), maximum speed, battery charge or fuel level, range, operating efficiency, or any other relevant factor regarding the operability of the autonomous vehicles, either individually or as members of one or more classes of vehicles. At box 624, attributes of the available paths within the navigable path network are determined. In some embodiments, such attributes may include dimensions of such paths, ground or weather conditions affecting such paths, traffic congestion along such paths, or any other relevant factors impacting the availability of such paths for accommodating travel by one or more autonomous vehicles during the performance of missions or tasks, including but not limited to the delivery of the item ordered at box 610.

In some embodiments, the attributes of the item and/or the order at box 620, the attributes of the available autonomous vehicles at box 622 and the attributes of the paths at box 624 may be obtained simultaneously and in parallel, as is shown in FIG. 6, such as upon receiving the order for the item at box 610. In some other embodiments, one or more of the sets of attributes may be determined in series. In still other embodiments, one or more of the sets of attributes may be determined at different times, including in one or more batch processes, synchronously or asynchronously.

At box 630, a plurality of routes from an origin of the item to a destination for the item are computed via the navigable path network are computed for each of the available autonomous vehicles that is capable of transporting the ordered item. Such routes may be defined by combinations of each of the paths between points or nodes of the navigable path network that may be traversed by a given autonomous vehicle during the delivery of the ordered item. A determination as to whether a given autonomous vehicle may transport the item ordered at box 610 may be made with respect to each of the paths of the navigable path network, based on the attributes determined at box 620, box 622 and box 624, and each of the routes may be computed accordingly.

At box 640, an available autonomous vehicle and an optimal route for transporting the ordered item from the origin to the destination are selected. The autonomous vehicle and the optimal route may be selected by any means or method, e.g., by one or more path modeling algorithms, formulas or techniques, and on any basis, including but not limited to cost-based or time-based considerations with respect to each of the routes computed at box 630.

At box 650, the selected vehicle departs from the origin for the destination with the ordered item along the optimal route. For example, referring again to FIG. 1B, one of the autonomous vehicles 150-1, 150-2, 150-3 may be selected for delivering the item ordered at box 610 from the origin to the destination, and the ordered item may be stored in one of the cargo bays 157-1, 157-2, 157-3A, 157-3B while the selected autonomous vehicle is in transit.

At box 660, the selected vehicle captures information regarding the network environment using one or more sensors while the selected vehicle is en route to the destination. For example, the selected vehicle may track its position, e.g., using one or more GPS receivers, and store information regarding a path traveled from the origin to the destination with a series of time stamps, which may be captured individually or continuously while the selected autonomous vehicle is en route. Additionally, the selected vehicle may also capture imaging data regarding the selected vehicle or the one or more paths while the selected vehicle is en route using one or more imaging devices, including but not limited to visual information or data, or associated audio information or data, or metadata. The selected vehicle may further capture any other information or data while en route from the origin to the destination, including but not limited to information regarding maximum, nominal or average speeds reached by the selected vehicle; weather conditions, surface conditions, traffic congestion encountered by the selected vehicle along the optimal route; or any deviations from weather conditions, surface conditions or traffic congestion that were anticipated along the optimal route. Any type of data relating to the transit of the selected vehicle from the origin to the destination with the ordered item may be captured and stored in accordance with the present disclosure.

At box 670, the selected vehicle uploads any available data regarding the transit from the origin to the destination via the optimal route by the selected vehicle, along with any information captured regarding the network environment during the transit from the origin to the destination, including but not limited to the information captured at box 660, e.g., to a central vehicle monitoring system or another networked computer device.

At box 680, the selected vehicle arrives at the destination and deposits the ordered item there. For example, one or more item engagement systems or devices, e.g., a robotic arm, may retrieve the ordered the item from a cargo bay or other storage compartment, and deposit the ordered item in a predetermined location at the destination. Alternatively, the customer or a designated representative may access the cargo bay or other storage compartment upon the selected vehicle's arrival, and manually retrieve the ordered item therefrom. An ordered item may be delivered to the destination in any manner in accordance with the present disclosure.

At box 690, the navigable path network is updated based on the uploaded transit data, and the process ends. For example, the definition of any of the paths between any of the points or nodes may be updated based on the actual delivery time, as well as any changes in dimensions or other attributes of the respective paths determined during the transit of the selected vehicle from the origin to the destination, or to include one or more proposed paths between two or more of the points or nodes of the navigable path network, as determined based on the transit data. Alternatively, the navigable path network may be updated to include one or more additional points within the network environment. Subsequently, an optimal path for executing a mission or a task (e.g., a delivery of an item) by an autonomous vehicle may be defined from the updated navigable path network.

In accordance with the present disclosure, autonomous vehicles may operate in a plurality of modes, including but not limited to a delivery mode (or a transit mode), in which an autonomous vehicle delivers an item from an origin to a destination via an optimal path of a navigable path network, and also an exploratory mode, in which the autonomous vehicle evaluates an environment or area in which the navigable path network is provided and attempts to identify alternate or proposed paths between two or more points of the navigable path network that may result in more optimal travel between the two or more points. Such alternate paths may be identified on any basis or based on any available information or data, including but not limited to any information or data (e.g., imaging data) captured by the autonomous vehicle while in a delivery mode.

Referring to FIGS. 7A through 7E, views of aspects of one system 700 including a navigable path network 705 in accordance with embodiments of the present disclosure are shown. Except where otherwise noted, reference numerals preceded by the number "7" in FIGS. 7A through 7E refer to elements that are similar to elements having reference numerals preceded by the number "5" in FIG. 5A, FIG. 5B or FIG. 5C, by the number "4" in FIG. 4, by the number "3" in FIG. 3, by the number "2" in FIG. 2A or FIG. 2B or by the number "1" shown in FIGS. 1A through 1F.

Figure 7B:
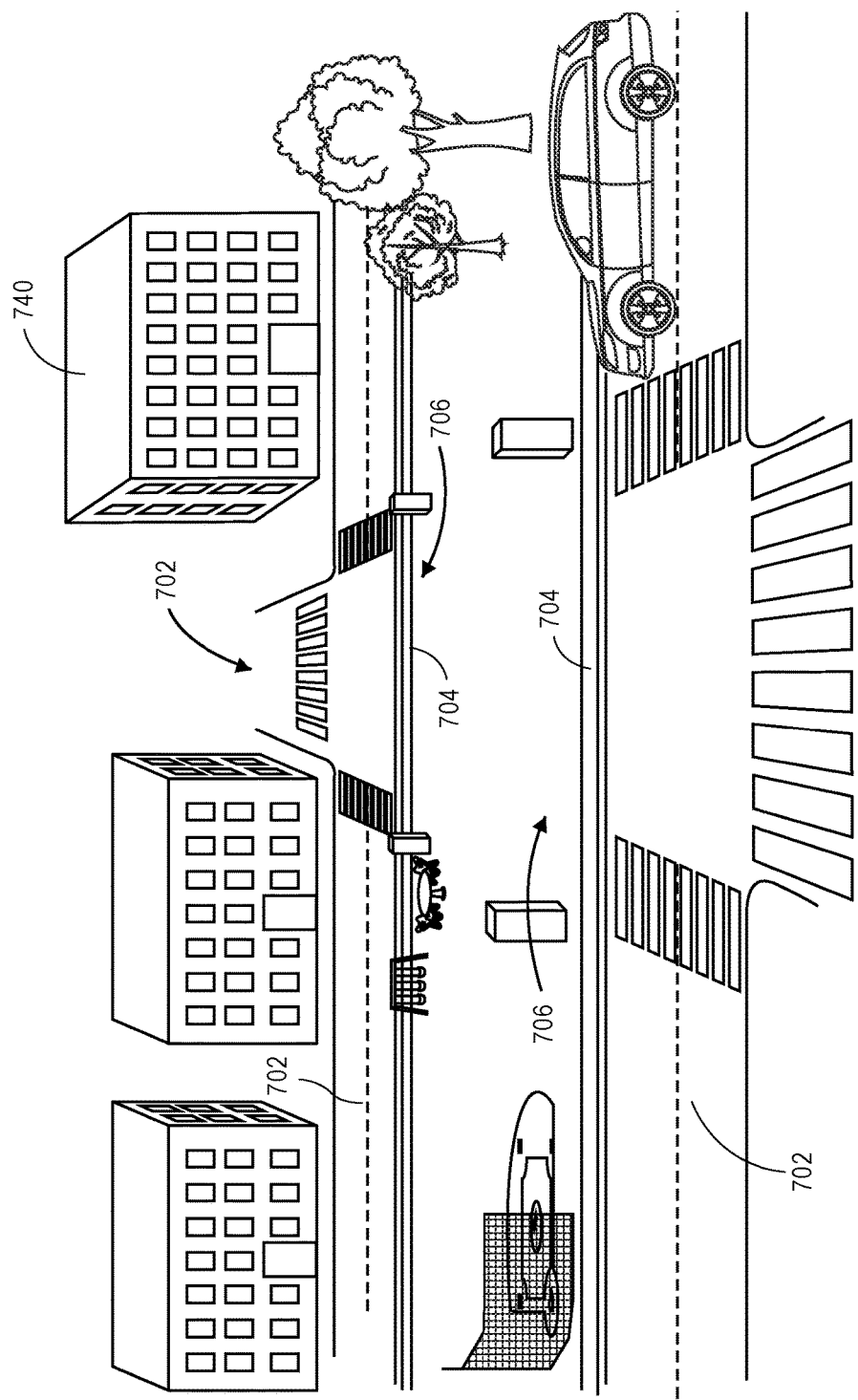

Referring to FIG. 7A, the navigable path network 705 includes a plurality of streets 702, a plurality of sidewalks 704 alongside the streets 702, and a pair of entrances 706 to a park or other open area. An autonomous vehicle 750 is shown en route from an origin 730 to a destination 740 via a selected route 735-1. The autonomous vehicle 750 is connected to a vehicle monitoring system 790 over a communications network 780. The autonomous vehicle 750 has an imaging device 762 or other sensor configured to capture imaging data regarding the autonomous vehicle 750 and its surroundings while the autonomous vehicle is en route from the origin 730 to the destination 740. The imaging device 762 may be trained in any orientation with respect to a direction of travel of the autonomous vehicle 750, including but not limited to forward, backward, above, below, to a left side or to a right side of the autonomous vehicle 750, and at any angle. The autonomous vehicle 750 may be configured to report information or data captured during its transit from the origin 730 to the destination 740, e.g., a course, a speed and a position of the autonomous vehicle 750, as well as any imaging data captured by the imaging device 762. Information or data regarding the autonomous vehicle 750 may be captured continuously or at regular intervals, and may be reported synchronously or asynchronously, e.g., in real time, in near-real time, or in one or more batch processes, or in any other manner Referring to FIG. 7B, a view of an area in which the navigable path network 705 is provided, as captured using the imaging device 762 in the position shown in FIG. 7A, is shown. As is shown in FIG. 7B, the view of the area captured by the imaging device 762 as shown in FIG. 7A shows each of the entrances 706 to the park, as well as several of the streets 702 and sidewalks 704. Additionally, from a perspective of the autonomous vehicle 750, a region of the park between the pair of entrances 706 appears to be substantially flat, and is within a reasonable vicinity of the destination 740.

Figure 7D:
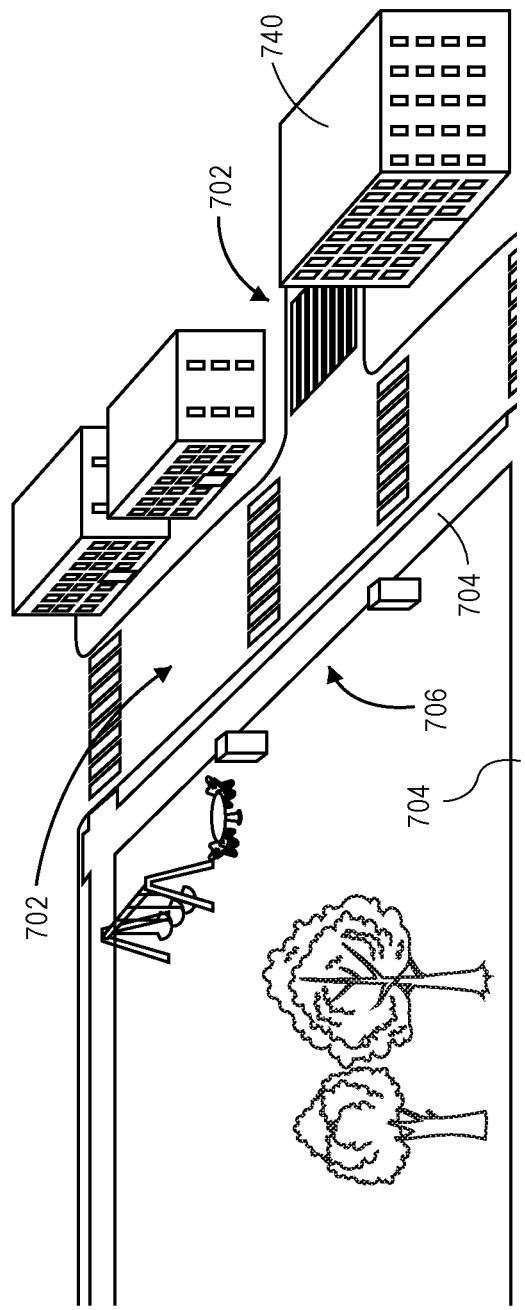

Referring to FIG. 7C, the autonomous vehicle 750 is shown as having traveled farther along the selected route 735-1 from the origin 730 to the destination 740, and reports information or data captured during its transit, e.g., a course, a speed and a position of the autonomous vehicle 750, as well as any imaging data captured by the imaging device 762. Referring to FIG. 7D, a view of the area in which the navigable path network 705 is provided, as captured using the imaging device 762 in the position shown in FIG. 7C, is shown. As is shown in FIG. 7D, the view captured by the imaging device 762 as shown in FIG. 7C shows one of the entrances 706 to the park and the destination 740, along with a number of the streets 702 and the sidewalks 704. As is also shown in FIG. 7D, from a perspective of the autonomous vehicle 750, the region of the park near the one of the entrances 706 also appears to be substantially flat, and within a reasonable vicinity of the destination 740.

Referring to FIG. 7E, the autonomous vehicle 750 is shown as traveling from the destination 740 to the origin 730 along an exploratory route 735-2, which includes a proposed path 708 passing through the park, between the entrances 706. The proposed path 708 may be added to the navigable path network 705 based on the information or data captured by the imaging device 762 while en route from the origin 730 to the destination 740 along the selected route 735-1, including but not limited to the images shown in FIG. 7B and FIG. 7D. While traveling along the exploratory route 735-2, the autonomous vehicle 750 may be configured to capture any additional information or data, e.g., using the imaging device 762 or any number of other sensors. For example, as is shown in FIG. 7E, the autonomous vehicle 750 may report its courses and speeds at specific positions, as well as surface conditions (e.g., "6' Wide Sidewalk," "30' Park Entrance," "4" Grass-Damp," "8' Wide Cinder," "Two-Lane Street") or other information or data captured by the autonomous vehicle 750 at such positions, to the vehicle monitoring system 790. Such information or data may be uploaded to one or more servers associated with the vehicle monitoring system 790 by the autonomous vehicle 750, and considered for addition to the navigable path network 705 in the future.

Figure 8:
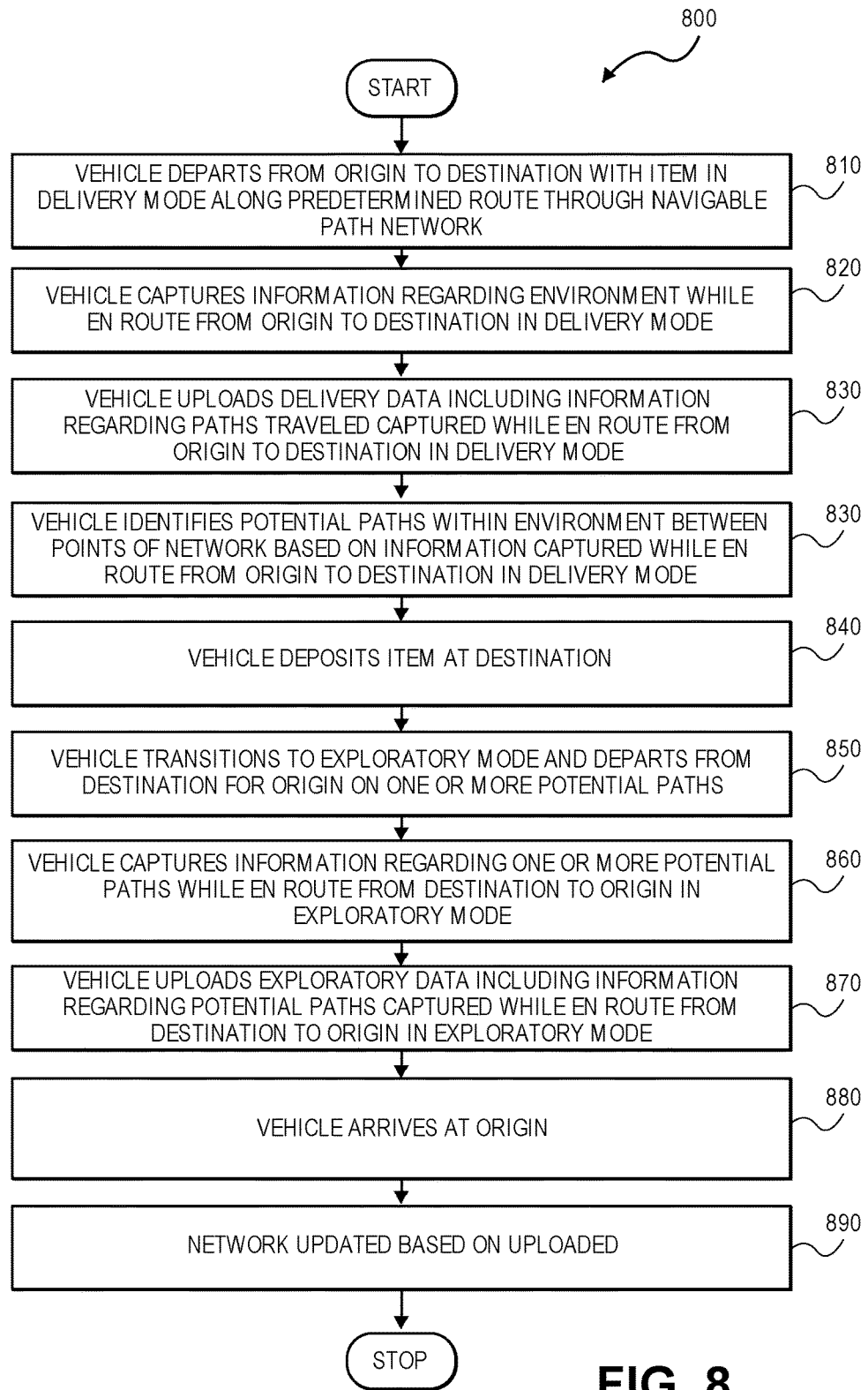
FIG. 8 is a flow chart of one process for modifying a navigable path network in accordance with embodiments of the present disclosure.

As is discussed above, an autonomous vehicle may operate in multiple modes, including a delivery mode, in which the autonomous vehicle's primary tasking is a delivery of an item from an origin to a destination within an area by way of a navigable path network, and an exploratory mode, in which the autonomous vehicle's primary tasking is to evaluate the geographic features of the area in order to determine whether one or more alternate paths between two or more points in the area may exist, and may potentially be incorporated into the navigable path network. Referring to FIG. 8, a flow chart 800 of one process for modifying a navigable path network in accordance with embodiments of the present disclosure is shown. At box 810, a vehicle departs from an origin with an item in a delivery mode along a predetermined route of a navigable path network. The vehicle may be programmed to travel at one or more predetermined speeds between two or more points of the network, on various elements of an area that are traditional transportation infrastructure, e.g., roads, sidewalks, crosswalks, bicycle or walking paths, bridges or trails, or on one or more elements of the area that are not traditionally identified as transportation infrastructure, e.g., parks, fields, forests, lots, clearings or other spaces. At box 820, the vehicle captures information or data regarding the environment while en route from the origin to the destination, including but not limited to imaging data (e.g., still or moving images and/or depth imaging data, associated audio information or data, or metadata), weather data, traffic data and/or surface data, as well as time stamps, e.g., positions of the vehicle and times at which the vehicle arrived at such positions, which may be captured individually or continuously.

At box 825, the vehicle uploads delivery data including information regarding the paths upon which the vehicle traveled that was captured while the vehicle was en route from the origin to the destination in the delivery mode. The delivery data may be uploaded to one or more servers associated with the navigable path network, e.g., a vehicle monitoring system or like networked computer system, and may include information regarding the potential paths captured while the vehicle is en route from the destination to the origin in the delivery mode.

At box 830, the vehicle identifies one or more potential paths within the environment between two or more points of the navigable path network based on information that was captured while en route from the origin to the destination in delivery mode. For example, when an autonomous vehicle travels along a street, a sidewalk or another known path of a navigable path network, and captures imaging data or other information or data regarding the known path and its surroundings, such information or data may identify an area in the vicinity of the known path, such as a park, a field, a lot or another clearing, and may make at least a preliminary determination as to the suitability of the clearing for incorporation into the navigable path network, and for travel by one or more autonomous vehicles during the performance of a task.

In some embodiments, the potential paths may be identified between the origin and the destination, or between the origin or the destination and two or more intervening waypoints, based on a comparison between imaging data captured by the vehicle in the delivery mode to information or data that is known regarding the environment, e.g., elevations or other geographic attributes of known features within the environment, as well as temporary activity or permanent alterations to the environment. For example, the imaging data may identify construction activity occurring within the environment that may result in the development of one or more new transportation features within the environment, the removal of one or more previously existing transportation features, or any other material alterations that may enhance, degrade or obviate the ability of an autonomous vehicle to travel thereon during the performance of one or more missions or tasks.

At box 840, the vehicle deposits the item at the destination. For example, the vehicle may automatically deposit the item at the destination, e.g., by removing the item from a cargo bay or other storage compartment associated with the vehicle using a robotic arm or other engagement system and releasing the item at a predetermined location at the destination. Alternatively, a customer who placed an order for the item, or another designated individual, may manually retrieve the item from a cargo bay or other storage compartment. At box 850, the vehicle transitions to an exploratory mode, and departs from the destination for the origin.

A transition from the delivery mode to the exploratory mode may involve a reconfiguration of one or more components of the vehicle, e.g., by repurposing an imaging device from a collision avoidance mode, in which the imaging device is configured to detect the presence or absence of objects within a path of the vehicle, to an evaluation mode, in which the imaging device is configured to capture images of the vehicle's surroundings, including areas to the forward, rear, left or right of the vehicle, or above the vehicle. In addition to imaging devices, any number of other sensors, e.g., inclinometers, compasses or gyroscopes, may be configured to capture and record information regarding the environment as the vehicle transitions to the exploratory mode.

At box 860, the vehicle captures information regarding one or more potential paths while the vehicle is en route from the origin to the destination in the exploratory mode. As is discussed above, such information may be captured using any type of sensor that may be trained or oriented to capture information or data at any orientation (e.g., along any axis) with respect to the vehicle. At box 870, the vehicle uploads exploratory data to one or more servers associated with the navigable path network, including information regarding the potential paths captured while the vehicle is en route from the destination to the origin in the exploratory mode. Such information may represent any new potential paths that may lie between the origin and the destination, or between any two of the points within the navigable path network. The information or data may be used to at least preliminarily estimate dimensions of an autonomous vehicle that may travel along the clearing, or missions or tasks that may be performed while traveling thereon. Similarly, the information or data may identify new streets, sidewalks or other traditional paths that were previously not included in the navigable path network, or determine that one or more paths included in the navigable path network is no longer passable (e.g., due to construction, weather or other events). In some embodiments, the exploratory data may include information or data that was captured by the autonomous vehicle in both the exploratory mode and in the delivery mode. At box 880, the vehicle arrives at the origin, and at 890, the navigable path network is updated based at least in part on the delivery data and/or the exploratory data uploaded from the vehicle, e.g., to add one or more new paths thereto, to remove one or more existing paths therefrom, or to update relevant information or data concerning an existing path, and the process ends.

As is discussed above, an autonomous vehicle may be programmed or otherwise configured to travel along a route (e.g., an optimal route) between two or more points of a navigable path network during the execution of a mission or a task, and the route may be selected based on any attributes of the navigable path network, the autonomous vehicle or the mission or the task. Additionally, the autonomous vehicle may be programmed or otherwise configured to change its route based on information or data regarding changes in any relevant attributes. Such changes may be determined by sensors operating on the autonomous vehicle, or on one or more other autonomous vehicles, and the autonomous vehicle may be reprogrammed or reconfigured based on instructions received from a central vehicle monitoring system or another networked computer system. Alternatively, the autonomous vehicle may reprogram or reconfigure itself based on information or data regarding changes to such attributes.

Figure 9A:
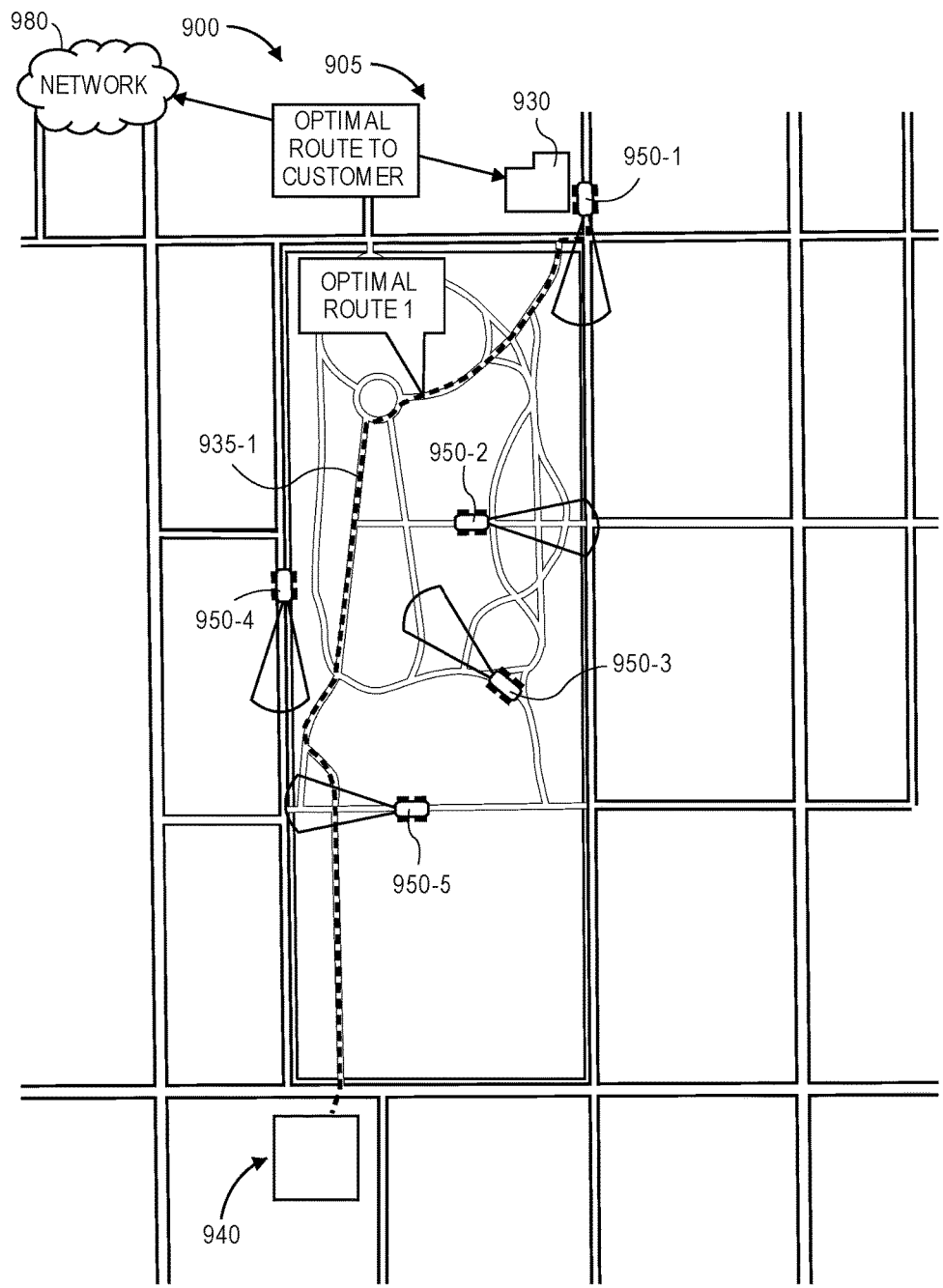
FIGS. 9A, 9B and 9C are views of aspects of one navigable path network in accordance with embodiments of the present disclosure.
Figure 9B:
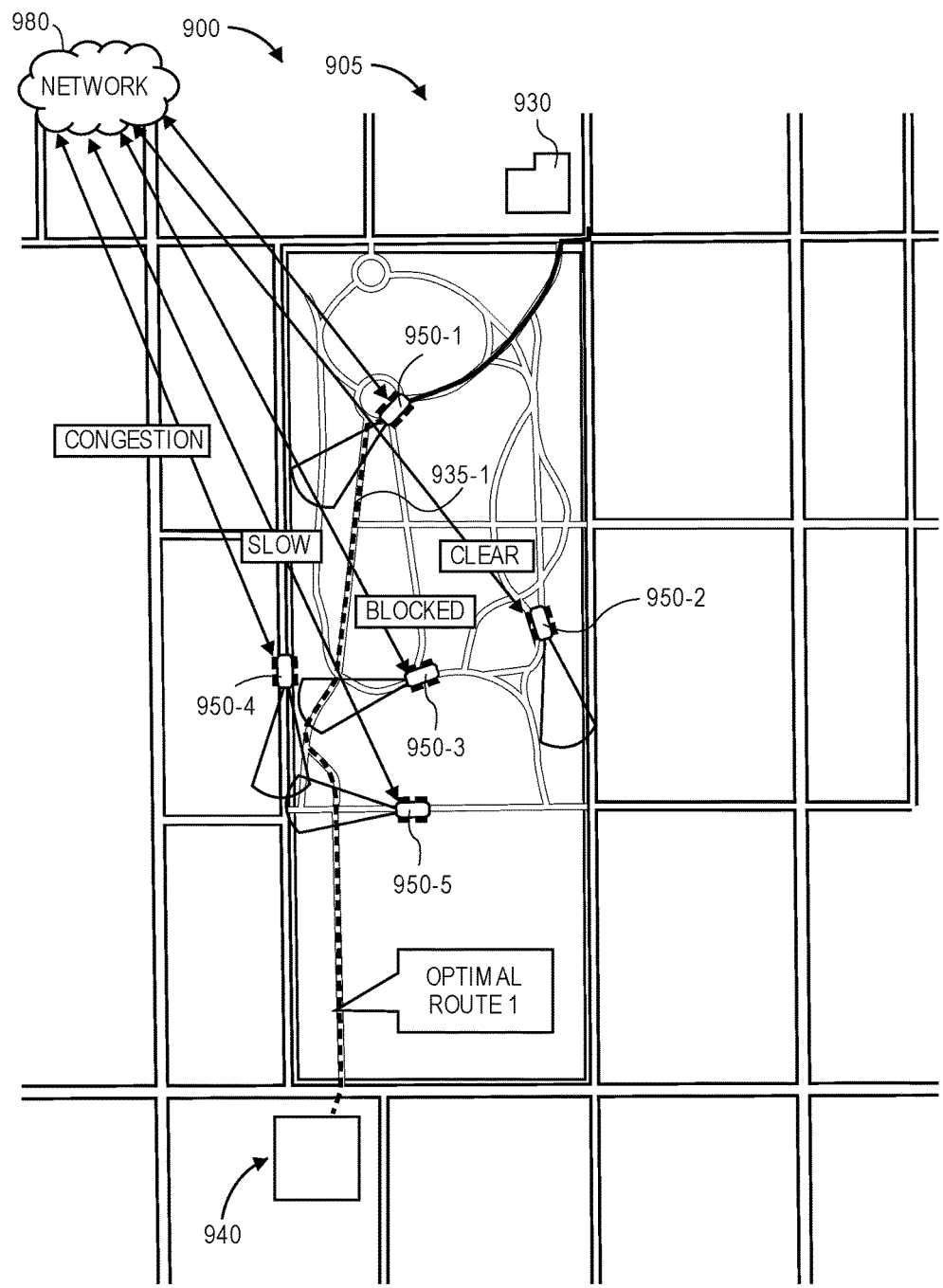
Figure 9C:
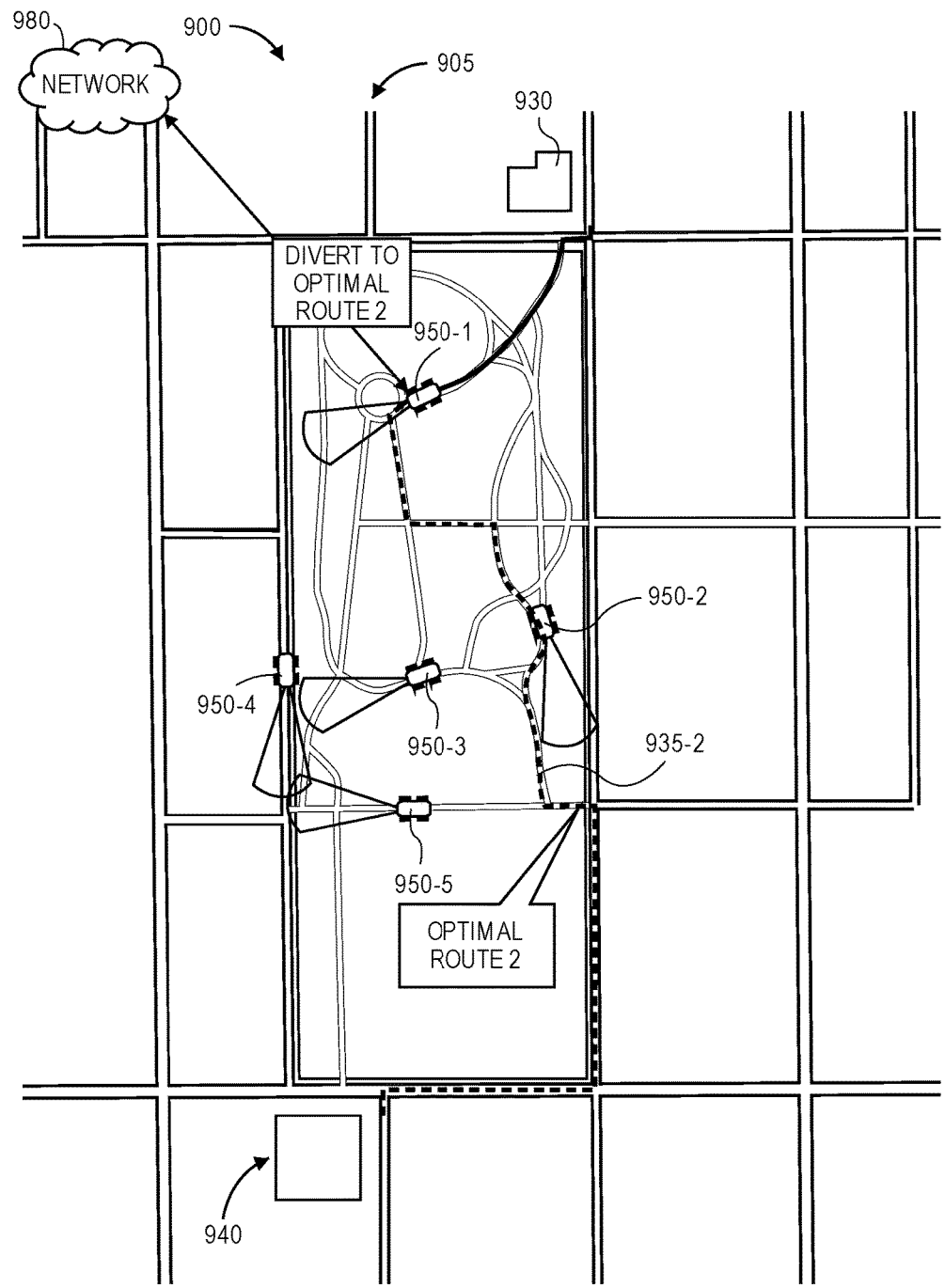

Referring to FIGS. 9A, 9B and 9C, views of aspects of one system 900 in accordance with embodiments of the present disclosure are shown. Except where otherwise noted, reference numerals preceded by the number "7" in FIGS. 7A through 7E refer to elements that are similar to elements having reference numerals preceded by the number "7" in FIGS. 7A through 7E, by the number "5" in FIG. 5A, FIG. 5B or FIG. 5C, by the number "4" in FIG. 4, by the number "3" in FIG. 3, by the number "2" in FIG. 2A or FIG. 2B or by the number "1" shown in FIGS. 1A through 1F.

As is shown in FIG. 9A, the system includes a navigable path network 905 comprising points corresponding to a fulfillment center 930 (or other origin for a mission or task), a customer 940 (or other destination for the mission or task), as well as a plurality of autonomous vehicles 950-1, 950-2, 950-3, 950-4, 950-5. The fulfillment center 930, the customer 940 and the autonomous vehicles 950-1, 950-2, 950-3, 950-4, 950-5 are connected to one another over a communications network 980, which may include the Internet in whole or in part.

While the autonomous vehicles 950-2, 950-3, 950-4, 950-5 are traveling through an area or environment (e.g., within or around an urban park) during the execution of missions or tasks, which may include but are not limited to deliveries of items from the fulfillment center 930 to one or more customers, the autonomous vehicle 950-1 may receive instructions to travel on an optimal route 935-1 from the fulfillment center 930. For example, as is shown in FIG. 9A, the optimal route 935-1 calls for the autonomous vehicle 950-1 to cross a street in front of the fulfillment center 930, enter the urban park at a northern boundary, and travel through the urban park on one or more walking paths or other features before exiting the urban park at a southern boundary, and crossing another street to reach the customer 940.

Each of the autonomous vehicles 950-1, 950-2, 950-3, 950-4, 950-5 may be configured to sense information or data regarding the execution of their respective missions or tasks, as well as their surroundings, while traveling between two or more points of the navigable path network, e.g., using one or more onboard sensors such as imaging devices. As is shown in FIG. 9B, after the autonomous vehicle 950-1 has departed from the fulfillment center 930, each of the autonomous vehicles 950-2, 950-3, 950-4, 950-5 may report information or data regarding traffic conditions (or any other relevant information or data) during the execution of their respective missions or tasks. For example, as is shown in FIG. 9B, while the autonomous vehicle 950-2 reports a clear path, the autonomous vehicle 950-3 reports that its path is blocked, the autonomous vehicle 950-4 reports having identified congestion nearby, and the autonomous vehicle 950-5 reports that it is traveling at reduced speeds.

As is shown in FIG. 9C, based at least in part on information or data captured regarding the capacities of the navigable path network 905, including but not limited to information or data regarding traffic and congestion identified by sensors operating aboard the autonomous vehicles 950-2, 950-3, 950-4, 950-5, the autonomous vehicle 950-1 may change its route to a new optimal route 935-2 that also travels through or around the urban park, toward an area where the autonomous vehicle 935-2 reported having a clear path, but avoiding the areas of the urban park where congestion, blocked paths and slow speeds were reported by the autonomous vehicles 950-3, 950-4, 950-5.

Figure 10:
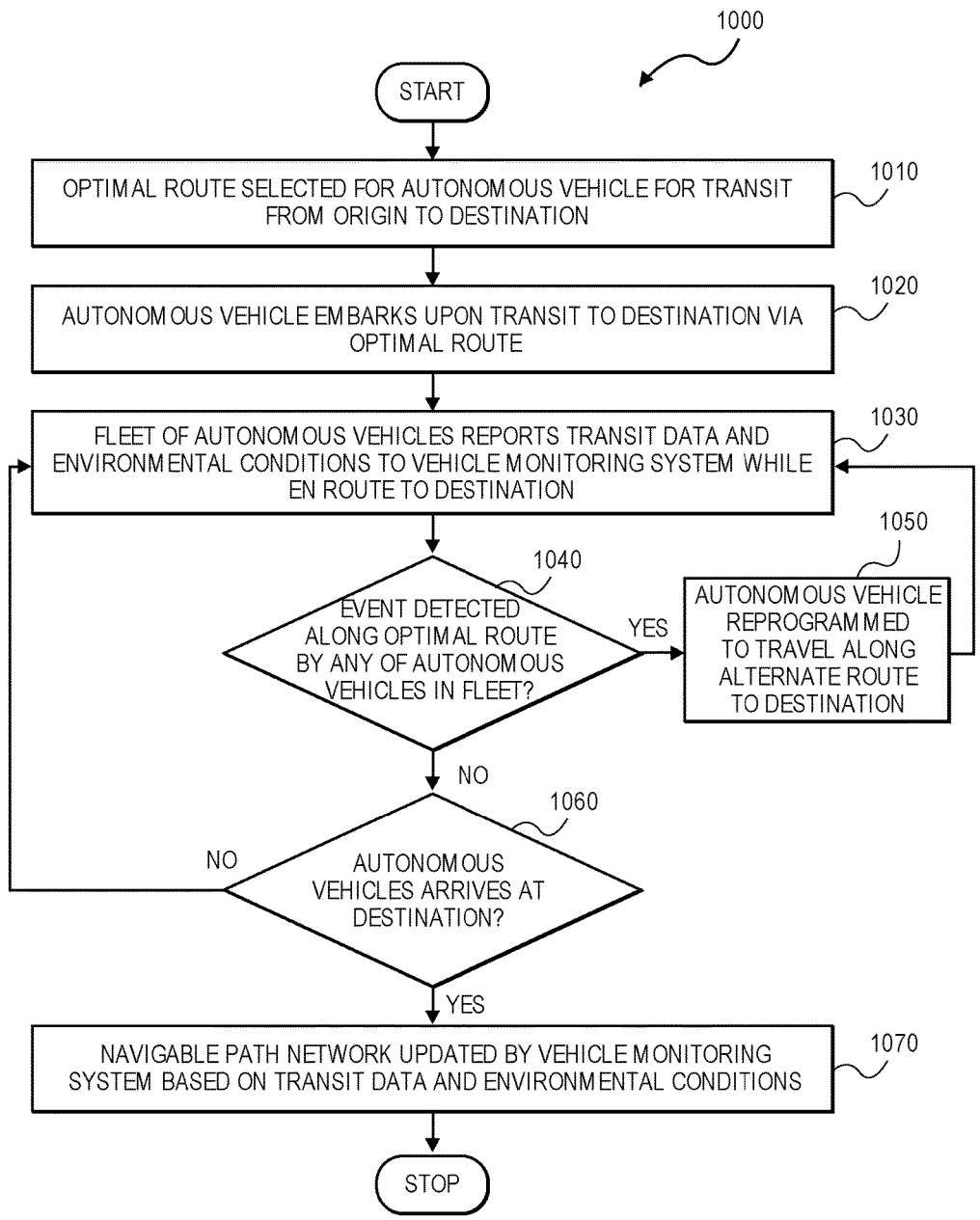
FIG. 10 is a flow chart of one process for utilizing a navigable path network in accordance with embodiments of the present disclosure.

In accordance with the present disclosure, a route being traveled by an autonomous vehicle during the execution of one or more tasks may be continuously evaluated in order to determine whether that route is optimal or preferred for the autonomous vehicle or for the execution of one or more of the tasks, or whether another route is identified as being optimal or preferred based on intrinsic or extrinsic information or data, including information or data captured by one or more operating autonomous vehicles. Referring to FIG. 10, a flow chart 1000 of one process for utilizing a navigable path network in accordance with embodiments of the present disclosure is shown. At box 1010, an optimal route is selected for an autonomous vehicle for a transit from an origin to a destination within an area or environment. For example, where attributes of the autonomous vehicle, the transit and a navigable path network are known, the optimal route may be selected for the autonomous vehicle based on such attributes. The transit may be associated with any mission or task, and in any mode of operation, e.g., a delivery mode, an exploratory mode, or any other mode.

At box 1020, the autonomous vehicle embarks upon the transit to the destination via the optimal route. The optimal route may call for the autonomous vehicle to travel over any traditional transportation infrastructure or systems within the area or environment, including but not limited to one or more roads, sidewalks, crosswalks, bicycle or walking paths, bridges or trails, as well as features that are not traditionally associated with transportation, including but not limited to parks, fields, forests, lots, clearings or other spaces. At box 1030, each of a fleet of autonomous vehicles operating within the area or environment reports transit data and environmental conditions to the vehicle monitoring system while the autonomous vehicles are en route to their respective destinations. For example, the autonomous vehicles may report their respective courses, speeds, positions, altitudes, angles of orientation (e.g., yaw, pitch or roll), as well as operational characteristics including available battery life or fuel, estimated range, carrying capacity and the like, and environmental characteristics including weather conditions, surface conditions, traffic conditions or any other information or data that may potentially impact the performance of any given autonomous vehicle within the area environment in a beneficial or adverse manner. The information or data may be reported to a vehicle monitoring system or another networked computer system synchronously or asynchronously, on a continuous or segmented basis, e.g., in real time, in near-real time, or in one or more batch processes, or in any other manner.

At box 1040, whether an event is detected along the optimal route by any of the autonomous vehicles in the fleet is determined. Any type of event that might impact the ability of the autonomous vehicle to complete the transit along the optimal route may be considered, even if the event is not within a reasonable range of the autonomous vehicle, or is not impacting the autonomous vehicle at the time. Such events may be detected by one or more autonomous vehicles, or, alternatively, by any other intrinsic or extrinsic data source, and may be reported in any quantitative or qualitative manner. For example, referring again to FIG. 9B, the autonomous vehicles 950-3, 950-4, 950-5 reported sensing congestion or blocked paths, or experiencing slow speeds, and the autonomous vehicle 950-2 reported having a clear path.

If an event is detected along the optimal route by any of the autonomous vehicles in the fleet, then the process advances to box 1050, where the autonomous vehicle is reprogrammed to travel along an alternate route to the destination. For example, referring again to FIG. 9B, the autonomous vehicle 950-1 may be reprogrammed to travel along the optimal route 935-2, rather than the optimal route 935-1, based at least in part on the information or data reported by the autonomous vehicles 950-3, 950-4, 950-5, which relayed negative attributes regarding a portion of the area or environment through which the optimal route 935-1 passed, and the information or data reported by the autonomous vehicle 950-2, which relayed positive attributes regarding a portion of the area or environment in which the autonomous vehicle 950-2 was traveling. The process then returns to box 1030, where the fleet of autonomous vehicles continues to report transit data and environmental conditions to the vehicle monitoring system while en route to their respective destinations.

If no event is detected along the optimal route by any of the autonomous vehicles in the fleet, then the process advances to box 1060, where whether the autonomous vehicle has arrived at its destination is determined. If the autonomous vehicle has arrived at its destination, then the process ends. If the autonomous vehicle has not arrived at its destination, however, then the process returns to box 1030, where the fleet of autonomous vehicles continues to report transit data and environmental conditions to the vehicle monitoring system while en route to their respective destinations. The autonomous vehicles may persistently evaluate the sufficiency of their respective routes while en route to their respective destinations, and may consider not only information or data captured by sensors operating aboard other autonomous vehicles but also information or data obtained from other sources.

The systems and methods of the present disclosure are directed to navigable path networks that may be traveled upon by one or more autonomous vehicles while performing one or more missions or tasks, including but not limited to the delivery of an object (e.g., an item ordered for purchase by a customer) from an origin to a destination. In some embodiments, the navigable path networks may be dedicated to a single purpose, e.g., the delivery of objects from a single source to one or more destinations, such as items delivered from a fulfillment center, a warehouse or a like facility to one or more customers. Alternatively, in other embodiments, the navigable path networks may be directed to multiple purposes, such as the delivery of items from multiple vendors, manufacturers or merchants to a fulfillment center, and the delivery of items from the fulfillment center to multiple customers or other destinations. Additionally, the navigable path networks may include any number of paths connecting any number of points. In some embodiments, the paths may include elements or features of traditional transportation infrastructure or systems, e.g., roads, sidewalks, crosswalks, bicycle or walking paths, bridges or trails, as well as elements or features that are not ordinarily associated with traditional transportation infrastructure or systems, e.g., parks, fields, forests, lots, clearings or other spaces. Moreover, the navigable path networks of the present disclosure may be updated, as necessary, based on information regarding changes to environments in which the navigable path networks are provided, including but not limited to the addition or removal of one or more points, the addition or removal of traditional transportation infrastructure (e.g., roads or sidewalks), the determination of factors affecting the capacity of such infrastructure (e.g., weather, traffic or construction), or the addition or removal of one or more areas within an environment (e.g., areas within parks, fields, forests, lots, clearings or other spaces) that might accommodate travel of one or more autonomous vehicles thereon, and may include one or more alternate or proposed paths.

The information or data that may be captured and reported by one or more autonomous vehicles, or obtained from any intrinsic or extrinsic sources, and utilized to generate or modify a navigable path network in accordance with the present disclosure is not limited. For example, such information or data may be qualitative in nature, e.g., courses, speeds, elevations, positions, angles of orientation, times or dates of arrival or departure, battery life, fuel levels or carrying capacities expressed in numeric terms. The information or data may also be qualitative in nature, e.g., courses, speeds, elevations, positions, angles of orientation, times or dates of arrival or departure, battery life, fuel levels or carrying capacities expressed in words such as "northeast," "south," "slow," "fast," "high," "valley," "waypoint," "tilt," "Sunday," "full charge" or "half tank."

Although some embodiments of the present disclosure show a re-routing of an autonomous vehicle based on changes in traffic or weather conditions, as reported by other autonomous vehicles, those of ordinary skill in the pertinent arts will recognize that an autonomous vehicle may be re-routed to another path or paths within a navigable path network for any reason (e.g., a change in a mission or a task) and on any basis, including but not limited to intrinsic or extrinsic information or data obtained from any source. Moreover, fleets of autonomous vehicles utilized in accordance with the present disclosure may be homogenous (e.g., substantially identical in features or capacities, such as is shown in FIG. 5A, or heterogeneous (e.g., having different features or capacities, such as is shown in FIG. 1B) in nature.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 6, 8 or 10, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A computer-implemented method comprising:
    receiving, over a communications network, an order for a purchase of an item from a customer, wherein the order specifies a destination for a delivery of the item;
    identifying, by at least one server, a facility where the item is located;
    determining, by the at least one server, a plurality of attributes of the item, wherein the plurality of attributes comprises a volume of the item and a mass of the item;
    identifying, by the least one server, first information regarding a navigable path network within an environment, wherein the navigable path network comprises a plurality of points and a plurality of paths between the plurality of points, and wherein the facility corresponds to a first one of the plurality of points, and wherein the destination corresponds to a second one of the plurality of points;
    identifying, by the at least one server, second information regarding a plurality of autonomous vehicles configurable for travel on at least a portion of the navigable path network;
    selecting, by the at least one server, one of the plurality of autonomous vehicles for the delivery of the item from the facility to the destination, wherein the one of the autonomous vehicles is selected based at least in part on the volume of the item and the mass of the item;
    determining, by the at least one server, an optimal route on the navigable path network for the selected autonomous vehicle, wherein the optimal route comprises a first path originating at the facility and a second path terminating at the destination;
    sending, over the communications network, a first plurality of computer instructions for causing the selected autonomous vehicle to travel from the facility to the destination, wherein the first plurality of computer instructions comprises at least a first computer instruction for causing the selected autonomous vehicle to travel along the first path at a first speed and at least a second computer instruction for causing the selected autonomous vehicle to travel along the second path at a second speed; and
    receiving, over the communications network, third information captured by at least one sensor provided on the selected autonomous vehicle while the selected autonomous vehicle is traveling on at least one of the first path or the second path,
    wherein the third information comprises at least one of a course, a speed, a position or an altitude of the selected autonomous vehicle.

2. The computer-implemented method of claim 1, wherein each of the autonomous vehicles comprises:
    a frame having a height, a width and a length;
    an electric motor; and
    a storage compartment having a predetermined carrying capacity, and
    wherein the one of the plurality of autonomous vehicles is selected based at least in part on at least one of:
        the width of the frame of the one of the autonomous vehicles;
        a speed rating of the electric motor of the one of the autonomous vehicles; or
        the predetermined carrying capacity of the one of the autonomous vehicles.

3. The computer-implemented method of claim 2, wherein the at least one sensor provided on the selected autonomous vehicle further comprises an imaging device, and
    wherein the method further comprises:
        receiving, over the communications network, imaging data captured by the imaging device while traveling from the facility to the destination along the optimal path;
        identifying at least one proposed path within the environment based at least in part on the imaging data, wherein the at least one proposed path extends from a first one of the plurality of points to a second one of the plurality of points through at least one of a park, a field, a forest, a lot or a clearing within the environment;
        determining, by the at least one server, a return route for the selected autonomous vehicle from the destination to the facility, wherein the return route comprises the at least one proposed path; and
        sending, over the communications network, a second plurality of computer instructions for causing the selected autonomous vehicle to travel from the destination to the facility, wherein the second plurality of computer instructions comprises a third computer instruction for causing the selected autonomous vehicle to travel along the at least one proposed path at a third speed.

4. The computer-implemented method of claim 1, wherein determining the optimal route for the selected autonomous vehicle from the facility to the destination comprises:
selecting at least one of the first path or the second path according to one of Dijkstra's Algorithm, Bellman-Ford Algorithm, Floyd-Warshall Algorithm, Johnson's Algorithm or a hub labeling technique.

5. The computer-implemented method of claim 1, wherein determining the optimal route of the navigable path network for the selected autonomous vehicle for the delivery of the item from the facility to the destination comprises:
identifying a plurality of routes of the navigable path network from the facility to the destination for the selected autonomous vehicle for the delivery of the item from the facility to the destination, wherein each of the plurality of routes comprises at least two of the plurality of paths;
determining, for each of the plurality of routes, at least one of a cost of the delivery or a time of the delivery; and
selecting the one of the plurality of routes having at least one of a lowest cost of the delivery or a shortest time of the delivery.

6. A method comprising:
receiving, over a communications network, first information regarding a mission requiring travel from an origin to a destination;
identifying second information regarding a plurality of paths of a navigable path network having a plurality of points and a plurality of paths by at least one computer server, wherein each of the paths extends between two of the points, wherein one of the points corresponds to the origin and wherein one of the points corresponds to the destination;
identifying third information regarding a plurality of autonomous vehicles by the at least one computer server, wherein each of the autonomous vehicles is configured for travel on at least one of the plurality of paths;
selecting one of the autonomous vehicles for performing the mission based at least in part on the first information, the second information and the third information by the at least one computer server;
selecting a route for the selected autonomous vehicle from the origin to the destination by the at least one computer server based at least in part on the first information, the second information and the third information by the at least one computer server, wherein the selected route is defined by at least some of the plurality of paths of the navigable path network extending between the origin and the destination; and
sending, over the communications network, fourth information regarding the selected route to the selected autonomous vehicle,
wherein the fourth information comprises at least one instruction for causing the selected autonomous vehicle to perform the mission while traveling along the selected route from the origin to the destination.

7. The method of claim 6, wherein the mission comprises a delivery of an item from the origin to the destination via the navigable path network,
wherein the first information is received over the communications network via at least one of a browser or a shopping application operating on a client computer device, and
wherein the first information identifies at least one of a height of the item, a width of the item, a length of the item, a volume of the item or a mass of the item.

8. The method of claim 6, wherein the second information identifies, for each of the plurality of paths, at least one of:
a length of the path;
a width of the path;
whether the path is covered;
a surface feature of the path;
a predicted weather condition of the path; or
a predicted traffic condition of the path.

9. The method of claim 6, wherein at least one of the plurality of paths is at least a portion of a street, a road, a sidewalk, a bridge, a bicycle path, a walking path or a trail, and
wherein at least one of the plurality of paths extends through at least one of a park, a field, a forest, a lot or a clearing.

10. The method of claim 6, wherein each of the autonomous vehicles comprises:
a frame;
at least one pair of wheels joined to at least one axle;
a motor disposed within the frame, wherein the motor is configured to cause the at least one pair of wheels to rotate at a speed within a predetermined speed range;
at least one storage compartment disposed within the frame, wherein the at least one storage compartment comprises at least one door pivotably joined to an outer surface of the frame by at least one hinge, and wherein the at least one door is configured to pivot between an open position and a closed position;
at least one power module for powering the motor;
at least one computer processor; and
at least one memory component.

11. The method of claim 10, wherein the third information identifies, for each of the plurality of autonomous vehicles, at least one of:
a height of the frame;
a width of the frame;
a length of the frame;
a number of the at least one pair of wheels;
a diameter of at least one of the at least one pair of wheels;
an estimated range;
a power rating or a speed rating of the motor;
the predetermined speed range of the motor; or
an electric charge associated with the at least one power module, wherein the at least one power module comprises at least one battery.

12. The method of claim 10, wherein the third information identifies, for each of the plurality of autonomous vehicles, at least one of:
a depth of the at least one storage compartment;
a width of the at least one storage compartment;
a length of the at least one storage compartment;
a volume of the at least one storage compartment; or
a weight capacity of the at least one storage compartment.

13. The method of claim 6, further comprising:
prior to receiving the first information regarding the mission requiring travel from the origin to the destination,
identifying fifth information regarding a plurality of prior missions requiring travel between at least two of the points of the navigable path network by at least one of the plurality of autonomous vehicles, wherein the fifth information comprises, for each of the prior missions, at least one of:
- a date or a time of a departure from one of the points of the navigable path network;
- a date or a time of an arrival at one of the points of the navigable path network;
- an elapsed time of the mission;
- a volume or a payload carried during the mission;
- a route traveled during the mission, wherein the route comprises at least one of the paths of the navigable path network;
- a weather condition on one of the paths of the navigable path network during the mission; or
- a level of traffic on one of the paths of the navigable path network during the mission; and defining the navigable path network for at least one of the plurality of autonomous vehicles based on the fifth information.

14. The method of claim 6, further comprising:
determining that the selected autonomous vehicle is traveling along at least one of the plurality of paths of the selected route;
receiving, over the communications network, fifth information captured by the selected autonomous vehicle using at least one sensor, wherein the fifth information is captured while the selected autonomous vehicle is traveling along the selected route; and
modifying the navigable path network based at least in part on the fifth information, wherein modifying the navigable path network comprises at least one of:
- adding a first path to the plurality of paths based at least in part on the fifth information;
- removing a second path from the plurality of paths based at least in part on the fifth information; or
- modifying a third path of the plurality of paths based at least in part on the fifth information.

15. The method of claim 6, further comprising:
determining that the selected autonomous vehicle is traveling along at least one of the plurality of paths of the selected route;
receiving, over the communications network, fifth information captured by at least one of the plurality of autonomous vehicles using at least one sensor, wherein the fifth information is captured while the selected autonomous vehicle is traveling along the selected route; and
modifying the selected route based at least in part on the fifth information, wherein modifying the navigable path network comprises at least one of:
- adding a first path to the selected route based at least in part on the fifth information;
- removing a second path from the selected route based at least in part on the fifth information; or
- modifying a third path of the selected route based at least in part on the fifth information.

16. The method of claim 6,
wherein the selected route comprises:
- a first path extending from a first point of the navigable path network corresponding to the origin to at least a second point of the navigable path network, wherein the first point corresponds to the origin; and
- a second path extending from at least the second point of the navigable path network to a third point of the navigable path network, wherein the third point corresponds to the destination; and wherein the fourth information comprises:
- a first instruction to travel along the first path of the navigable path network on a first course and at a first speed; and
- a second instruction to travel along the second path of the navigable path network on a second course and at a second speed.

17. The method of claim 16, wherein at least one of the first path or the second path is selected using at least one of Dijkstra's Algorithm, Bellman-Ford Algorithm, Floyd-Warshall Algorithm, Johnson's Algorithm or a hub labeling technique.

18. A method comprising:
identifying information regarding a plurality of deliveries of items within an area, wherein each of the deliveries of items is from a first location to a second location by way of at least a third location using one of a plurality of autonomous vehicles, and wherein the information regarding the plurality of deliveries comprises, for each of the deliveries of items, at least one of:
- a first time stamp associated with a departure of one of the autonomous vehicles from the first location;
- a second time stamp associated with an arrival of the one of the autonomous vehicles at the second location;
- a third time stamp associated with an arrival of the one of the autonomous vehicles at the at least one third location;
- at least one of a height, a width or a length of the one of the autonomous vehicles;
- at least one of a mass or a volume of an item delivered from the first location to the second location by way of the at least one third location;
- a first speed of the one of the autonomous vehicles between the first location and the at least one third location; and
- a second speed of the one of the autonomous vehicles between the at least one third location and the second location;

defining a navigable path network associated with the area based at least in part on the information regarding the plurality of deliveries, wherein the navigable path network comprises a plurality of paths and a plurality of points, wherein each of the plurality of points corresponds to a location within the area, and wherein each of the paths extends between two of the plurality of points;
receiving a request for a delivery of a first item, wherein the request identifies an origin for the delivery of the first item and a destination for the delivery of the first item;
determining at least one of a mass or a volume of the first item;
identifying a point of the navigable path network corresponding to the origin;
identifying a point of the navigable path network corresponding to the destination;
selecting a route from the point of the navigable path network corresponding to the origin to the point of the navigable path network corresponding to the destination, wherein the selected route comprises at least one path of the navigable path network;
selecting one of the autonomous vehicles for delivery of the first item along the selected route based at least in part on the selected route; and transmitting, over a communications network, a plurality of instructions for delivering the first item from the origin to the destination to the selected autonomous vehicle, wherein the plurality of instructions comprises a first instruction to travel on at least a first course and at least a first speed on the at least one path of the navigable path network.

19. The method of claim 18, wherein the plurality of instructions further comprises a second instruction to capture information by at least one sensor while the selected autonomous vehicle is en route from the origin to the destination on the at least one path, and wherein the method further comprises:
receiving, over the communications network, the information from the selected autonomous vehicle; and
revising the navigable path network associated with the area based at least in part on the information received from the selected autonomous vehicle, wherein revising the navigable path network comprises at least one of:
adding a first path extending between two of the plurality of points to the navigable path network;
removing a second path from the navigable path network; or
revising a third path of the navigable path network.

20. The method of claim 18, wherein each of the plurality of autonomous vehicles comprises:

a frame;
at least one pair of wheels;
a motor disposed within the frame, wherein the motor is configured to cause the at least one pair of wheels to rotate at a speed within a predetermined speed range;
at least one storage compartment disposed within the frame, wherein the at least one storage compartment comprises at least one door pivotably joined to an outer surface of the frame by at least one hinge, and wherein the at least one door is configured to pivot between an open position and a closed position;
at least one power module for powering the motor;
at least one computer processor; and
at least one memory component, and
wherein the route is selected based at least in part on at least one of:
a height of the frame;
a width of the frame;
a length of the frame;
a number of the at least one pair of wheels;
a diameter of at least one of the at least one pair of wheels;
an estimated range;
a power rating of the motor;
the predetermined speed range of the motor; or
an electric charge associated with the at least one power module, wherein the at least one power module comprises at least one battery.

* * * * *